(12) United States Patent
Sunny

(10) Patent No.: US 11,469,595 B2
(45) Date of Patent: Oct. 11, 2022

(54) SYSTEM, METHOD, AND INTERFACE FOR GOAL-ALLOCATION OF RESOURCES AND DYNAMIC MONITORING OF PROGRESS

(71) Applicant: Dynamhex Technologies, LLC, Kansas City, MO (US)

(72) Inventor: Sanwar Azam Sunny, Kansas City, MO (US)

(73) Assignee: Dynamhex Technologies, LLC, Kansas City, MO (US)

( * ) Notice: Subject to any disclaimer, the term of this patent is extended or adjusted under 35 U.S.C. 154(b) by 133 days.

(21) Appl. No.: 17/025,383

(22) Filed: Sep. 18, 2020

(65) Prior Publication Data

US 2021/0091567 A1    Mar. 25, 2021

Related U.S. Application Data

(60) Provisional application No. 62/902,719, filed on Sep. 19, 2019.

(51) Int. Cl.
*H02J 3/00*     (2006.01)
*G06Q 30/02*    (2012.01)
*G06Q 50/06*    (2012.01)

(52) U.S. Cl.
CPC .......... *H02J 3/003* (2020.01); *G06Q 30/0206* (2013.01); *H02J 3/004* (2020.01); *G06Q 50/06* (2013.01); *H02J 2300/10* (2020.01); *H02J 2300/20* (2020.01); *H02J 2300/40* (2020.01)

(58) Field of Classification Search
CPC .................................................. H02J 2300/40
See application file for complete search history.

(56) References Cited

U.S. PATENT DOCUMENTS

| | | | |
|---|---|---|---|
| 6,885,914 B2* | 4/2005 | Shimode | H02J 3/382 700/286 |
| 2009/0088991 A1* | 4/2009 | Brzezowski | H02J 13/00017 702/62 |
| 2014/0210845 A1* | 7/2014 | Zazueta-Hall | G06T 11/206 345/589 |
| 2016/0093074 A1* | 3/2016 | Inoue | G05B 15/02 345/427 |
| 2019/0372345 A1* | 12/2019 | Bain | H02J 3/381 |
| 2021/0050725 A1* | 2/2021 | Jensen | H02J 7/0047 |

* cited by examiner

*Primary Examiner* — Nathan L Laughlin
(74) *Attorney, Agent, or Firm* — Erise IP, P.A.

(57) ABSTRACT

System, method, and interface for visualized resource allocation and algorithms for the reallocation of resources to achieve a goal. The system analyses an initial state of resource allocation, a cost function for undesirable resources, and a set of potential incremental improvements, each with an associated cost, and determines a step-wise path of applying the incremental improvements to achieve an ultimate resource-allocation goal in an economically feasible way. Simultaneously, a user interface depicts the state of the allocation at the beginning, at the end, and along the path, allowing an intuitive understanding of how the goal will be achieved.

17 Claims, 40 Drawing Sheets

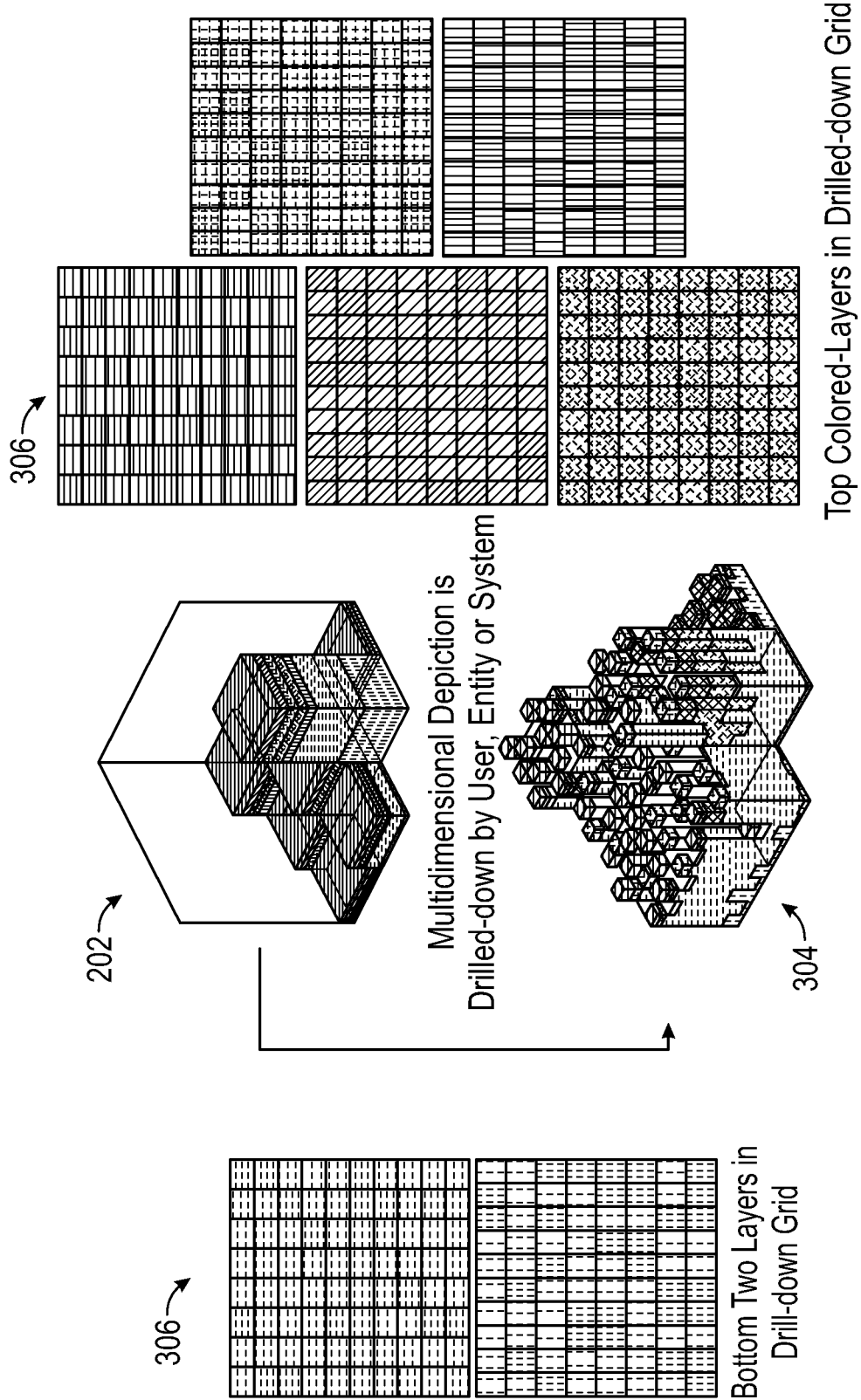

FIG. 18

| | Electricity | Natural Gas | Fuel Oil/ Kerosene | Wood | Propane | Other |
|---|---|---|---|---|---|---|
| Appliances | Type here | Type here | | | | |
| Electronic | Type here | | | | | |
| Lighting | | | | | | |
| Space Heating | | | | | | |
| Air Conditioning | | | | | | |
| Water Heating | | | | | | |

◇ DynamHEX

Production $T^A$, $T^B$ Consumption $J^T$　　Residential Commerical Industrial Transportation　　🔍 Search ( Region ▾ )  ( Year t ▾ )  ( Month ▾ )  ( Units ▾ )　　　　　　　　　　　( INTEGRATE API )

| P<br>Zip Code ▾ | Consumption MWh ▾ | Customers | Sales (S) | $\Phi_T$<br>Emission (mt) ▾ | V<br>Actions ▾ | R<br>Plant ▾ | Edit |
|---|---|---|---|---|---|---|---|
| 64112 | 100 | 102043 | 1453 | 172 | ( ACT NOW ) | Multiple | ✏ ▢ |
| 64110 | 50 | 142124 | 502 | 48 | ( ACT NOW ) | Hawthron | ✏ ▢ |
| 64108 | 25 | 145231 | 274 | 21.3 | ( ACT NOW ) | Spearville | ✏ ▢ |
| + | 10 | 152232 | 103 | 87 | ( ACT NOW ) | Latan | ✏ ▢ |
|  |  |  |  |  |  |  | ✏ ⊕ |
| Total | 200 (15 remaining) |  | 2323 | 328.3 |  |  |  |

( SAVE )

DynamHEX

Produ... Residential | Search

Zip Code ▾

Consumption 100 MWh ▾

Increase Efficiency or Electrification

Rate 0.09 $/KWh ▾

Emission (Tons) φ = 172 MT ▾

Reduce Emission

Plants (Hawthorn⊗) (La Cygna⊗) (Montrose⊗)

| Zip Code | | | | |
|---|---|---|---|---|
| | 2016 ▾ | | | |
| Zip Code | | | | |
| Customer | | | 100 | |
| Sales ($) | | 1453 | MM ▾ | |
| | | | Weights | |
| ○ Hawthorn (125 lbs/MWh) | 32.72% | 33% | | |
| ○ Hawthorn (125 lbs/MWh) | 32.72% | 33% | | |
| ○ Hawthorn (125 lbs/MWh) | 32.72% | 33% | | |
| (SAVE) | | | | |

Zip Co...
64112
64110
64108
+

Total (SAVE)

FIG. 22

| ≡ ⬢ DynamHEX | | | 🔍 Search | | | 📢 |
|---|---|---|---|---|---|---|
| Production Consumption | | | | | | |
| 3 Generation Plans | | | | Year ▾ | | |
| Plant ▾ | Heat Input (MW BTW) ▾ | Net Generation (BTW) ▾ | Location ▾ | Emmission mt ▾ | Action ▾ | Plant Operator Name Year ▾ Edit ▾ |
| ▸ La Cygne | 64123121 | 41123121(28%) | Kansas | 9.42 | ACT NOW | 2011 ⊘ ⊟ |
| ▸ Hawthron | 64123121 | —— | | | ACT NOW | 2011 ⊘ ⊟ |
| ▸ La Cygne | 64123121 | 41123121(28%) | Kansas | 9.42 | ACT NOW | 2011 ⊘ ⊟ |
| | | | | | | ⊕ |
| SAVE | | | | | | |

FIG. 23

DynamHEX

Production    Consumption

Q Search     Year ▾

3 Generation Plans

| Plant ▾ | Heat Input (MW BTW) ▾ | | Plant Operator Name |
|---|---|---|---|
| | | | Year ▾   Edit ▾ |
| ▸ La Cygne | 64123121 | | 2011    ⊘ ▣ |
| ▸ Hawthron | | | 2011    ⊘ ▣ |
| ▸ La Cygne | 64123121 | | 2011    ⊘ ▣ |
| Coal | | | 2011    ⊘ ▣ |
| Petroleum | | | 2011    ⊘ ▣ |
| Natural gas | | | 2011    ⊘ ▣ |
| Nuclear | | | 2011    ⊘ ▣ |
| Geothermal | | | 2011    ⊘ ▣ |
| Solar | | | 2011    ⊘ ▣ |
| Biomass | | | 2011    ⊘ ▣ |
| Wind | | | 2011    ⊘ ▣ |
| Hydro | | | 2011    ⊘ ▣ |

Popup dialog (✕):

- Plant Name    P
- City     City on Map ▾
- Primary fuel $J^A(i...N), J^B(i...M), J^T$
- Change fuel ▾
- Nameplate Capacity   323 MM ▾    (2016 ▾)
- Capacity Factor   123    Heat Input   64112343 BTU ▾
- Net Emission   $\phi = 9.42$ MT ▾    Heat Input   25 MWh ▾
- Reduce Emission or    Conversion   34
- Decommission this plant    Efficiency   Reduce Losses
-    Generation Technology ▾
-    Combined heat and ⊘
-    Power (CHP)
-    Number of boiler or turbine ⊖◯⊕
-    Number of boiler or turbine ⊖◯⊕

(SAVE)

FIG. 24

Production

Grid loss  Energy mix
Plant Name    Hawthron              ✏ SDFN23DRF
Current 200 MWh (▲39%) 128 Mt (▲39%)    Coal                39%
Planned 200 MWh (▼39%) 128 Mt (▼39%)    ▼19% ▓▓▓▓▓▓
City, Zip Code (Region) P               Check out the available solution
                                        and projects for replacement
                                        Sector   J              ▶

Energy    $J^A(i...N), J^B(i...M), J^T$  ▶    Fuel Type    $J^A(i...N), J^B(i...M), J^T$  ▶ ⎫ $\Delta\eta, \Delta\mu, \Delta p(A),$
                                                                                            ⎬ $\Delta p(B), \Delta p^T(A),$
Technology   $X_j$                       ▶    Energy Change   100MWh 20%     ◀            ⎭ $\Delta p^T(B)$ Funding Source                                Time Frame (Start,Finish)   $t_i, t_f$ Website Link                                  GHG Reduction   $\delta\Phi = 12Mt$ 45%   ◀   $\Delta p^T(B)$ Total Cost (s)  $P(v)$                        Total Savings ($)   $S_v(t)$              ▶

Description                                   Additional ⭘⎯ Fuel Type
                                                              $J^A(i...N), J^B(i...M), J^T$ (Cancel) (SAVE)

FIG. 25

SYSTEM, METHOD, AND INTERFACE FOR GOAL-ALLOCATION OF RESOURCES AND DYNAMIC MONITORING OF PROGRESS

RELATED APPLICATIONS

This non-provisional patent application claims priority benefit, with regard to all common subject matter, of earlier-filed U.S. Provisional Patent Application No. 62/902,719, filed on Sep. 19, 2019, and entitled "SYSTEM, METHOD, AND INTERFACE FOR GOAL-ALLOCATION OF RESOURCES AND DYNAMIC MONITORING OF PROGRESS" (the '719 Application). The '719 Application is hereby incorporated by reference in its entirety into the present application.

BACKGROUND

1. Field

Broadly, the invention relates to the field of resource consumption encoding, classification and computation, and visualization of that activity and resulting outcomes. More particularly, the invention includes an interface and algorithm useful for reallocating energy production and consumption among various energy sources to reduce ecologically harmful emissions.

2. Related Art

In typical discussions related to resource allocation, politically charged discussions of unseen outcomes and impacts can deter corrective action. Current resource allocation analysis and visualization system present convoluted and difficult to understand presentations that confuse the audience. Previously, discussions of how to reallocate energy production have been mired in an ideologically biased stalemate. As such, what is needed is an objective, mathematically and economically sound technique for both making energy production allocation determinations and visualizing these determinations in such a way as to convey their efficacy to consumers, voters, and governmental officials.

SUMMARY

Embodiments of the invention address the above-described need by providing for an interface for visualize resource allocation and algorithms for the reallocation of resources to achieve a goal. A first embodiment is directed to one or more non-transitory computer-readable storage media storing computer-executable instructions that perform a method of resource allocation of resources to achieve a goal and dynamic monitoring of progress, wherein the computer-executable instructions are executed by at least one processing element to perform the steps of receiving source data indicative of an amount of energy from at least one energy source, receiving an indication of an amount of energy used by at least one energy consumption process, determining an amount of energy wasted by the at least one energy consumption process, determining an allocation of the at least one energy source based at least in part on a maximization of used energy and a minimization of wasted energy, and generating a visualization representing an amount of the at least one energy source used, the amount of energy used in the at least one energy consumption process, and the amount of energy wasted in the at least one energy consumption process.

A second embodiment is directed to a method of resource allocation and dynamic monitoring of progress, wherein the method comprises the steps of receiving energy source data indicative of an amount of energy from at least one energy source, receiving energy consumption data indicative of an amount of energy consumed from at least one energy consumption process, determine if the at least one energy source is benign or a harmful, determine an amount of wasted energy in the at least one energy consumption process, determine an allocation of the resources based at least in part on a maximization of inflow from the benign source and a minimization of inflow from the harmful source, generate a first visualization representing the amount of energy received from the at least one energy source, the amount of energy used in the at least one energy consumption process, and the amount of wasted energy in the at least one energy consumption process, and generate a second visualization presenting the allocation of the resources.

A third embodiment is directed to one or more non-transitory computer-readable storage media storing computer-executable instructions that perform a method of resource allocation and dynamic monitoring of progress, wherein the computer-executable instructions are executed by at least one processing element to perform the steps of receiving energy source data indicative of an amount of energy from at least one energy source, receiving energy consumption data indicative of an amount of energy consumed from at least one energy consumption process, determining if the at least one energy source is benign or a harmful, determining an amount of wasted energy in the at least one energy consumption process, determine an allocation of the resources based at least in part on a maximization of inflow from the benign source, a maximization of used energy, a minimization of inflow from the harmful source, and minimization of wasted energy, generate a first visualization representing the amount of energy received from the at least one energy source, the amount of energy used in the at least one energy consumption process, and the amount of energy wasted in the at least one energy consumption process, and generate a second visualization presenting the allocation of the at least one energy source.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIGS. 3A-3E depict a variety of additional views of the user interface of FIG. 2 in accordance with embodiments of the invention;

FIGS. 17-25 depict exemplary user interfaces for inputting data and displaying outputs of the system;

Figure 1:
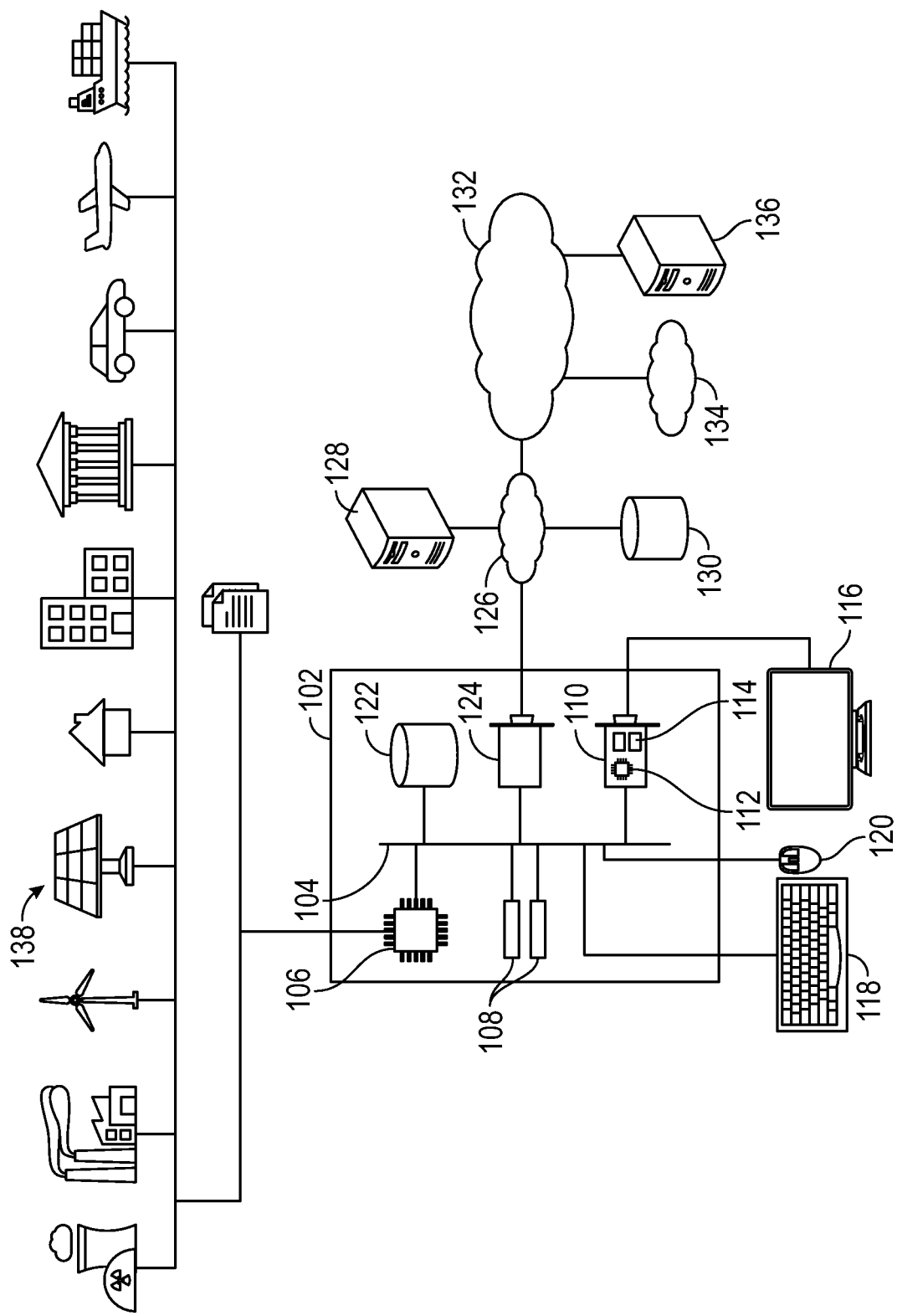
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention provide for an interface for visualize resource allocation and algorithms for the reallocation of resources to achieve a goal. By visualizing the starting state, the ending state, and the transition between them, stakeholders can more easily grasp the path of a transition to a less ecologically harmful energy source balance. At the same time, the algorithm determines not merely the best final allocation of those energy sources, but an incremental path of the transition that is technologically and economically feasible.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is a processor 112 and GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Also depicted in FIG. 1 are a variety of data sources 138 used for classification, assignment of energy sources to an entity and/or region, timescale, etc. by applying appropriate unit conversions (e.g., between Watts, BTU, joules, kWh, volts, gallons, tons, ktoe (kilotonne of oil equivalent), therms, cubic feet, parts per million). Data may be stored in a database accessible over a network or locally. Real-time and/or live data can also be continuously received from a network device or data acquisition machine; similarly, historical or archival data can be accessed from a database, input via document ingestion, or directly entered by a user or another entity on user's behalf. In some exemplary embodiments, the data sources 138 may be energy sources generating energy such as through nuclear, coal, wind, and solar power. The data sources 138 may also be energy consumption through public and private social infrastructure and transportation. In some embodiments, the data sources 138 may be analyzed and displayed along with the analysis as described in embodiments below.

Figure 2:
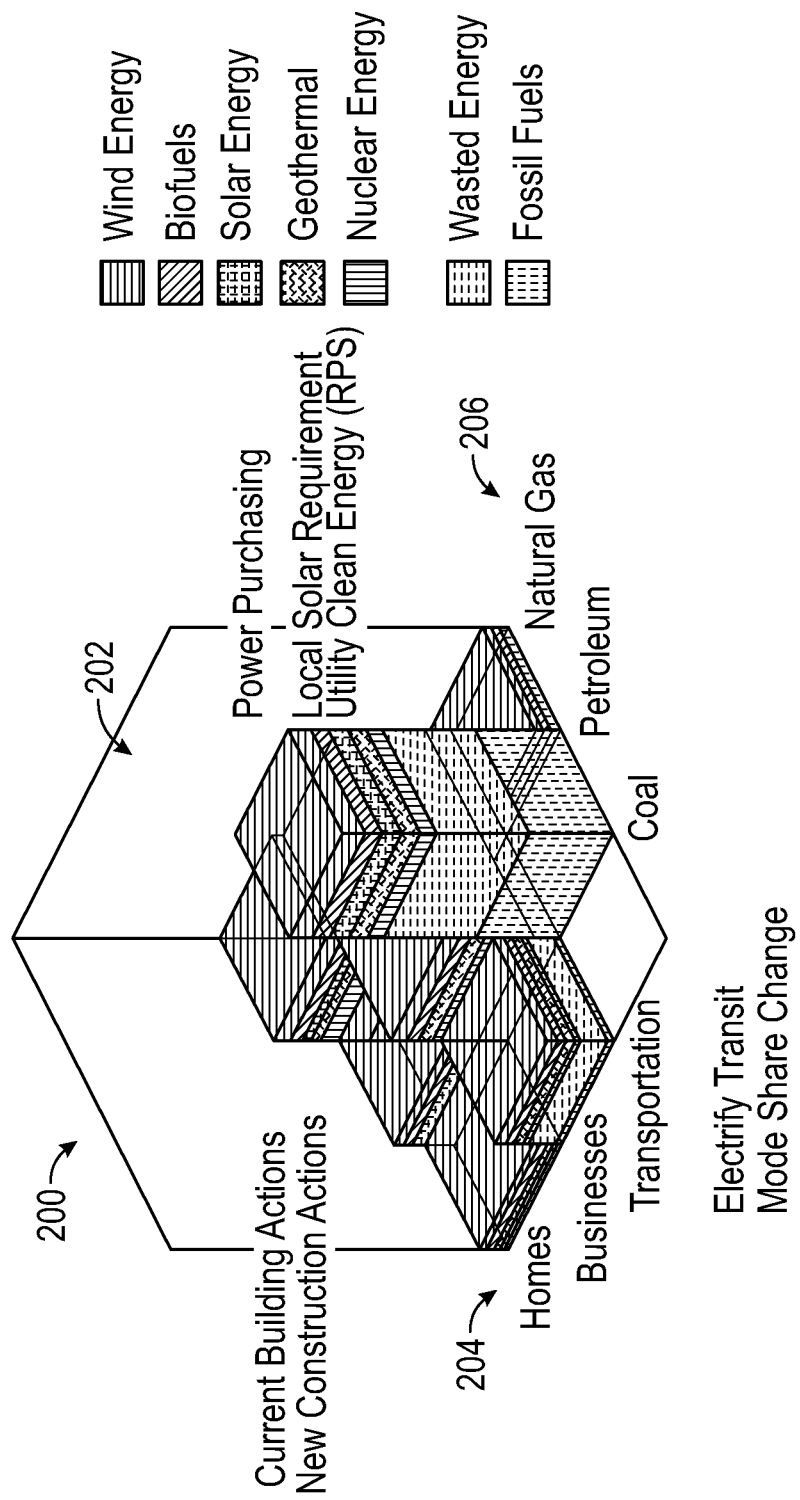
FIG. 2 depicts an exemplary display of a user interface presenting a three-dimensional data visualization in accordance with embodiments of the invention.

Turning now to FIG. 2, an exemplary display of a user interface in accordance with embodiments of the invention is depicted and referred to generally by reference numeral 200. As shown, the user interface 200 depicts a multidimensional data visualization 202 ideal for analyzing breakdowns of a whole from the data sources 138 along multiple axes simultaneously. As shown, for example, the whole of a city's greenhouse-gas-generating energy consumption is shown, broken down on a first axis, let's say J, by a consuming sector 204 of a carbon-based fuel (for example, "residential," "business," and "transportation") and on a second axis, let's say K, by the particular type of carbon-based fuel 206 (for example, "coal," "petroleum," and "natural gas"). Thus, for example, it can readily be seen that little or no coal goes towards powering transportation. Instead, by far the largest share of carbon-based fuel used in transportation is petroleum-based. In some embodiments, the amount of greenhouse gasses generated by each sector-type category can be depicted instead of the amount of energy consumed.

Also shown in the user interface 200 is the amount of energy consumed 208 in each sector-type category that is wasted. The source of the wastage may differ in different categories. The proportional amount may be visualized by the height of the sector-type category along the third axis. For example, the wastage in the transportation-petroleum category may include energy consumed in transporting crude oil to refineries, energy consumed in refining the crude oil into gasoline and diesel fuel, and energy consumed in transporting the fuels to fueling stations. The transportation-petroleum category has relatively low impact from wind, biofuel, solar, geothermal, and nuclear energies. Evaluating the data sources 138 in this way, when determining how best to reduce greenhouse gas emissions, the indirect contributions of each sector-type can be taken into account as well as the direct contributions.

In some embodiments, the first and second axis of the visualization display the data source, or energy sources, coal, petroleum, and natural gas and the energy transitions or consumption processes: homes, business, and transportation, as displayed. In some embodiments the energy sources may be wind, solar, water, or any other method of generating energy and the consumption may be more detailed, or sub-categories, such as airplanes, automobiles, and boats. Further, the sub-categories may be provided in drill-down visualization methods described below.

Figure 3A:
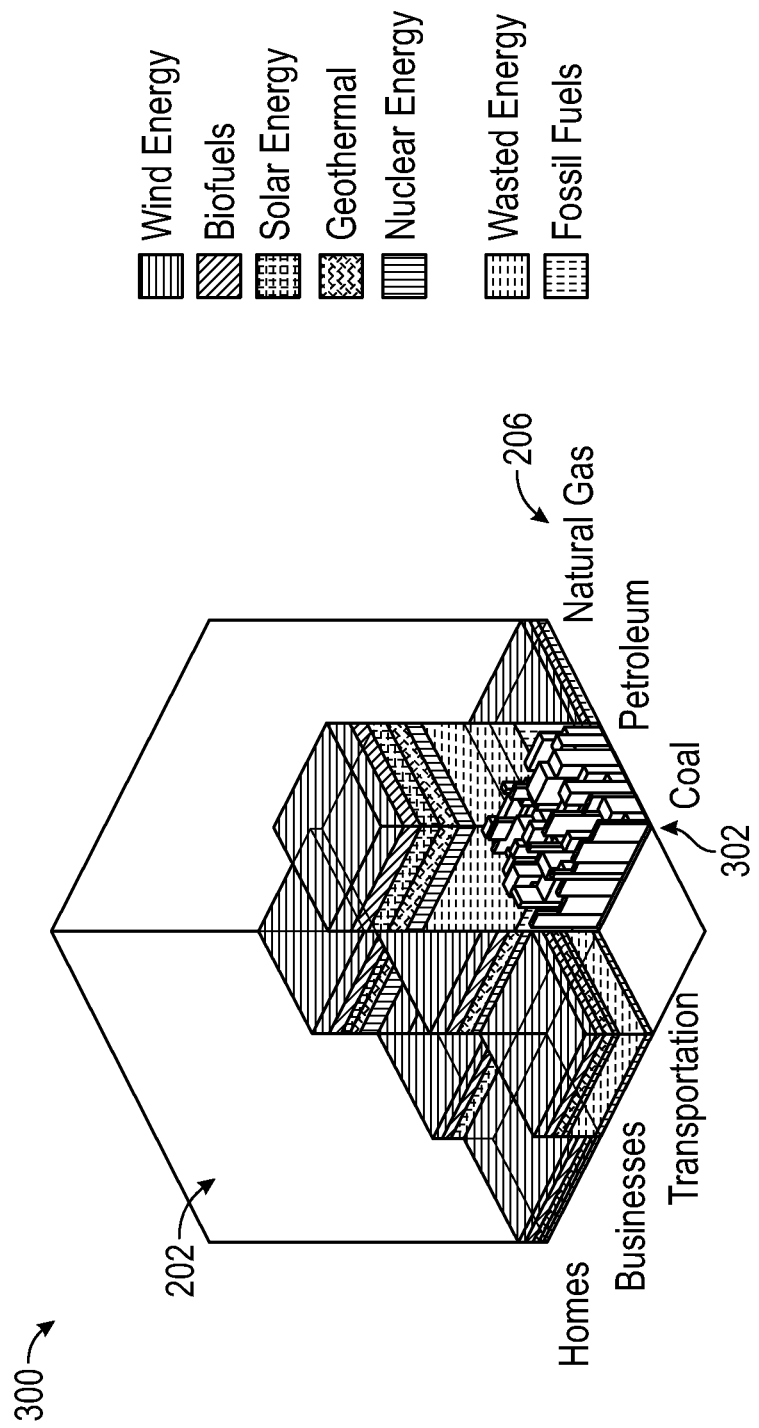

Turning now to FIG. 3A, a second view of the user interface is depicted and referred to generally by reference numeral 300. FIG. 3A depicts a drill-down view 302 of a particular sector-type category. For example, the transportation-petroleum category might be further broken down into subcategories, $X_X$, along the transportation axis into "ships," "cars," "motorcycles," "trains," "planes," "trucking," and so forth, while the petroleum axis might be broken down into, for example, "residual oil," "motor gasoline," "jet fuel," "diesel," and so forth as $Y_k$. Breaking down the axis into further sub-categories, or subsets, allows a user to visualized how each individual resource is consumed on the same data display.

In some embodiments, the breakdown of a particular axis is constant among the various categories and sub-categories of the other axis. Thus, for example, a "home heating oil" category would appear as a sub-category for petroleum even in the intersection with "transportation" where home heating oil is used little or not at all. In other embodiments, drill-down view 302 filters out inapplicable categories such that a "jet fuel" category is present in the drill-down view of the intersection of "transportation" and "petroleum" but not in the drill-down view of the intersection of "home" and "petroleum." Similarly, in such an environment, "home heating oil" would be a subcategory of petroleum in the drill-down view of its intersection with "home" but not in the drill-down view of its intersection with "transportation." Drill-downs are possible for a particular sector-type category, across an entire sector or category, or within a particular layer. This can be represented using relational algebra syntax as described below.

After classification of resource type $Y_k$, time, t, usage location, p and entity S, the visual can be decomposed into more granular representations according to some standardized attribute (i.e. after conversion to the same or comparable physical units), such as distributions in terms of quantity, amount or density, as depicted in FIG. 3B. The standardization allows for relative comparison such that a user may easily visualize the usage and waste of the resources for each resource/energy consumption process. FIG. 3B depicts the cube visualization on the user interface 200 from above along with a drilled-down visualization 304. As shown, the top-view of the bottom layers of each individual layer can be converted to a two-dimensional x-y grid, where the values are laid across a spectrum 306. As shown in FIGS. 3B-E, the spectrum 306 may be provide texture. It should also be contemplated that the spectrum 306 may be a color spectrum, such as with lighter colors signifying lower values, and darker colors as higher values. The representation may also present textures, shading, lines, dots, or any other method of displaying various sections. For example, shades of color may be equivalent to height in the z-direction in the three-dimensional representation. The spectrum 306 may present a two-dimensional data visualization that may be easier to understand when many inputs are compared. Thus, the exemplary spectrum 306 provides a quick and easily understandable magnitude to the visualizations for a particular cross section of the graph.

Given three tables $T_1$, $T_2$, $T_3$ corresponding to "residential home" (J=1), "commercial and industrial business" (J=2) and transportation (J=3) sectors, with each table containing information about consumption (in a given sector) of different types of energy source $Y_k$ (synonymous to $A_{i...N}$ and $B_{i...m}$) distributed over geographic regions, p (for countries, states, cities, zipcodes) and time. t (for years, months, days, seconds), relational algebra operations can be used to represent and various input information from $T_1$, $T_2$, $T_3$ for use in interface visualization, and/or optimization algorithm introduced later.

The system can aggregate J=1,2,3 sheets to make a treemap (302) where only environmentally harmful energy sources are shown. By eliminating unnecessary data columns using the operation of projection, filtering for this data can be performed:

$$\Pi_{K,Y,J=1}(T_1)$$

$$\Pi_{K,Y,J=2}(T_2)$$

$$\Pi_{K,Y,J=3}(T_3) \quad (1)$$

where $T_j$ is the table corresponding to the sheet J=1. Now, renaming the column "J=j" to "J" for all j=1,2,3:

$$\rho_{J/J=1}(T_1)$$

$$\rho_{J/J=1}(T_1)$$

$$\rho_{J/J=1}(T_1) \quad (2)$$

Finally, a new table is created with columns "K","Y", "J", etc. and whose rows are obtained by summing "J" values of corresponding rows of $T_1$, $T_2$, $T_3$ (note that rows of $T_1$, $T_2$, $T_3$ differ only in the "J"th column):

$$T = \Sigma_J(T_1, T_2, T_3). \quad (3)$$

Here $\Sigma_J(T_1, T_2, T_3)$ denotes the row-wise summation table of $T_1$, $T_2$, $T_3$.

The system can aggregate J=1,2,3 for a particular geographic region, p or a time interval, t. For this, $T_1$, $T_2$, $T_3$ depend on an artifact R (considered earlier as dots on map (e.g., point diameter 316), or shape boundary (e.g., polygons 314) and time t, where t is given in one of the formats: "year", "year"/"month", "year"/"month"/"day" or "year"/"month"/"day"/"HH:MM:SS". Therefore, the above mentioned aggregation may be performed at the level of each geographic region represented by the topographical map 308 and for every moment/interval of time.

The above-described aggregation may be performed for p=NYC and on the day t=2019/03/21. Steps (1) and (2) may be repeated for tables $T_1(R,t)$, $T_2(R,t)$, $T_3(R,t)$, where R runs through all artifacts whose geographic coordinates gis(x,y) are in p=NYC. Finally, the following summation operation is performed:

$$T(R,t) := \Sigma_J(T_1(R,T), T_2(R,t)T_3(R,t)), \quad (4)$$

and then one more summation over all artifacts R that are in p=NYC:

$$T(p,t) := \Sigma_J(\{T(R,t): R \text{ is such that } gis(R) \in p\}). \quad (5)$$

In the last formula the summation operation is applied to tables T (R,t) along the column J. The resulting tables may be aggregated for p=NYC over a time interval, say from $t_1$=2019/01/01 to $t_2$=2019/06/30. The system then sums tables (5) (for appropriate t's, where t runs through all days between $t_1$ and $t_2$.):

$$T(p,[t_1,t_2]) := \Sigma_J(\{T(p,t): t_1 \leq t \leq t_2\}). \quad (6)$$

The system can search by extent or text identifier of a region, such as any given p (say New York City). In order to do this aggregation just at the level of one city or region p, the earlier steps can be repeated for $T_1(R)$, $T_2(R)$, $T_3(R)$ for all artifacts R whose coordinates g is (x,y) belong top across different energy types, as shown in the drill down visualization 304. Here $T_j(R)$ is the table of the artifact R corresponding to the sector j=1,2,3; one can obtain it by summing $T_j(R,t)$ which was introduced earlier, over $-\infty < t < +\infty$ where t can vary from the first to the last time record.

$$T_1(R) = \Sigma_{J=1,1,\ldots,9}(\{T_1(R,t): -\infty < t < \infty\}),$$

$$T_2(R) = \Sigma_{J=2,1,\ldots,8,17}(\{T_2(R,t): -\infty < t < \infty\}),$$

$$T_3(R) = \Sigma_{J=3,1,\ldots,8}(\{T_3(R,t): -\infty < t < \infty\}), \quad (7)$$

where $\Sigma_{i_1,\ldots,i_d}(\{T_j(R,t): -\infty < t < \infty\})$ denotes the table obtained from tables $T_j(R,t)$ by summing them column-wise along columns $i_1, \ldots, i_d$.

Applying steps (1) and (2) to $T_1(R)$, $T_2(R)$, $T_3(R)$ the system obtains a table $T(R) := \Sigma_J(T_1(R), T_2(R), T_3(R))$, which is the analogue of (3) for an individual artifact R, which can be vehicles, factories, power plants, buildings etc. Finally, performing the summation operation over all artifacts R whose coordinates g is (x,y) are in p:

$$T(p) := \Sigma_J(\{T(R): R \text{ is such that } gis(R) \in p\}). \quad (8)$$

To filter and conduct an aggregation from 1 for a given t (say t=2007), the system takes tables $T_j(R,t)$, j=1,2,3, and aggregates the result over all R, and not confined to just one p:

$$T(t) := \Sigma_J(\{T(R,t): R\}). \quad (9)$$

To aggregate for all regions p, for a time internal, such as from $t_1=2010$ to $t_2=2020$, it will be done similar to $[t_1, t_2]$ and for a given city/region p, aggregated over all p:

$$T([t_1,t_2]) := \Sigma_p(\{T(t): t_1 \leq t \leq t_2\}). \tag{10}$$

Within these, it is also possible filter only for a given sub-category, X=4 (cooking) and fuel type, Y=21 (K=B=2; kerosene) at J=2, but from $t_1=2010$ to $t_2=2015$. The row Y=21 (kerosene) of tables $T_2(R,t)$ allows extraction of only this row using selection operation:

$$\sigma_{Y=21}(T_2(R,t)). \tag{11}$$

The table $T_2(R,t)$ has only one row (and same columns as before) and given the specific interest in the column X=4 (cooking) the system removes other columns via projection operation:

$$\Pi_{K,Y,X=4}(T_2(R,t)) \tag{12}$$

The only place where tables $T_2(R,t)$ differ (for different R and t) is the value in the column X=4 (in the unique row Y=21). To make aggregation over R:

$$T_2(t) := \Sigma_{X=4}(\{T_2(R,t): R\}), \tag{13}$$

where summation is along column X=4 (in (9) this was column J). To extract information over a time period $[t_1, t_2]$, the system performs the following operation:

$$T_2([t_1,t_2]) := \Sigma_{X=4}(\{T_2(t): t_1 \leq t \leq t_2\}), \tag{14}$$

where the summation is along column X=4.

Figure 3C:
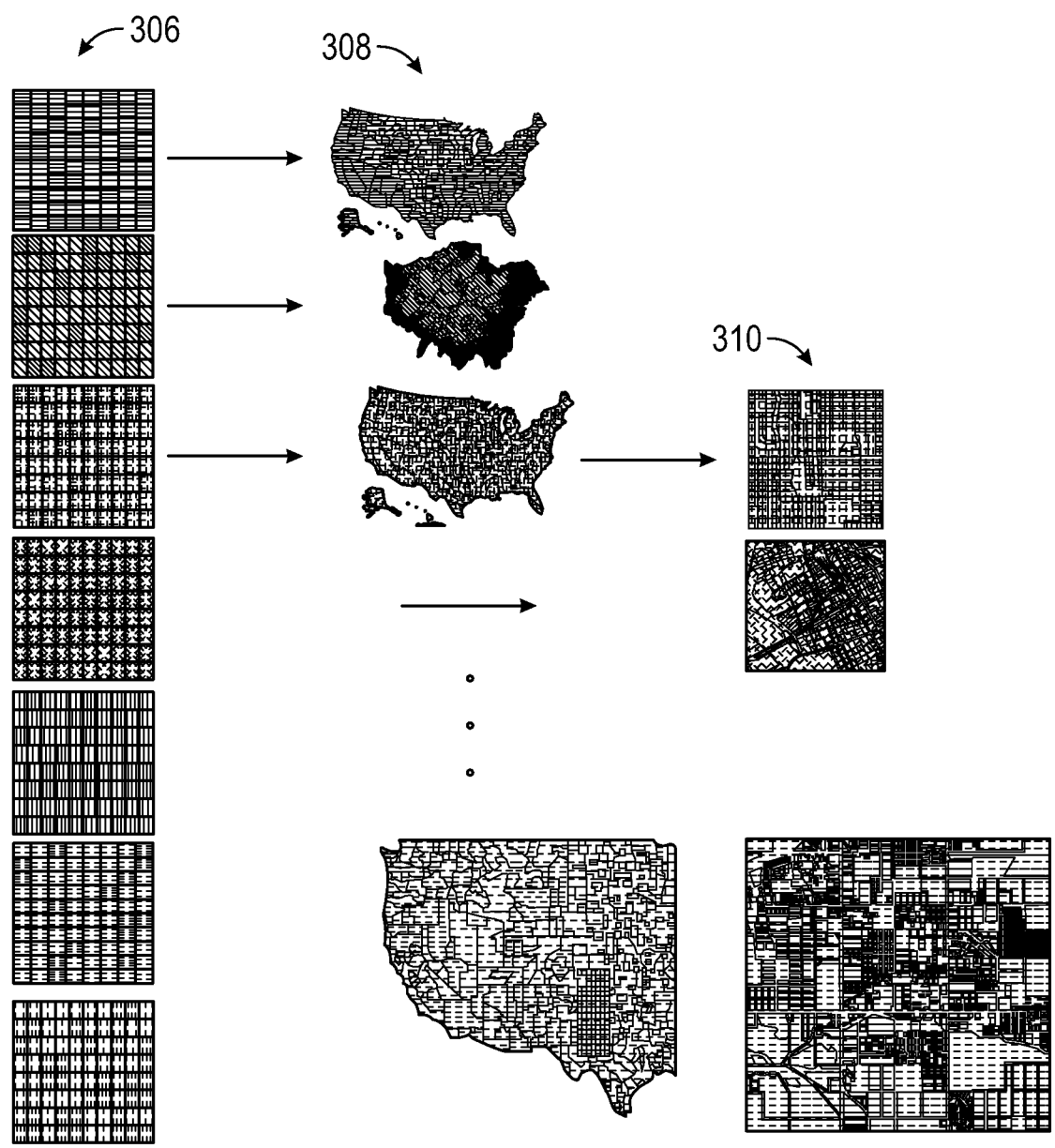

As shown in FIG. 3C, the arbitrary positioning of the grid of FIG. 3B could be overlaid on more understandable geospatial grids, such as on topographical maps 308, or neighborhood blocks 310. Users can filter by type, such as flow types (input, output, total, wasted, or remaining), transformation flows (input, output, wasted, or consumed); or per-user flows of any type. For example, the country can be broken down into states, cities, counties, or even further. Each of these locations may be analyzed based on resource consumption in each category as described above. Using notation from relational algebra, we can consider tables which store these values in and conducting operations to extract necessary information.

Figure 3D:
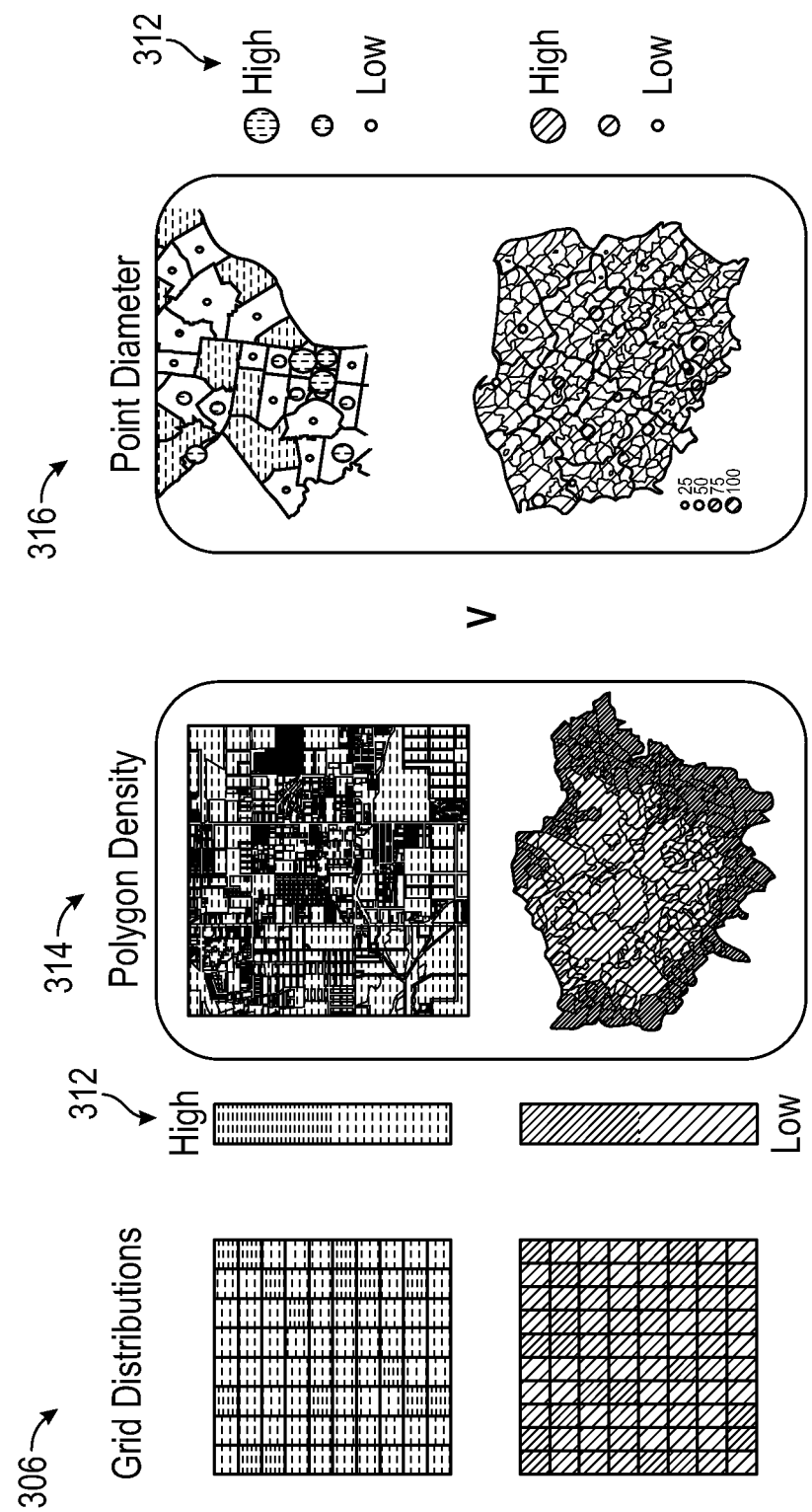

Any identified entity and its data attributes can be further explained or visualized in multiple different ways. For example, the visualization may be provided in the grid distributions as described above or either as polygons of a predetermined shape, or as the diameter of a sphere, circle, or other shape which is centered at the centroid of a uniquely identified location or entity, as shown in FIG. 3D. The grid distributions, or spectrum 306 may be shown with a relative low-high indicator 312. In some embodiments, the low-high indicator may be colored to show the difference from low to high. Further, the grid may be broken down into more defined polygons 314. Further still, the relative magnitude of each region may be represented by a relative size of a shape, for example the size of the circles in the point diameter map 316. Any shapes and combination of shapes, textures, colors, and maps may be contemplated for visualization of data.

Figure 3E:
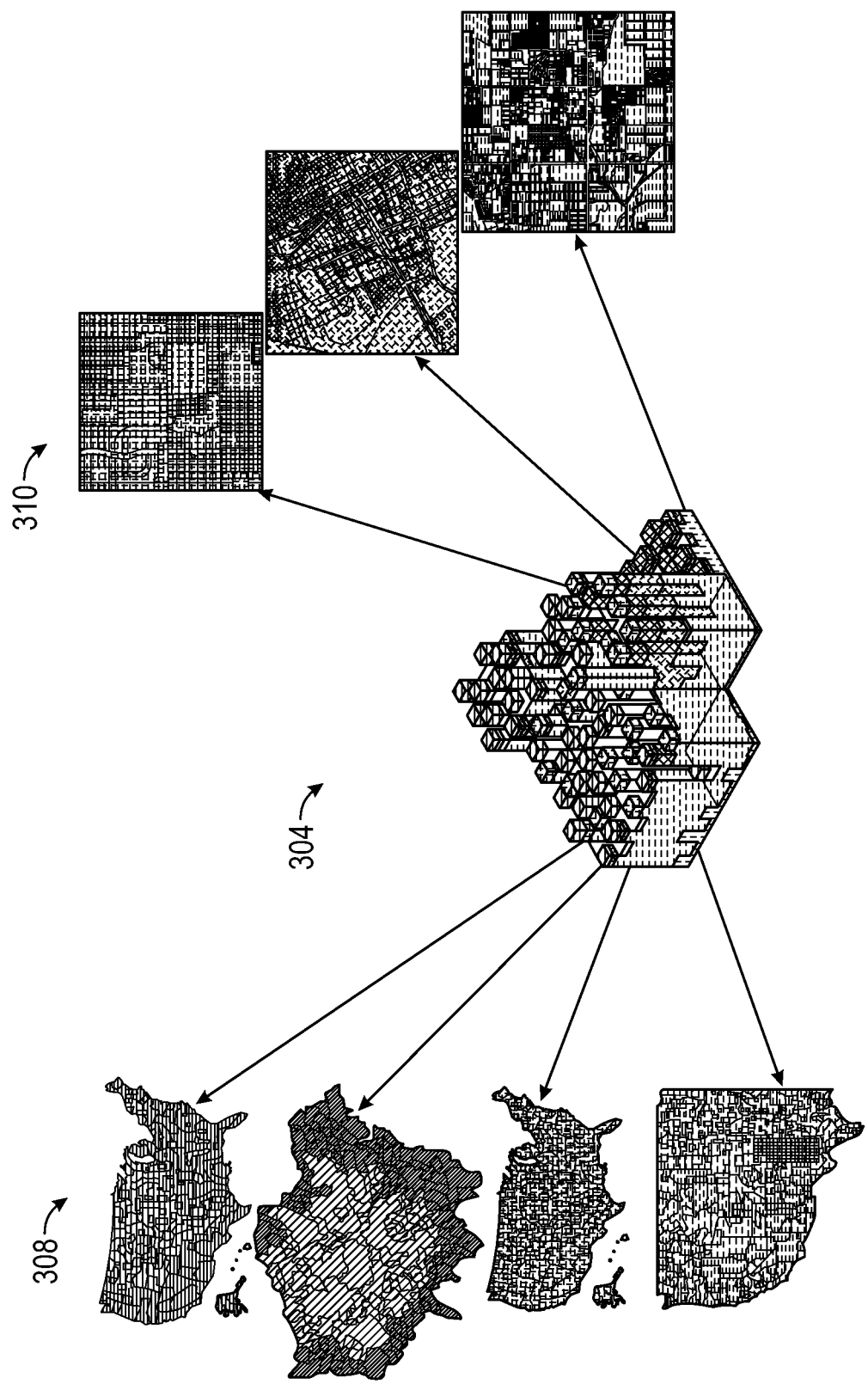

As depicted in FIG. 3E, embodiments of the invention may store polylines, features, feature-sets and feature-collections for each item, data point or element, searchable by extents. The user interface 200 in FIG. 3E depicts the drilled-down visualization 304 along with the topographical maps 308 and the more reduced geographical data set down to neighborhood blocks 310. This could be stored in multiple framework, datatypes, vectors, and languages such as JSON etc. This enables the user and other entities, such as regulators or solution providers, to more efficiently locate consumption patterns and evaluate deployment, or allocation of resources, to meet targets and goals, according to optimization principles discussed here, or other methodologies.

Figure 4:
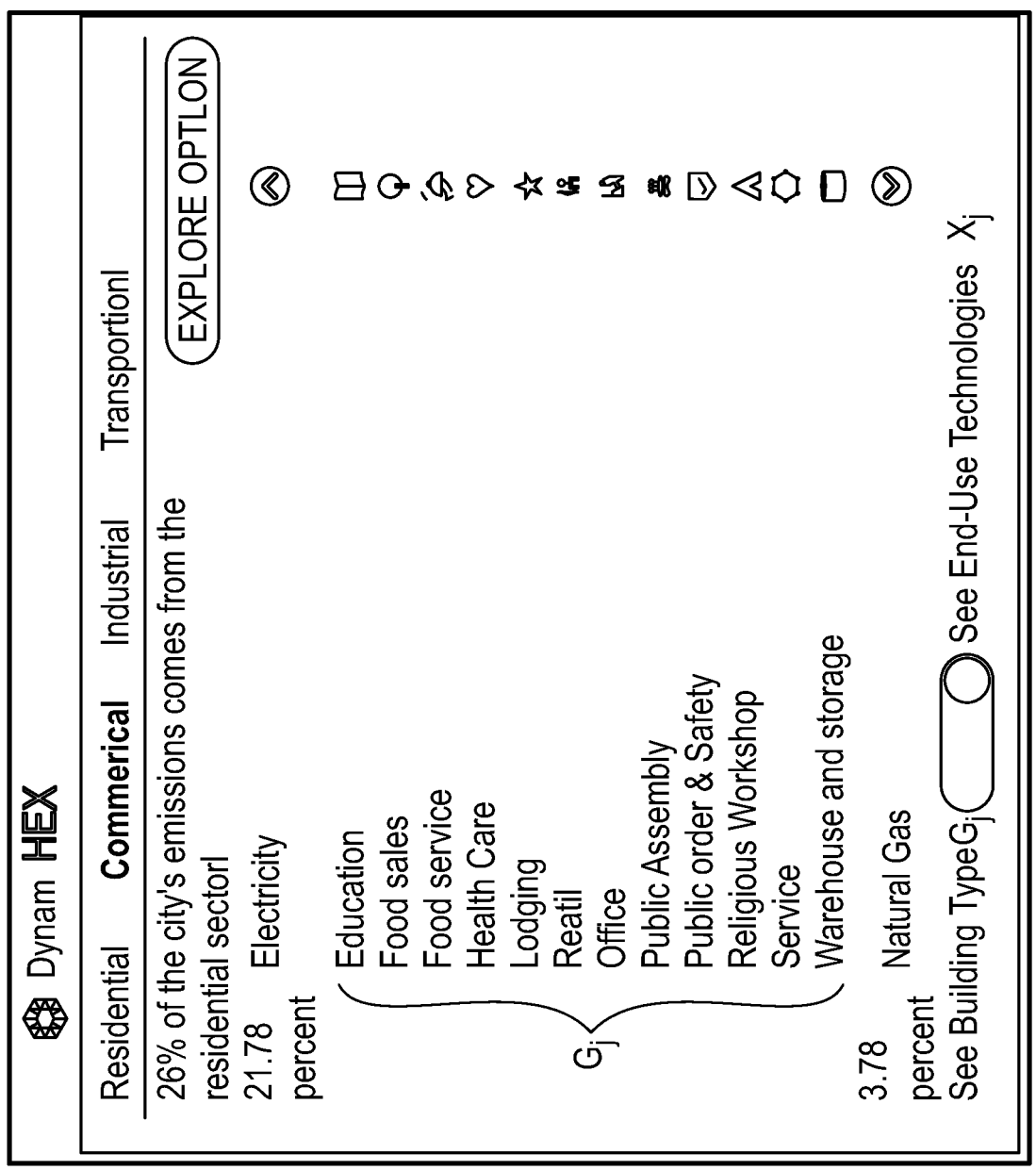
FIGS. 4-7 depict embodiments of relational queries.

Exemplary queries are described below. FIGS. 4-7 depict exemplary embodiments of the queries described below. FIG. 4 depicts at least part of an interface where different J sectors are divided into $G_j$ subsectors, with options to switch to $X_j$ end-use types. These filters invoke the queries where different $Y_k$ energy types can be used to estimate emissions and their proportions (percentages) as shown in Query 3 and Query 4 below.

Figure 5:
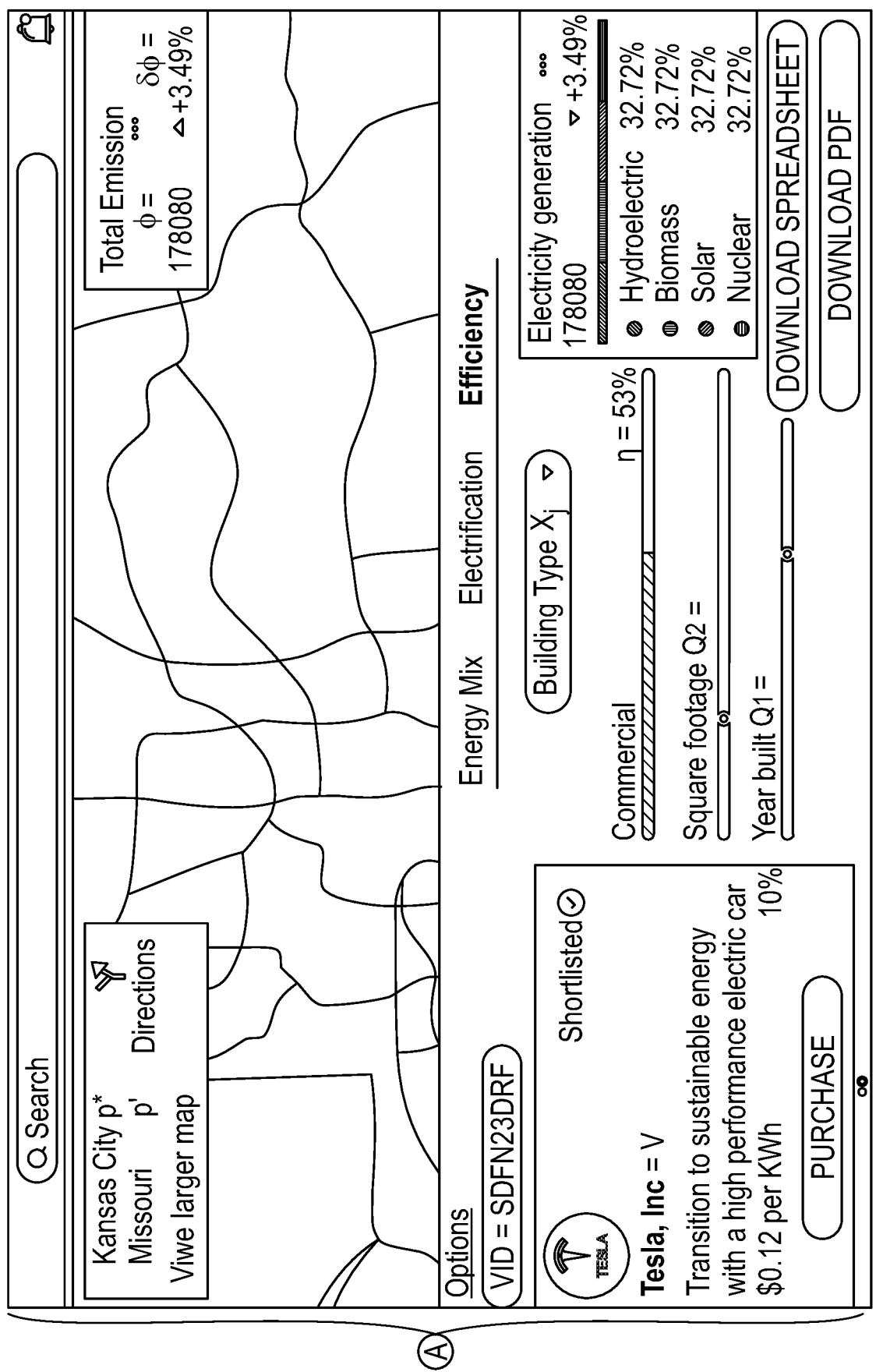

FIG. 5 depicts at least part of an interface where geospatial data details are visualized for a given city or location, p and given time t. The interface helps user select a set of R's for any given restrictions, such as Q (Query 1), η(Query 2) by using emissions factors (Query 6).

Figure 6:
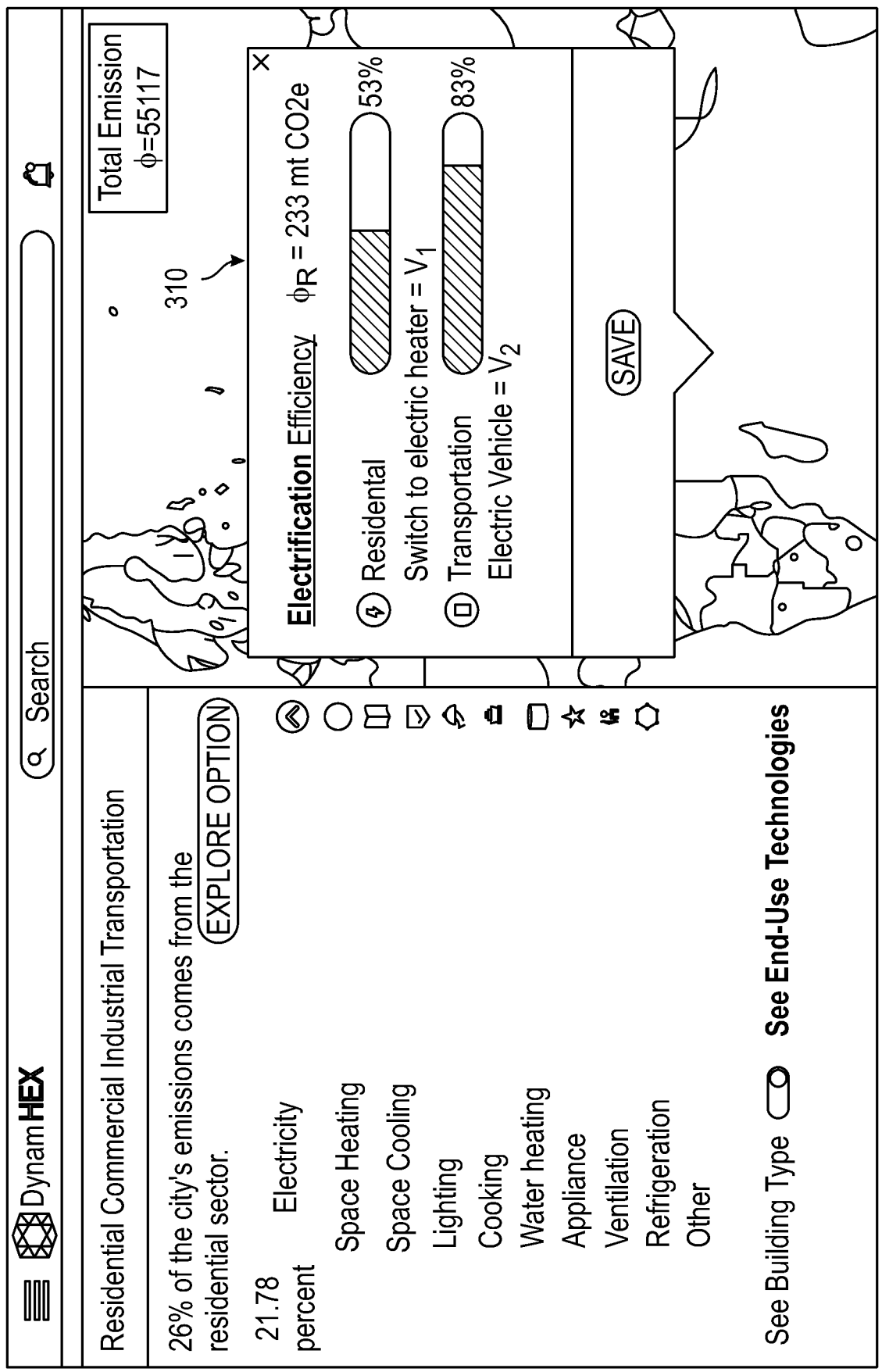

FIG. 6 depicts how different elements of the geospatial map can visualize different data entities for each R (shown in Query 5 and Query 8 below).

Figure 7:
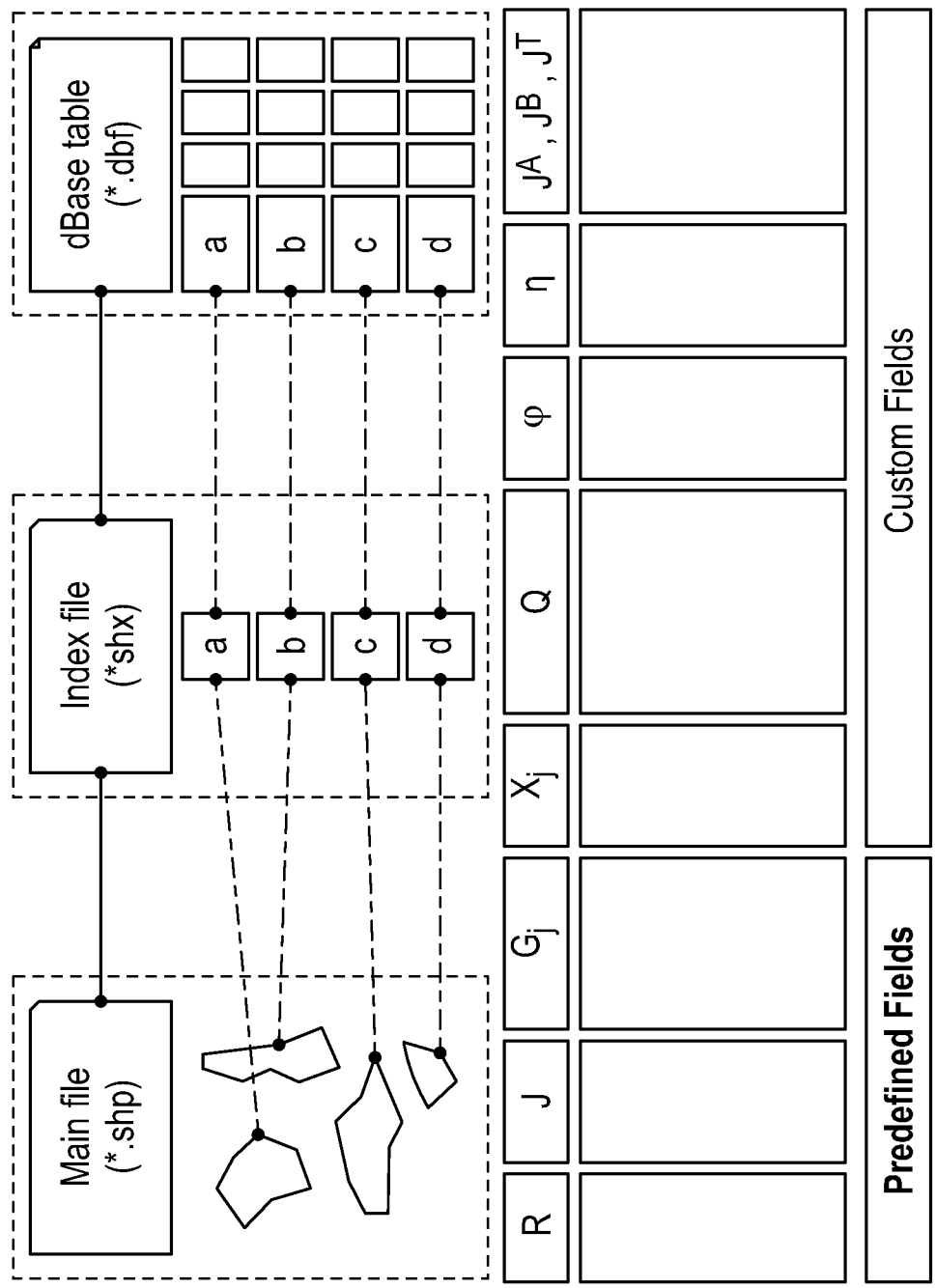

FIG. 7 depicts tabular formats of storing geospatial information at the $R^{th}$ level and aggregating to the regional $p^{th}$ level.

Query 1

The queries descried above and below, are shown in FIGS. 4-7 described above. The system can extract a set of artifacts R (buildings) from the table J1 (residential sector) that are built in the year $Q1=Q1_b$ (say $Q1_b=1977$) and have square footage between $Q2_{min}$ and $Q2_{max}$ (say $Q2_{min}=1200$ and $Q2_{max}=1300$). By applying the operation of selection of rows with a specified year and square footage:

$$\sigma_{Q_{min} \leq Q2 \leq Q2_{max}} \sigma_{Q1=Q1_b}(J1) \tag{15}$$

The table J1 now contains only those rows with year $Q1_b$ and whose square footage is between $Q2_{min}$ and $Q2_{max}$. If a user uses the system to extract only the ID numbers of those artifacts, this can be done by projecting everything on the corresponding column:

$$\Pi_R(J1) \tag{16}$$

Given a table of unique identifiers (IDs) of these artifacts—the number of which is given by the number of rows in this new table of IDs, such as:

| J1 | | | |
|---|---|---|---|
| R | Q1 | Q2 | all other columns |
| R1 | 1960 | 1494 | ... |
| R2 | 1965 | 1076 | ... |
| R3 | 1977 | 1243 | ... |
| R4 | 1977 | 1802 | ... |

After applying the first selection (artifacts with an appropriate year) we obtain:

| $\sigma_{Q1=1977}(J1)$ | | | |
|---|---|---|---|
| R | Q1 | Q2 | all other columns |
| R3 | 1977 | 1243 | ... |
| R4 | 1977 | 1802 | ... |

Applying the second selection operation, we are left with one row only:

| $\sigma_{1200 \leq Q2 \leq 1300} \sigma_{Q1=1977}(J1)$ | | | |
|---|---|---|---|
| R | Q1 | Q2 | all other columns |
| R3 | 1977 | 1243 | ... |

Finally we project to the column of IDs:

| $\pi_R \, \sigma_{1200 \leq Q2 \leq 1300} \, \sigma_{Q1=1977}(J1)$ |
|---|
| R |
| R3 |

There is only one artifact that meets the two requirements. Any set of parameters can have similar operations conducted, under different conditions and requirements, both on the interface as well as intermediate steps before visualization.

Query 2

Similarly to the above relational query 1, the system can also filter out artifacts (e.g. in the residential sector J1) whose aggregate efficiency factor η is at least 0.6 by applying the selection operation to the corresponding column:

$$\sigma_{\eta \geq 0.6}(J1) \tag{17}$$

After this operation the table J1 contains only those artifacts whose efficiency factor satisfies η≥0.6, as shown:

| J1 | | |
|---|---|---|
| R | η | all other columns |
| R1 | 0.34 | ... |
| R2 | 0.91 | ... |
| R3 | 0.45 | ... |
| R4 | 0.65 | ... | only R2 and R4 satisfy the condition η≥0.6. Thus, applying further queries to this table, the resulting table is:

| $\sigma_{\eta \geq 0.6}(J1)$ | | |
|---|---|---|
| R | η | all other columns |
| R2 | 0.91 | ... |
| R4 | 0.65 | ... |

Query 3

The system can compute by summing emissions φ, for specific $X_j$ by extracting rows with $X_j=1$ in a given J and return the total emission $\phi_{J,X_j=1}$, and then represent this as a fraction of J or total Js. This is achieved by computing a fraction of $\phi_{J,X_j=1}$ and $\phi_J$ and a fraction of $\phi_{J,X_j=1}$ and $\phi = \Sigma_J \phi_J$ in the following ways: To each artifact R, the system can associate the corresponding aggregate emission φ(R) and storing it in the corresponding column. To compute the total emission of all artifacts in the residential sector J1 that have a non-zero consumption through sub-sector $X_j$, the system selects those rows in the table J1 that have 1 in the column $X_j$ and computes the sum of values in the column Φ of the modified table:

$$SUM_\Phi(\sigma_{X_j=1}(J1)), \tag{18}$$

where $SUM_C(T)$ is the relational algebra operation of the summation of the values in the corresponding column C of the table T. To compute the ratio of emissions from artifacts in J1 that have nontrivial $X_j$ consumption to the total emission in J1, the system may perform the query:

$$\frac{SUM_\Phi(\sigma_{X_j=1}(J1))}{SUM_\Phi(J1)} \tag{19}$$

as well as the ratio of the above numerator to the total emission across all sectors, $$\frac{SUM_\Phi(\sigma_{X_j=1}(J1))}{SUM_\Phi(J1) + SUM_\Phi(J2) + SUM_\Phi(J3) + SUM_\Phi(J4)}. \tag{20}$$

Using a particular example, the system operator functions as follows:

| J1 | | | |
|---|---|---|---|
| R | $X_j$ | Φ | all other columns |
| R1 | 0 | 230 | ... |
| R2 | 0 | 120 | ... |
| R3 | 1 | 430 | ... |
| R4 | 1 | 279 | ... |

430+279=709, since only R3 and R4 have $X_j=1$, where the ratio equals 66%

$$\frac{430 + 279}{230 + 120 + 430 + 279} = \frac{730}{1059} \approx 0.66. \tag{21}$$

Given total emissions in other sectors, the ratio is computed analogously.

Query 4

The system may compute the total emission of all artifacts in a specific subsector or subtype $G_j$ (say $G_j$=Duplex, Single—family, etc.) of the residential sector J1. By first extracting all rows with $G=G_j$ using selection operation, the system can compute the sum of values in the column Φ of the new table:

$$SUM_\Phi(\sigma_{G=G_j}(J1)). \tag{22}$$

The system further computes the fraction of emissions of artifacts from the subsector $G_j$ relative to the total emission in J1, $$\frac{SUM_\Phi(\sigma_{G=G_j}(J1))}{SUM_\Phi(J1)}, \tag{23}$$

and relative to the total emission across all sectors J1, J2, J3, J4, $$\frac{SUM_\Phi(\sigma_{G=G_j}(J1))}{SUM_\Phi(J1) + SUM_\Phi(J2) + SUM_\Phi(J3) + SUM_\Phi(J4)}. \tag{24}$$

As an example:

| | | J1 | |
|---|---|---|---|
| R | G | Φ | all other columns |
| R1 | Single - family | 130 | ... |
| R2 | Duplex | 340 | ... |
| R3 | Duplex | 503 | ... |
| R4 | Single - family | 189 | ... | where $G_j$ is equal to Duplex, hence 340+503=843 since only R2 and R3 are Duplexes, while the ratio (23) equals 73%

$$\frac{340+503}{130+340+503+189} = \frac{843}{1162} \approx 0.73. \qquad (25)$$

Given the total emission in all 4 sectors, the ratio can be computed analogously.

Query 5

The system can further compute emissions of an artifact in each given energy subtype $Y_k$ and subsector X. For each artifact R there is a table describing its consumptions at each fixed sublevels $Y_k$ and $X_k$, where the emissions of all artifacts in the subsector $X_j$ (of the residential sector J1) that are consuming energy subtype $Y_k$ can be computed.

First, the system calculates (k,j)-emissions of a given artifact R and calls the table with $\Gamma_K$ which contains carbon contents and emissions factors of each energy subtypes of the energy type K, with two columns—energy subtypes and carbon content or emission factor per emission type. This process assumes one factor per type of emission, whereas many types of emissions might be present. These tables are used to compute (k,j)-emissions of R via the formula $$\Phi_{k,j}(R) := \text{SUM}_{X_j}(\sigma_{F=Y_k}(J1(R))) \cdot \text{SUM}_{\Gamma}(\sigma_{F=Y_k}(\Gamma_K)),$$

where $\text{SUM}_C$ simply means the system extracts the element (in the column C) of each of the two tables containing one row only. The computed (k,j)-emission of R is denoted by $\Phi_{k,j}(R)$. Thus the total emission from consumption of the energy subtype $Y_k$ in the subsector $X_j$ is computed via the formula:

$$\Phi_{k,j} := \Sigma_R \Phi_{K,j}(R), \qquad (26)$$

where the summation is performed over all artifacts R in the sector J1. The proportion of this quantity in the total emission in the sector J1:

$$\frac{\Phi_{k,j}}{SUM_\Phi(J1)}. \qquad (27)$$

The system may filter only those artifacts R in the sector J1 that contribute to the (k,j)-emission (26) by first extracting the essential information from the tables J1(R) for all different artifacts R:

$$J1(R)_{k,j} := _{R,X_j}(\sigma_{F=Y_k}(J1(R))) \qquad (28)$$

The new table $J1(R)_{k,j}$ contains only one row (corresponding to $Y_k$) and two columns, R containing information about the artifact, and $X_j$ containing the value of the (k,j)-consumption, where combining all the resulting tables gives:

$$J1_{k,j} := =_R J1(R)_{k,j}, \qquad (29)$$

where the union is over the set of all artifacts in J1. $J1_{k,j}$ is a long table of (k,j)-consumptions of artifacts in J1, where applying the operation of natural join to J1 and $J1_{k,j}$:

$$J1 \bowtie J1_{k,j}. \qquad (30)$$

Gives a table has an extra column $X_j$ containing information about (k,j)-consumptions, from where we can remove those artifacts in J1 that have trivial (k,j)-consumption, $$\sigma_{X_j>0}(J1 \bowtie J1_{k,j}), \qquad (31)$$

and just extract the list of those artifacts in J1 with positive (k,j)-consumption, $$\Pi_R(\sigma_{X_j>0}(J1 \bowtie J1_{k,j})). \qquad (32)$$

In short, working with table J1 and selecting only those rows (R) for which the corresponding (k,j)th entry of the consumption table J1(R) is positive:

$$\sigma_{R:SUM_{X_j}(\sigma_{F=Y_k}(J1(R)))>0}(J1). \qquad (33)$$

Query 6

In order to obtain the table of artifacts in a given sector (say J1) together with their localized (k,j)-emissions, the system may exploit the table $J1_{k,j}$ of (k,j)-consumptions and modify its second ($X_j$) column by multiplying it with the carbon content:

$$\Pi_{R,X_j \cdot SUM_\Gamma(\sigma_{F=Y_k}(\Gamma_K))}(J1_{k,j}). \qquad (34)$$

If carbon contents are constant values and do not vary by sector, location or time, they may have fixed denotions, like $\Gamma_k$ for the carbon content or emissions factor in the energy subtype $Y_k$, which can be simplified as:

$$\phi_{k,j} := \Pi_{R,X_j \cdot \Gamma_k}(J1_{k,j}). \qquad (35)$$

Query 7

The system can further compute the fractions of emissions in a given sector (say J1) relative to the total emission in all 4 sectors:

$$\frac{SUM_\Phi(J1)}{SUM_\Phi(J1)+SUM_\Phi(J2)+SUM_\Phi(J3)+SUM_\Phi(J4)}. \qquad (36)$$

If the values of emissions in sectors were $SUM_\Phi(J1)$=1290, $SUM_\Phi(J2)$=2120, $SUM_\Phi(J3)$=3400 and $SUM_\Phi(J4)$=1780, then the ratio for J1 would be 15%

$$\frac{1290}{1290+2120+3400+1780} = \frac{1290}{8590} \approx 0.15 \qquad (37)$$

Query 8

Knowing for each artifact R the emissions φ as well as the energy consumption by $X_j$ and $Y_k$, the system can aggregate based on the ownership of the artifacts, let's say S individual person (J=1) or individual company or organization (J=2). Getting S-level $\phi_S$ by aggregating $\phi_R$ in the selected p and t. The system will extract all R's belonging to each unique person or organization and compute the total emission of this entity and compare it to the total emission in this J and this city, p in any given time t.

The system can thus compute emissions of artifacts belonging to each entity. For simplicity, only artifacts confined to one city/region p is considered in this example, but this operation can be done across every city. Given that there is a table S encoding the relation between unique artifacts R and unique individuals S (ID number). If the system wants to solve the above computation for the individual with the ID number i, it filters all artifacts in S belonging to i:

$$S_i := \sigma_{1=i}(S) \tag{38}$$

Then, the natural join operation of $S_i$ with J1:

$$S_i \bowtie \phi_{k,j}, \tag{39}$$

where $\phi_{k,j}$ is the table of emissions in J1. By joining rows from $S_i$ (corresponding to artifacts R) with the corresponding rows in $\phi_{k,j}$. The summed emissions in the resulting table to compute an entity's emissions in a given city/region, p over time, t is given by:

$$\Phi_{k,j}(i) := \text{SUM}_{X_j^i}(S_i \bowtie \phi_{k,j}). \tag{40}$$

The system can also compare the computed entity's emissions to the total emissions in J1 sector by computing the respective fraction:

$$\frac{\Phi_{k,j}(i)}{SUM_\Phi(J1)}. \tag{41}$$

In some embodiments, the width of a particular category or subcategory on one axis may be proportional to the total amount of that category or subcategory relative to the other sub-categories. For example, if petroleum makes up 50% of fossil fuel usage, natural gas makes up 40% and coal makes up 10%, then the width of the petroleum bar on the type axis may be five times that of the coal bar, and so forth. The same bar scaling techniques can be applied on the sector axis, such that the bar for businesses is twice the depth of the bar for residential if business use accounts for twice as much fossil fuel consumption as residential use. In other embodiments, bars have equal widths and depths. In still other embodiments, bars of fixed and variable width and depth may be combined. For example, bars of fixed depth may be combined with bars of variable width, or bars of fixed with and depth at the top level may be combined with bars of variable width and depth at the drill-down level. Other combinations are also contemplated as being within the scope of the invention.

In some embodiments, user interface 200 is operable to track trends over time as well as evaluate the data at a particular point in time such as the present. For example, user interface 200 may include a slider to adjust the point in time for which the data is displayed. Alternatively or in addition, user interface 200 may animate to display trends in the data over time. This can be done via Queries 1-8 and FIGS. 4-7 described above. In some embodiments, the animation may display the current view (the full view or the drill-down view) as it changes over time. In other embodiment, the animation process resets the view to the full view. The user interface 200 may also display future projections. User interface 200 may also animate in other ways. For example, the viewing angle may rotate around the z-axis so as to better display, for example, sector-type categories or subcategories that would be obscured by other categories or subcategories. In still other embodiments, various greenhouse gas reduction strategies and models (as further discussed below) can be animated. For example, given a model for reducing the greenhouse gas emissions from a particular sector, the animation may show the projected future breakdown of the energy use in that category by non-carbon-based energy sources as time progresses.

In particular, user interface 200 may be used to generate or examine a greenhouse-gas mitigation strategy. In some embodiments, various sources of power may be colored differently. For example, carbon-based fuels may be dark grey or black, with wasted energy colored grey. By contrast, alternative, non-greenhouse-gas generating fuels may be green, or otherwise brightly colored. Thus, in such embodiments, as the energy mix becomes less carbon-dependent, user interface 200 will transition from black and grey to bright and multicolored.

The user interface 200 may show trends past, present, and future based inputs into the system and how the trends may react and changed based on the inputs. An algorithm for optimizing resource allocation and usage is described below.

Exemplary Implementation of the Algorithm

As mentioned previously, embodiments of the invention can be employed to generate or examine a greenhouse-gas mitigation strategy. Described below are two linear programming implementations of how such a model can be generated. The two programming implementations described below describe methods of receiving inputs of source data from benign and harmful energy sources, determining energy used and energy wasted by transfer processes. Further, the programming implementations provide methods of allocating the resources to minimize the harmful energy sources and maximize the benign energy sources. Further, the resource data from the inputs, the energy used and wasted in the transfer processes, and the optimization data and allocation data may be provided in the visualizations depicted in the figures.

Consider a system where input sources, Z(t) could be distributed into two main groups, either through discrete categorization (binary groups) or ranked according to a continuous value of ecological or environmental value creating or value destroying. Notation for describing the modelling process is given below.

A(t) is the total amount of resources coming from an ecologically benign source in any given time or period, and B(t) is the total amount of resources coming from an ecologically harmful source in any given time or period. Then Z(t)=A(t)+B(t). T broadly represents transformations of resources. T(t) is any transformation step that takes the intermediate source of resource before converting the resource to different form, TA(t) is the inflow of a given transformation step T(t) that takes the intermediate source of resource from an ecologically benign source A(t) before converting the resource to different form, and $T^B$(t) is the inflow of a given transformation step T(t) that takes the intermediate source of resource from an ecologically harmful source B(t) before converting the resource to different form. Then, following from the above, T(t)=$T^A$(t)+$T^B$(t).

Figure 8:
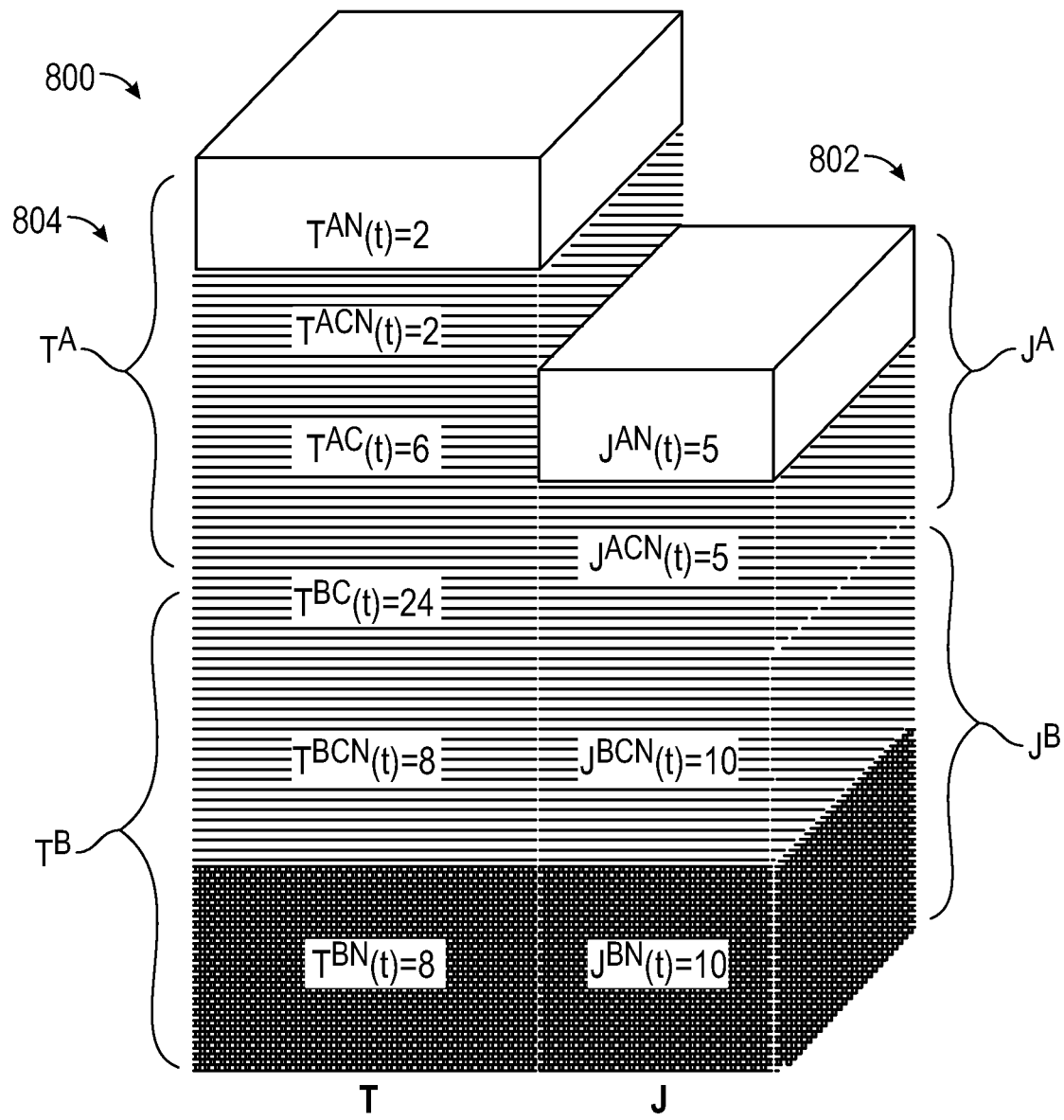
FIG. 8 depicts one sector-type category of the user interface of FIG. 2 decomposed into inflows and transformations.

Next, J broadly describes the inflow of resources. $J^{(i)}$(t) is any inflow of resources transformed by step T(t) and then consumed by the $i^{th}$ end-user J. As an example, $J^{T^{(1)}}$(t) represents the amount of T transformed resources consumed by $J_1$. $J^{A^{(i)}}$(t) and $J^{B^{(i)}}$(t) is any inflow of resources consumed by the $i^{th}$ end-user J, of form A, derived from A(t), and of form B, derived from B(t), respectively, such that $J^{(i)}$(t)=$J^{A^{(i)}}$(t)+$J^{B^{(i)}}$(t)+$J^{T^{(i)}}$((t). FIG. 8 depicts one sector-type category 800 of user interface 200 decomposed into inflows 802 and transformations 804. As such, FIG. 8 depicts the relative relationship of the inflow from a benign source $J^A$, the inflow from a harmful source $J^B$, the transition of the inflow from the benign source $T^A$, and the transition of the inflow from the harmful source $T^B$.

J can broadly be decomposed into N and M. $N^{(i)}$(t) is any inflow of resources that is unconsumed or wasted by the $i^{th}$ end-user J, and thus, not directly used. As an example, $N^{(1)}$(t) represents the amount of resources unused by $J^{(1)}$. $M^{(i)}$(t) is any inflow of resources, that represents total resource inputs used by the $i^{th}$ end-user J, and thus, directly used. As an example, $M^{(1)}(t)$ represents the amount of resources used by $J^{(1)}$.

Figure 9:
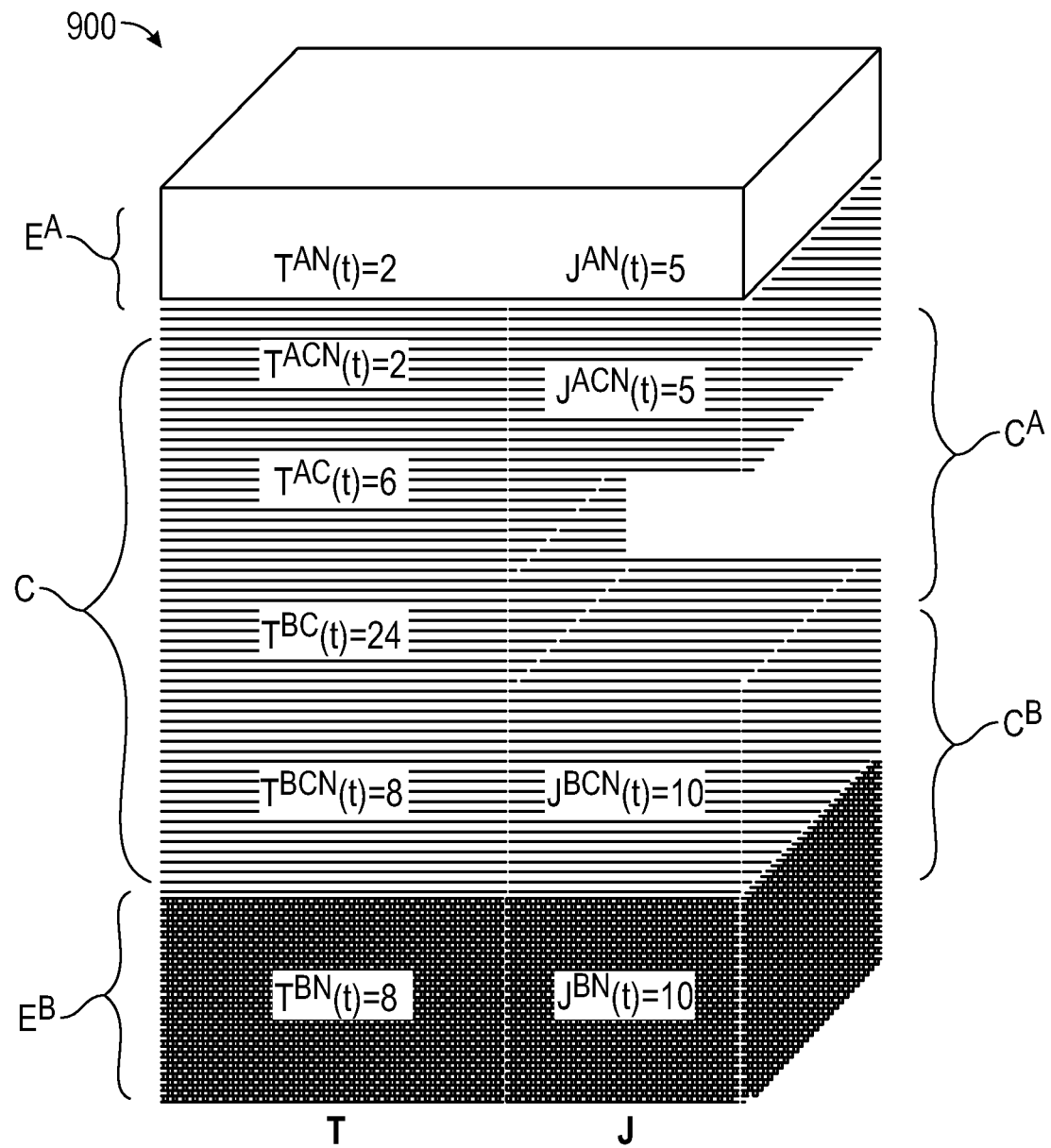
FIG. 9 depicts the same sector-type category as FIG. 8 of user interface of FIG. 2 decomposed instead into wasted energy and utilized energy.

Turning now to process efficiency, let $\eta^{(i)}(t)$ be thus the ratio of wasted or unconsumed resource inflow (i.e., $N^{(i)}(t)$) to the total inflow of $J^{(i)}(t)$ (i.e., $N^{(i)}(t)+M^{(i)}(t)$) by the $i^{th}$ end user: $\eta^{(i)}=N^{(i)}(t)/(N^{(i)}+M^{(i)}(t))$. Let $T^C(t)$ is any outflow of $T(t)$ transformation step that is wasted during the transformation process. Then $\mu_T$ is thus the ratio of the wasted outflow $T^C(t)$ for the transformation step to the total outflow $T(t)$: $\mu_T=T^C(t)/T(t)$. For notational convenience, let $E(t)$ be the total outflow that represents total resources that are used or consumed during total process, including $M^{(i)}(t)$:$E(t)=\Sigma_i{}^n M^{(i)}=M^{(1)}(t)+M^{(2)}(t)$; Where i=1, 2, . . . n. For one example, this description uses n=2; however, any value of n is contemplated. Similar to E, let C represent the total outflow that represents total resources that are wasted or unconsumed during total process (including $N^{(i)}(t)$ and $T^C(t)$):$C(t)=\Sigma_i{}^n N^{(i)}+T^C(t)$. FIG. 9 depicts the same sector-type category 900 as FIG. 8 of user interface 200 decomposed instead into wasted energy C, utilized energy of the benign source $E^A$, and utilized energy from the harmful source $E^B$.

Now let $T^{AC}(t)$ be the proportion of any wasted outflow during the transformation process of step $T(t)$ that is attributed to origin from an ecologically benign source, $A(t)$ and let $T^{BC}(t)$ be the proportion of any wasted outflow during the transformation process of step $T(t)$ that is attributed to origin from an environmentally harmful source, $B(t)$. This gives $T^{AN}(t)+T^{BCN}(t)=(1-\eta)*(p^T(B)*J^T)+(1-\mu)*T^A \cdot T^{AC^{(i)}}$ (t) is the outflow of resources from the transformed step $T(t)$ by $J^{(i)}$ attributed to environmentally benign source, $A(t)$, so $T^{AC}(t)=p^T(A)*T^C$, and $T^{BC^{(i)}}(t)$ is the outflow of resources from the transformed step $T(t)$ by $J^{(i)}$ attributed to environmentally harmful source, $B(t)$, so $T^{BC}(t)=p^T(B)*T^C$.

This leads to $J^{AN^{(i)}}(t)$ being any inflow of resources originating from an environmentally benign resource, $A(t)$, transformed by step $T(t)$ and then consumed by the $i^{th}$ end-user J. As an example, $J^{T,A^{(i)}}(t)$ represents the amount of T transformed resources of source $A(t)$, consumed by $J^1$:$J^{T,A^{(i)}}(t)(t)=\{T^A(t)/T(t)\}*J^{T^{(i)}}(t)$. Similarly, $J^{BN^{(i)}}(t)$ is any inflow of resources originating from an environmentally harmful resource, $B(t)$, transformed by step $T(t)$ and then consumed by the $i^{th}$ end-user J. As an example, $J^{T,B^{(i)}}(t)$ represents the amount of T transformed resources of source $B(t)$, consumed by $J^{(1)}$:$J^{T,B^{(i)}}(t)=\{T^B(t)/T(t)\}*J^{T^{(i)}}(t)$.

Broadly, $\Phi$ represents a quantification function for the environmental harmfulness of each unit of resource consumption and P represents economic value or cost associated with a resource source converted from the quantified value produced by $\Phi$. Hence $P(A(t))$ represents the economic value or cost converted from the quantified factors $\Phi(A(t))$ for the total resource inflow, $A(t)$ and $P(B(t))$ represents the economic value or cost converted from the quantified factors $\Phi(B(t))$ for the total resource inflow, $B(t)$. $P(E(t))$ and $P(C(t))$ is thus the combined economic value or cost converted from the quantified source factors, $P(A(t))$ and $P(B(t))$. For $\Phi(E(t))$ and $\Phi(C(t))$, the algorithm can thus represent and compute in terms of sourced $\Phi(A(t))$ and $\Phi(B(t))$ without regards to the economic value or cost function P. Now $\Phi(A(t))$ represents the quantification factor for the environmental harmfulness of each unit of resource consumption of environmentally benign type $A(t)$, such that $\Phi(A(t))$ can be approximated by 0. $\Phi(B(t))$ represents the quantification factor for the environmental harmfulness of each unit of resource consumption of type $B(t)$, such that $\Phi(B(t))>0$. For simplification, some embodiments may assume a fixed value for $\Phi(B(t))$ such as 2.

Figure 10:
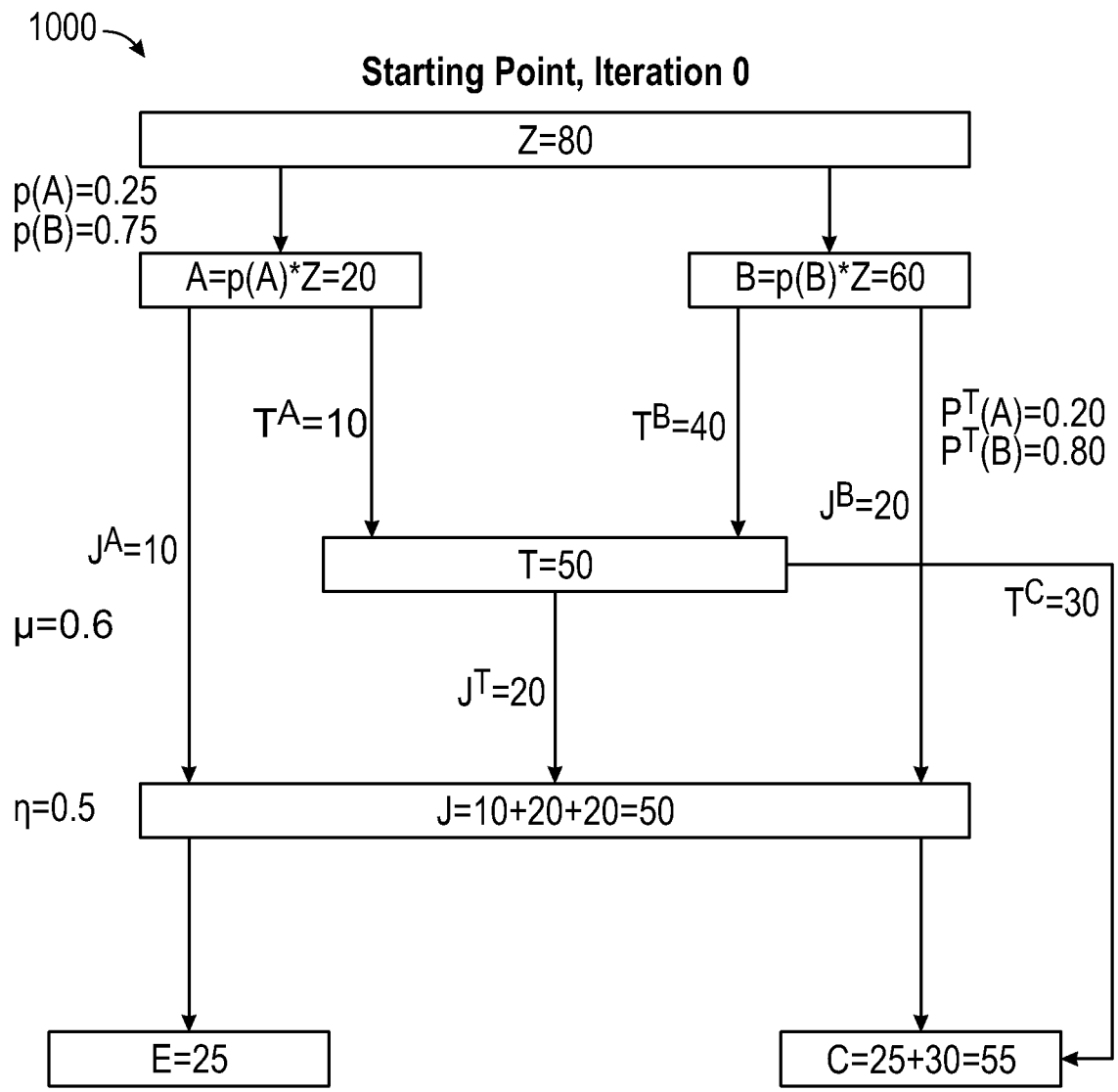
FIG. 10 depicts a starting state of resource allocation in a system.

Turning to an exemplary embodiments depicted in FIG. 10, let a system have an overall quantity of throughput flow of Z (for concreteness, say 80 units), which can be of multiple types, (e.g., A and B) that collectively add up to Z (for example 60 units of B and 20 units of A). In particular, let p(A) and p(B) be the portion of Z which are made up of A and B respectively. Now, at least a portion of these flows from A and B go to a transformation step T, portions of which are represented by $T^A$ and $T^B$ that add up to T. Similar to p, let $p^T(A)$ and $p^T(B)$ be the proportions of T represented $T^A$ and $T^B$.

The transformation step T has an efficiency factor, $\mu$, where it separates the wasted portion, $T^C=\mu T$, to C, from the remaining portion ($J^T$) which is used and consumed along with direct A and B flow types, called $J^A$ and $J^B$ respectively (which add up to J). As above, let $p'(A)$ and $p'(B)$, proportions of J represented $J^A$ and $J^B$. This, in turn, gives $T^C=T^{AC}+T^{BC}$ where $T^{AC}=p^T(A)*T^C$ and $T^{BC}=p^T(B)*T^C$. $T^A$, $T^B$, $J^A$ and $J^B$, collectively add up to total A and B, respectively, and thus to total system flow Z.

Finally, the J consumption stage has its own efficiency factor $\eta$, where it separates the actual used-portion to E, and the remaining wasted portion to C. In terms of T and J, first $T^A=T^{AN}+T^{ACN}+T^{AC}$ and $T^B=T^{BN}+T^{BCN}+T^{BC}$, since $T=T^A+T^B$ (where $T^{ACN}=(1-\eta)*(p^T(A)*J^T)$ and $T^{BCN}=(1-\eta)*(p^T(B)*J^T)$, and $T^{AN}=(1-\mu)*\eta*T^A$ and $T^{BN}=(1-\mu)*\eta*T^B$)). Next, $J^A=J^{AN}(\eta*J^A)+J^{ACN}(1-\eta*J^A)$ and $J^B=J^{BN}(\eta*J^B)+J^{BCN}(1-\eta*J^B)$ (where $J=J^A+J^B+J^T$); and finally $J^T=(1-\mu)*T=J^{TA}+J^{TB}$ (where $J^{TA}=(1-\mu)*T^A$ and $J^{TB}=(1-\mu)*T^B$)

The total Z could thus be visualized, and/or simplified in various reorganized terms, such as A, B, E, C or J and T—or a combination thereof. This described matrix system can then be enumerated within our example, with real values and terms. Then, the system can be optimized, where A and E should be maximized while B and C is minimized. After many iterations of the system with the above in mind, we can exit the optimization program when this above optimal has been achieved. Visually, over time t, the system should behave in this manner and user interface 200 should reflect the transition from ecologically harmful sources B to ecologically benign sources A based on the costing of quantification function $\Phi$.

Figure 11:
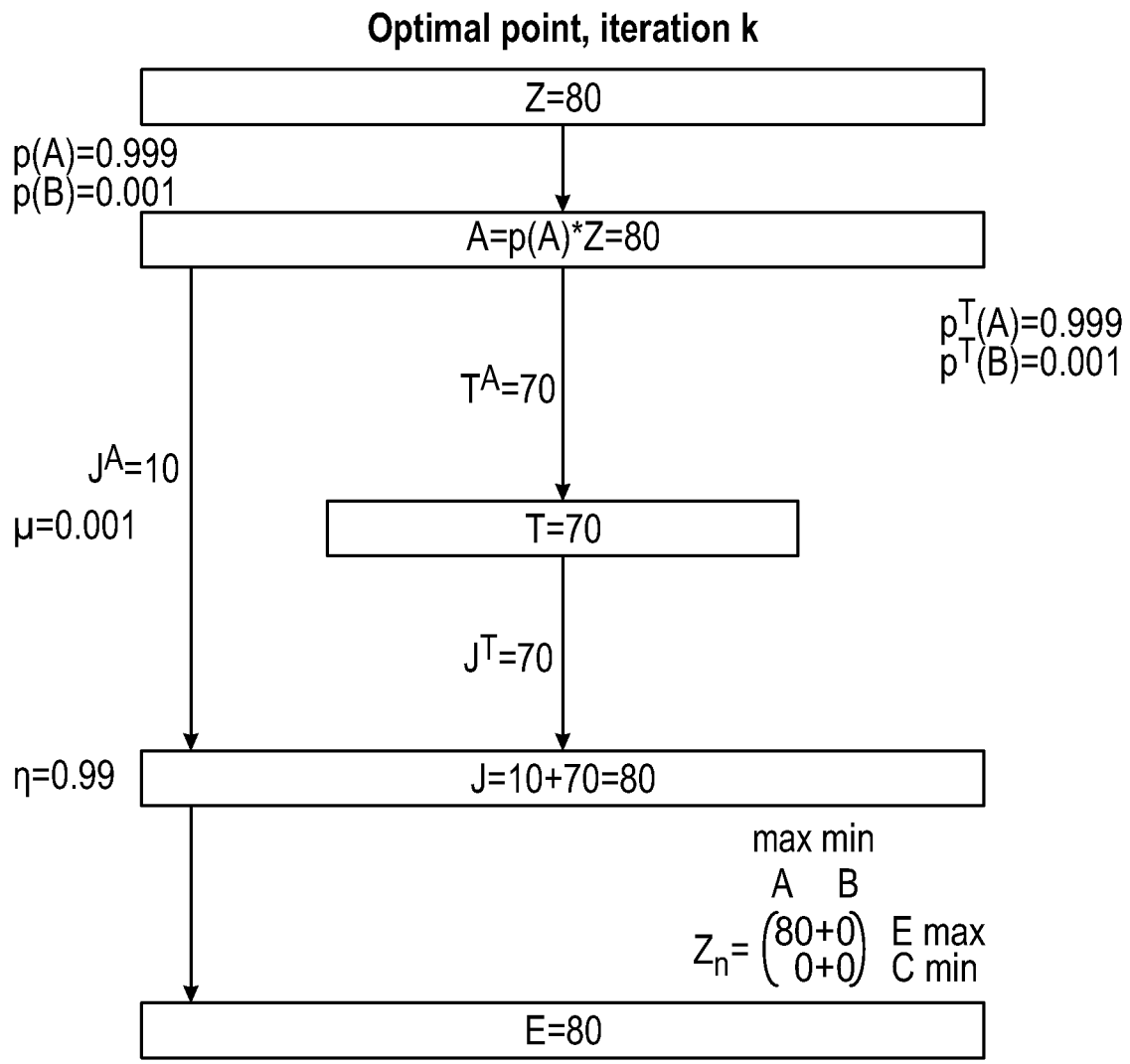
FIG. 11 depicts a final state of resource allocation in the system after reallocation.

A concrete example of the above process is depicted in FIGS. 10-11. For the example of FIGS. 10-11, let $\Phi^A$ be 0 and $\Phi^B$ be 2 units of pollution, and assume that the costing function P gives $1.5 per unit of pollution. FIG. 10 depicts the starting state of the example above where B of 60 units, so $\Phi$ is 120 units and P is $180. This amount can be used to "purchase" items, v (representing reallocations and transformations of energy sources in different ways), thereby changes the system parameters in meeting the desired conditions (i.e., p(A) and $p^T(A)$ goes to 1, which implies p(B) and $p^T(B)$ goes to 0, and $\eta$ goes to 1, such that $\mu$ goes to 0). We can introduce, a set of v where, for each $i^{th}$ v, we have a numeric condition that can satisfy required changes. For example, we might have v such that $$v^{(i)}=1; \Delta\eta=\eta^{(1)}-\eta^{(0)}=0.10; \text{ so } \eta_1=0.60$$

$$v^{(i)}=4, \Delta\eta=\eta^{(1)}-\eta^{(0)}=0.15, \text{ so } \eta_1=0.65;$$

$$\Delta p^T(A)=0.20, p^T(A)^{(1)}-p^T(A)^{(0)}=0.20 \text{ so } p^T(A)^{(1)}=0.40 \text{ implying } p^T(B)^{(1)}=0.60$$

$$v^{(i)}=3, \Delta\mu=\mu^{(1)}-\mu^{(0)}=-0.20, \text{ so } \mu^{(1)}=0.40; \text{ and}$$

$\Delta p(A)=0.15$, $p(A)^{(1)}-p(A)^{(0)}=0.15$ so $p(A)^{(1)}=0.40$ implying $p(B)^{(1)}=0.60$.

This process can be iterated, computing the imputed pollution cost $P(B(t))$ at each iteration until $p(B)$ such that $P(B(t))$, at each iteration, different techniques for selecting the $v^{(i)}$ to "purchase" using $P(B(t))$ are contemplated. For example, the $v^{(i)}$ with the least cost could be selected. As another example, the $v^{(i)}$ with the maximum reduction of $\Phi$ (i.e. maximized $\Phi^{(1)}-\phi^{(0)}$ or highest total pollution reduction) could be selected. Alternative, a hybrid of these methods could be used, such as maximizing $(\phi^{(1)}-\phi^{(0)})/P(v)$. (i.e., maximizing pollution reduction per cost). After a number k of iterations, the system might result in the state depicted in FIG. 11. There, as can be seen, $p(B)$ and $\mu$ have been minimized resulting in both B and C being approximately 0.

Thus, in summary, the exemplary embodiment of the system above can visualize (using user interface 200) how the initial conditions could evolve through iterations of parameterized changes and end at the optimal state, where due to step-wise increases of $p(A)$, B and $J^B$ are eliminated and due to step-wise increases of $p^T(A)$, we eliminate $T^B$, thereby achieving the goal of maximizing ecologically benign energy sources A while minimizing ecologically harmful energy sources B. Next, due to step-wise decreases of $\mu$, we eliminate $T^C$, one component of C, and due to step-wise increases of $\eta$, we eliminate the remaining component of C, thereby meeting our goal of minimizing wasted energy and maximizing energy utilization.

FIGS. 12A-15B depict an exemplary user interface 1200 of the above process visually. Initially, at FIG. 12A the goal of reducing the current pollution $\Phi$ of 500 units, by a target of $\Delta\Phi$ of 100 units (to 400 total units) by 2030 depicted at evaluation 1202. This required $\Delta\Phi$ is stored in the database for the specific user. Based on the generation of $\Phi$ units of pollution due to the consumption of M B's; a user can interactively enter change parameters (e.g., consumption of a particular $B^{(i)}$) by moving the dials of the interface at input 1204, using a hardware device, like a computer mouse; or by using a touch-screen interface of a mobile device, tablet or kiosk monitor or via terminal line code and application programming interface syntax. From their initial positions, B (M=1) and A (N=1) are adjusted by a user or other entity, to direct changes in $\Delta p^T(A)$, $\Delta p^T(B)$ to the system's optimization model.

Figure 12A:
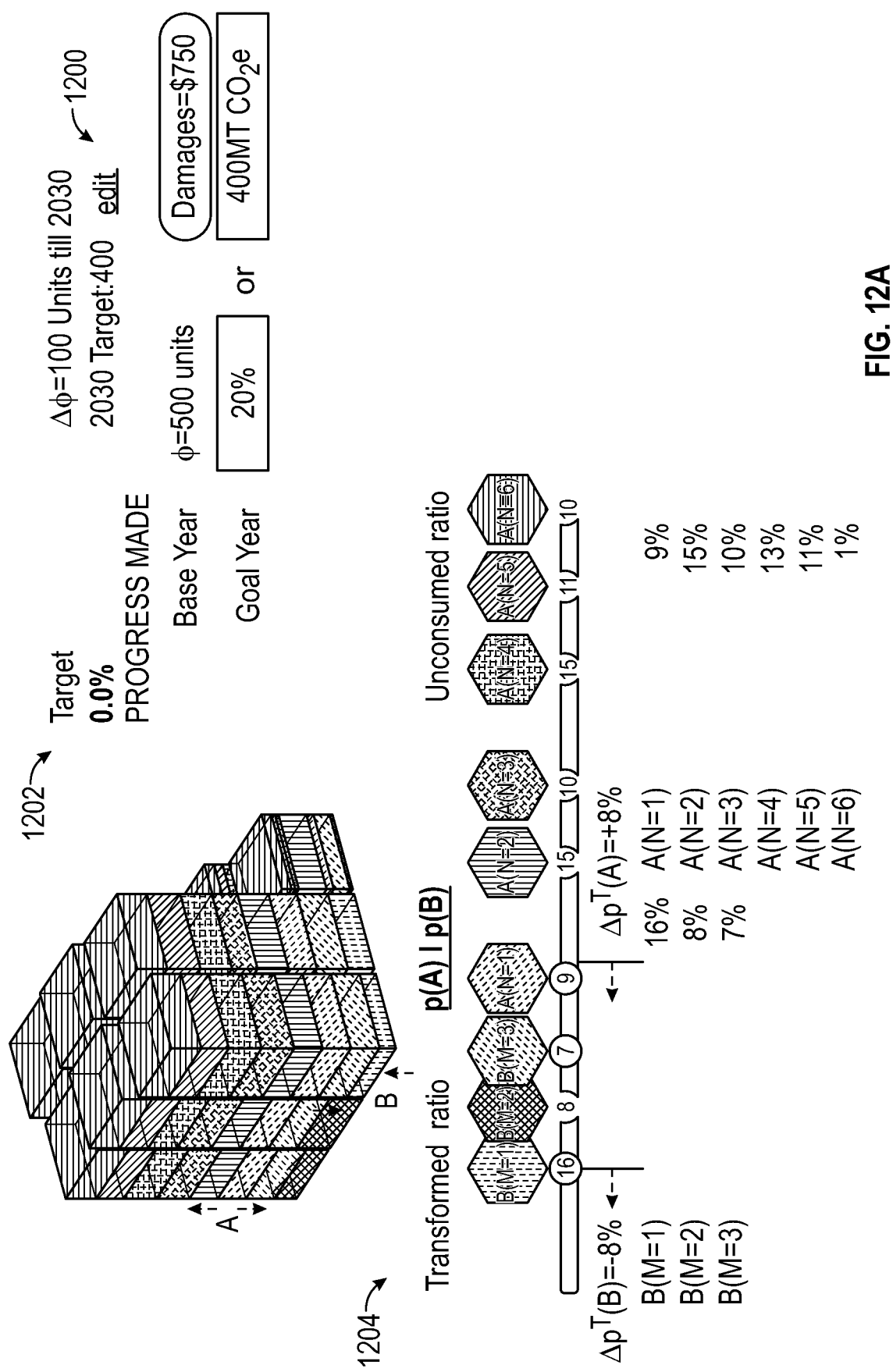
FIGS. 12A-12B depict a visual illustration of the exemplary resource allocation process of FIGS. 10 and 11.
Figure 12B:
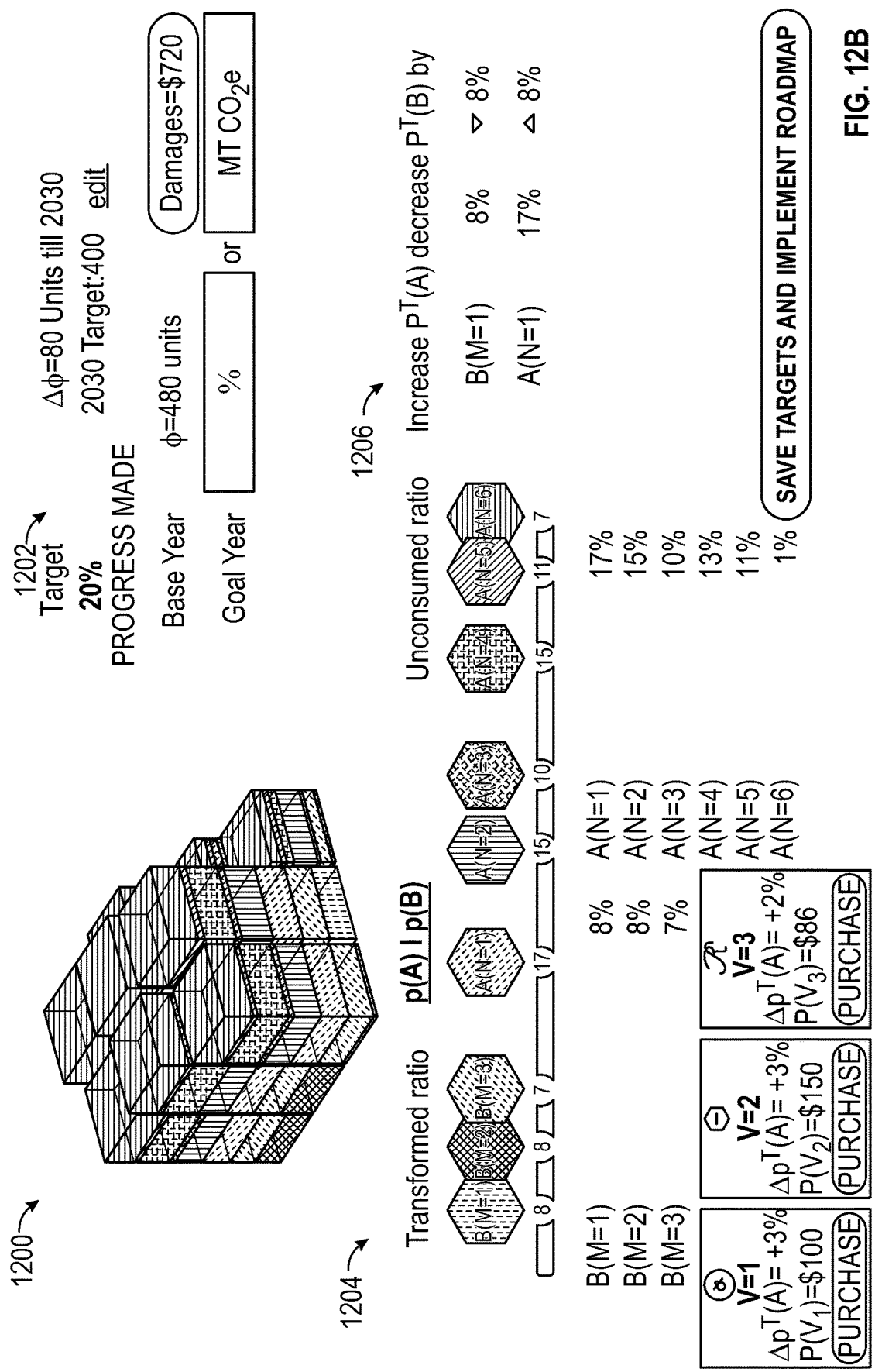

Following this parameter input, the system stores the changes (within a predetermined margin of error) into the database, and indicated to the user that the reduction in pollution was $\Delta\Phi=20$ units, meaning that 20% progress has been made if the indicated change is implemented, as depicted in FIG. 12B.

Figure 13A:
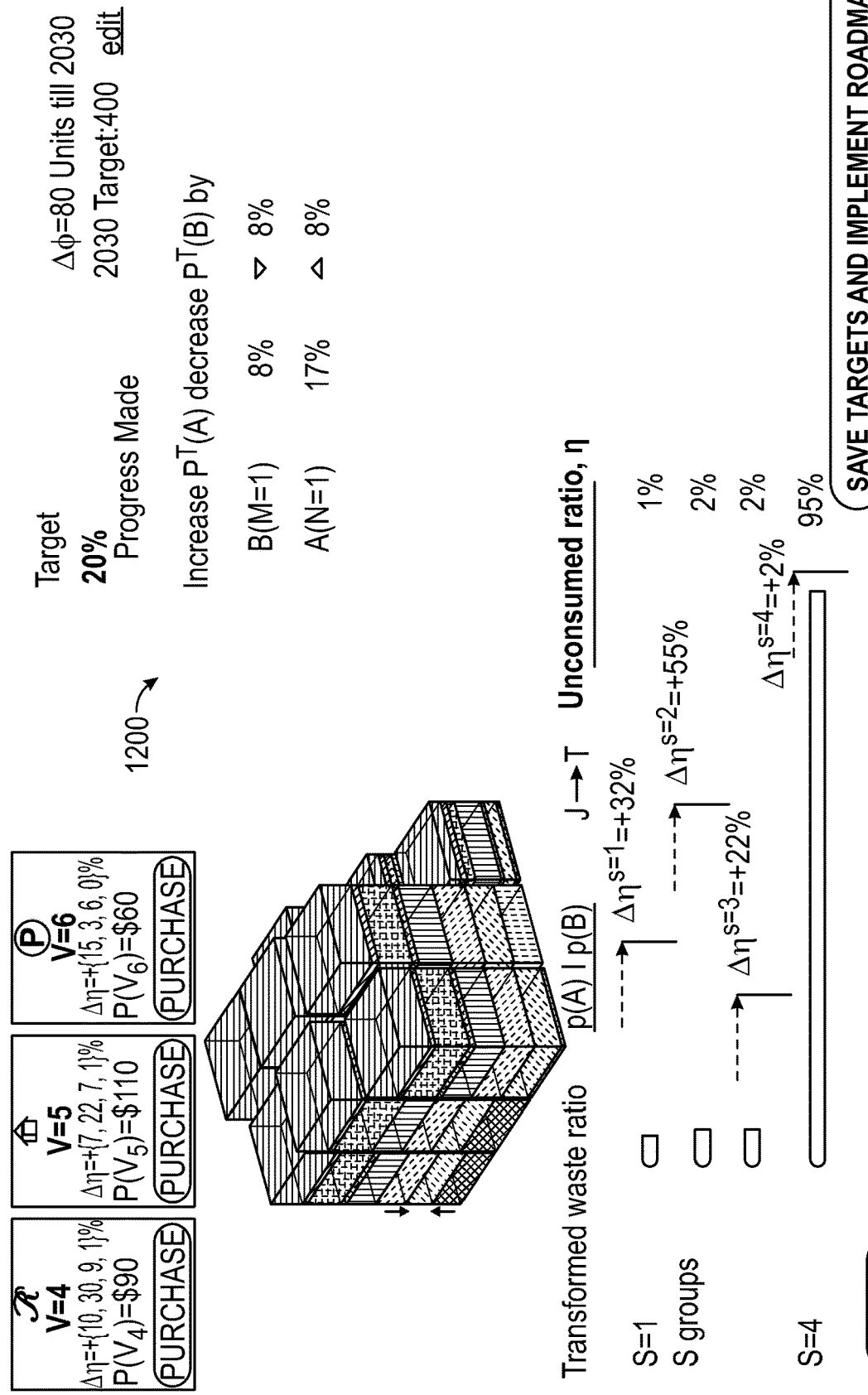
FIGS. 13A-13B depict the changes in the solution entities for the exemplary resource allocation process of FIGS. 10 and 11.
Figure 13B:
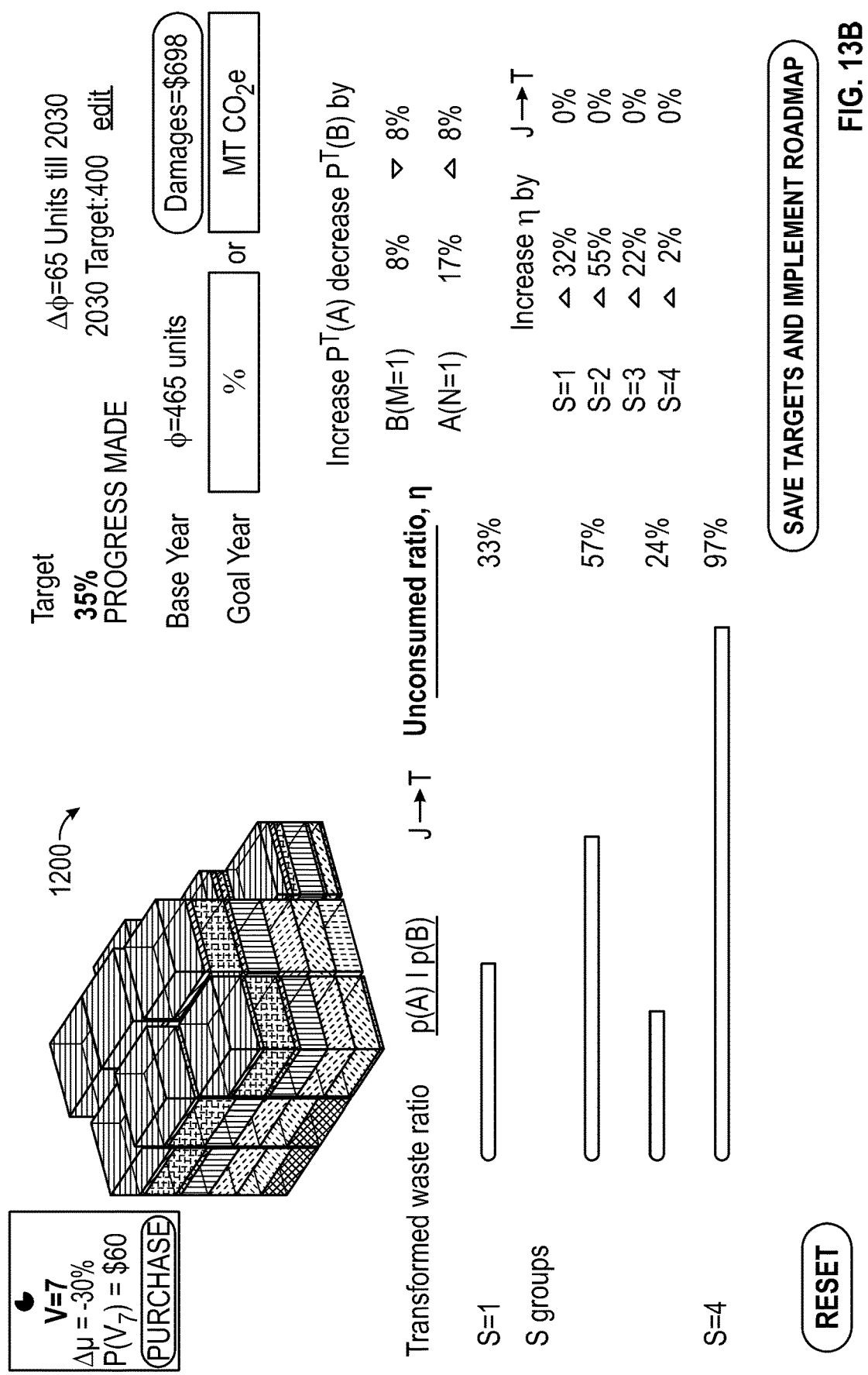

Next, as depicted in FIGS. 13A and 13B, is a solution evaluation visualization 1200 for each of the four solution entities, the corresponding $\eta$ can be changed, such that, each $\Delta\eta$ will now be stored in the database. After the change, which is displayed to the user, the progress metric is updated, communicating to the user or other entity, that an additional reduction in pollution of $\Delta\Phi=15$ units have been eliminated due to changes in the $\Delta\eta$ matrix, as shown in FIG. 13B.

Figure 14A:
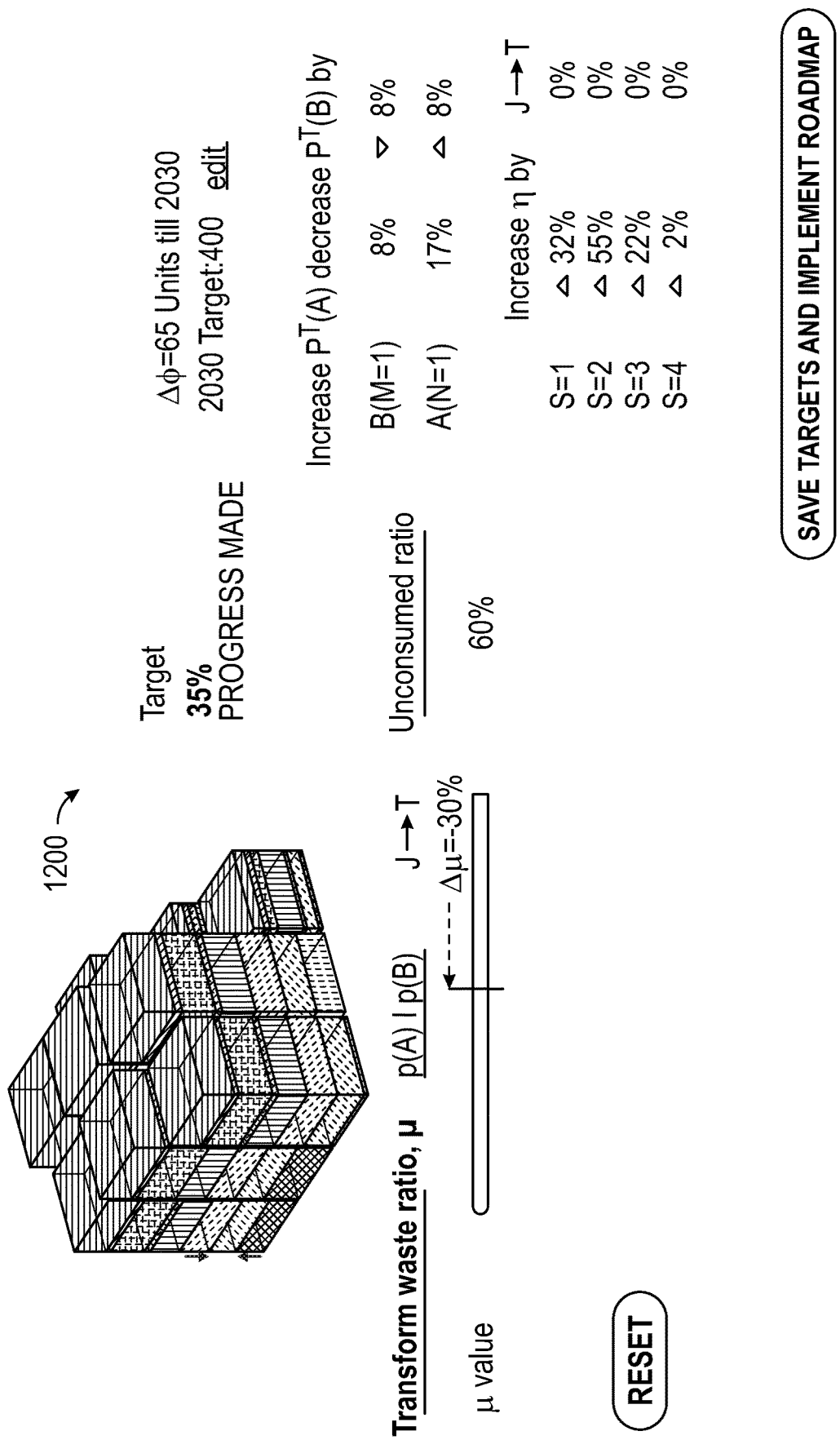
FIGS. 14A-14B depict the changes in the transformation waste ratios for the exemplary resource allocation process of FIGS. 10 and 11.
Figure 14B:
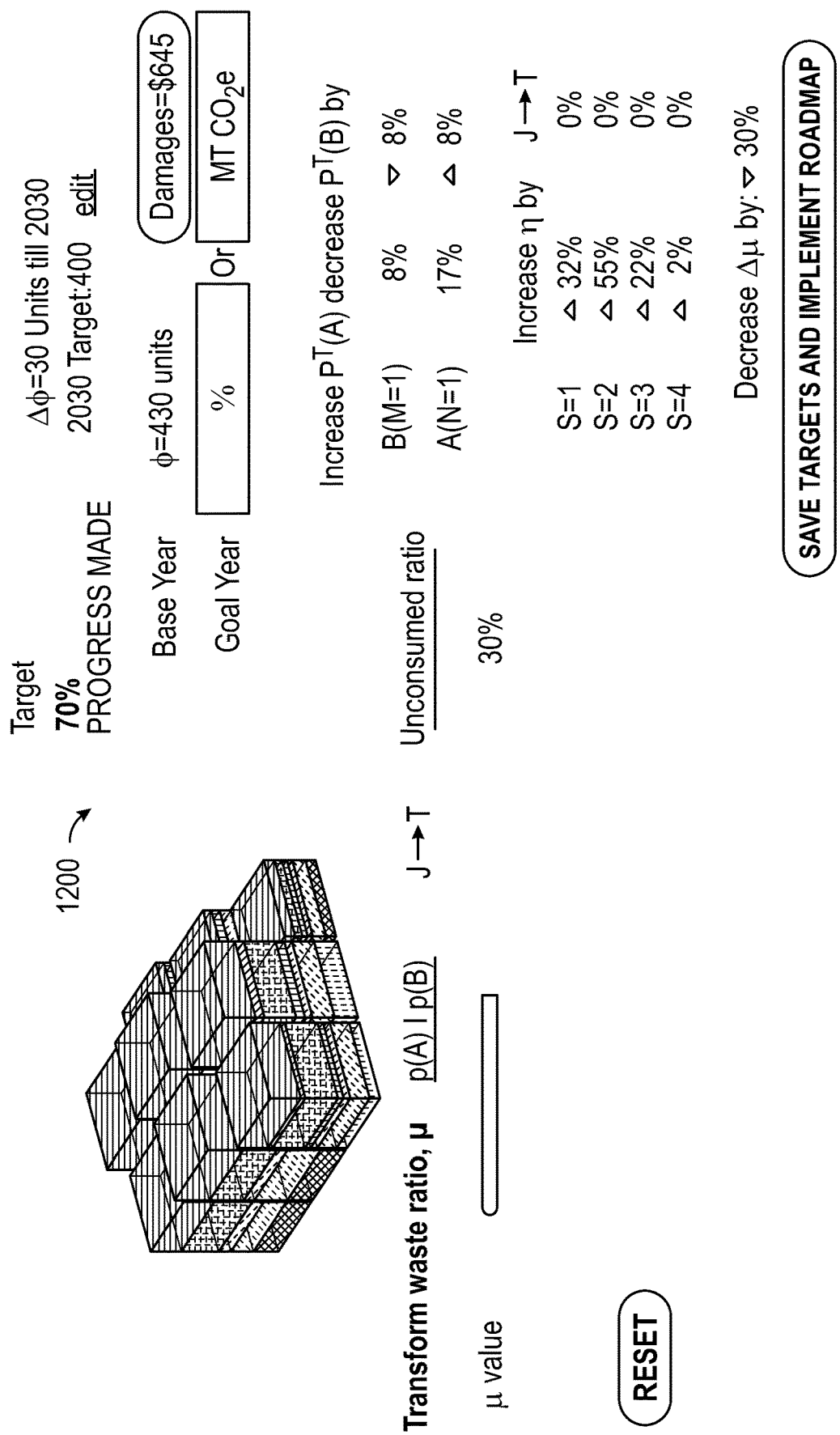

Further, as depicted in FIG. 14A, the user can also reduce $\Delta\mu$, as shown, by 30% which is equated to a further reduction in pollution of $\Delta\Phi=35$ units. Thus, as depicted in other words, there remain only 30 units of $\Phi$ that to be eliminated, and the last $\Delta\mu$ step had reduced 35 units of $\Phi$, as shown in FIG. 14B. As shown in the changes, these are stored as targets for each solution entity when they see their individual, separated cube interfaces and analytics, such that the total changes are also specific to the nuanced context of each solution entity or user.

Figure 15A:
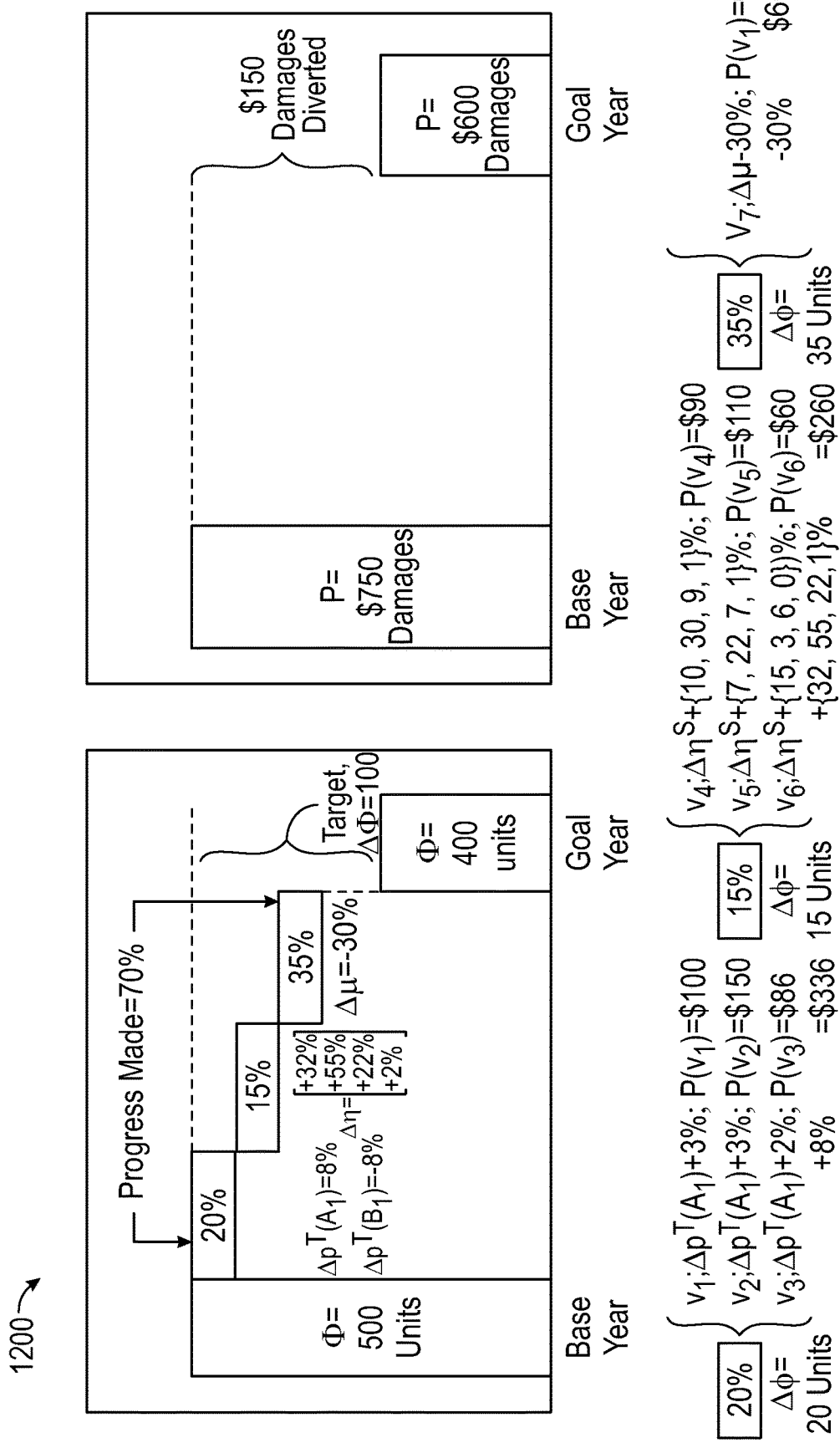
FIGS. 15A-15B depict visual illustrations of process towards meeting the goals for the exemplary resource allocation process of FIGS. 10 and 11.
Figure 15B:
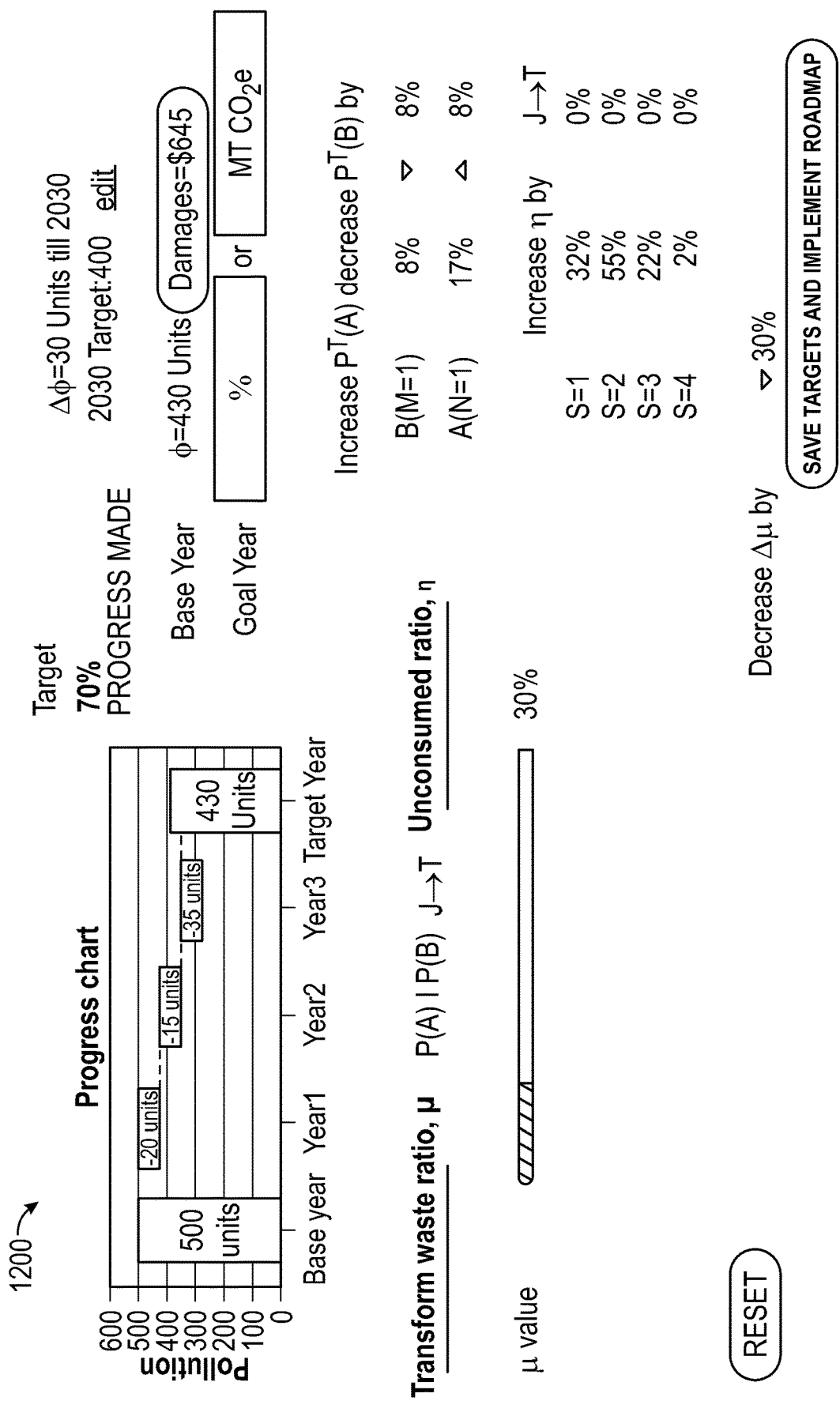

As can be seen in FIGS. 15A and 15B, due to the above changes and storing of initial vs. final values stored in the database, a chart can be generated for the user to view the starting $\Phi$ value, and how the changes can lead to reductions in $\phi$, knowing there is a goal of 100 units of $\Phi$ by a certain year or in a particular timeframe.

Each of these reductions in 1 is associated with or derived from changes in more granular parameters, such as $\Delta p^J(A)$, $\Delta p^J(B)$, $\Delta p^T(A)$, $\Delta p^T(B)$, $\Delta p(B)$, $\Delta\eta$, and $\Delta\mu$, etc., which is provided by different solutions. Each solution v may be associated with a cost, $P(v)$, representing a monetary cost to implement individual solution v. This cost could be evaluated by the user by simply viewing the graph or chart, not only in terms of $\Phi$, but in terms of $P(\Phi(t))$ which can be a constant or a variable. Instead of doing \$750 of damages by consuming 500 units, the user can instead invest the \$656 required to purchase a number of solutions $v^{(i)}$; thereby making 75% progress to reaching its 2030 goal of 400 units.

Each user can thus evaluate their costs, total $P(v)$ for all $v^{(i)}$, and their benefits, which are total $Sv(t)$ savings over time, in addition to the \$150 in damages (\$750-\$600) they would have incurred, had they not made the changes to reduce 0.4) by 100 units by adopting the chosen $v^{(i)}$. As shown in FIG. 15B, users can also move from the real-time cube view, to a more temporal progress view with real-time changes as interface dials are manipulated by the user or an entity on their behalf. As interface dials are changed, a set of v's can be automatically visualized on the interface, clicking which can show how the visuals and values will change depending on v-level parameters.

Figure 16:
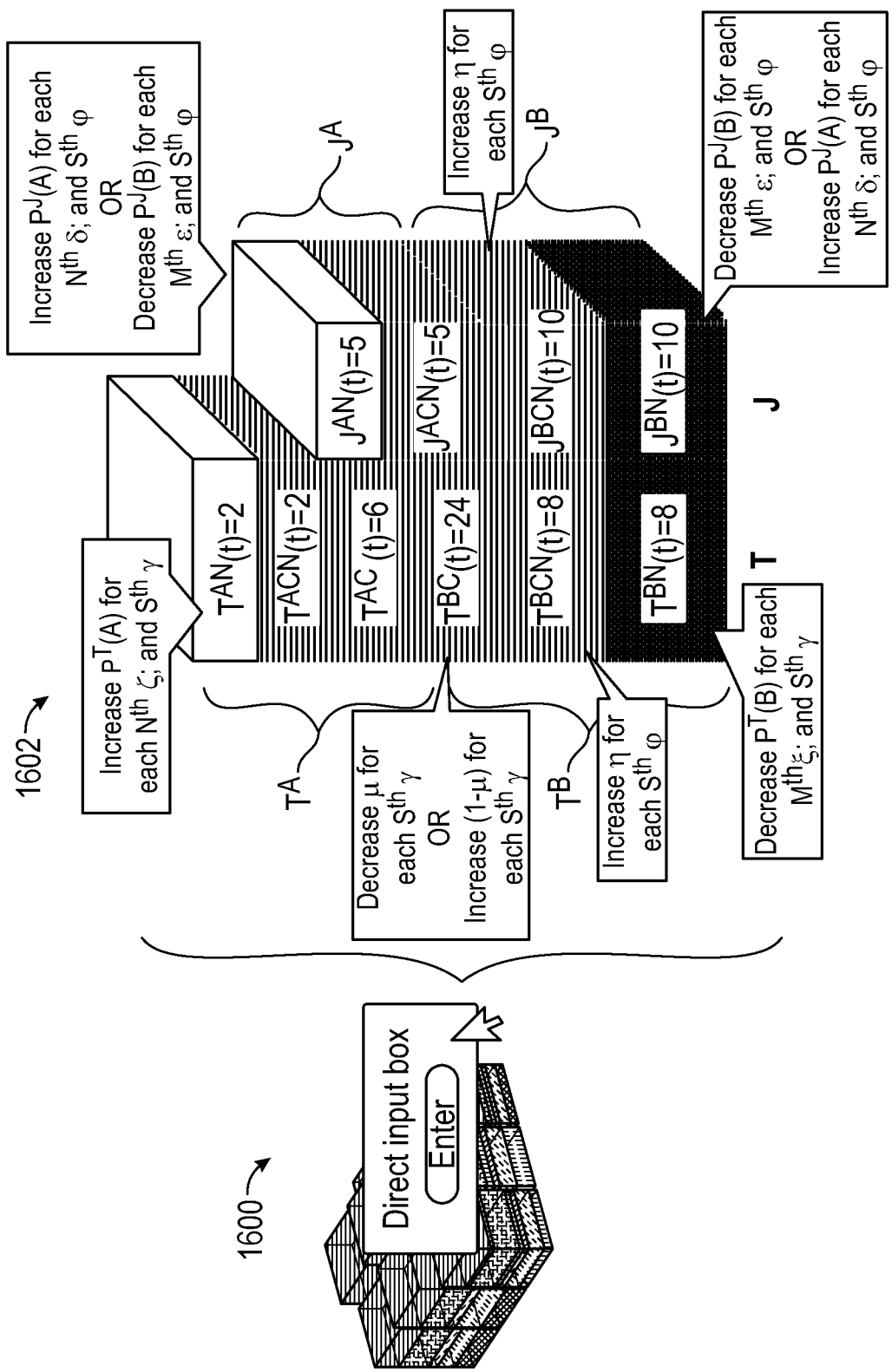
FIG. 16 depicts a direct data entry method for accessing the data associated with the cube.

Similar to the user interface manipulations from FIGS. 12A-B, 13A-B and 14A-B, the analytical cube 1602 can be directly accessed via the user interface generally referred to by numeral 1600, as depicted in FIG. 16. An exemplary inflow and transition process is shown in the visualization 1204 similar to FIGS. 8 and 9. From the perspective of other entities, such as each v solution entity, the animated cube of any user (or group of users) can be viewed to determine the corresponding information such as parameters changed by that user, and of which type, and what is the corresponding cost $(P(v))$ to purchase, or savings created, $Sv(t)$, or pollution/social and environmental costs reduces, in terms of $P(B(t))$ or $\Phi(B(t))$, respectively.

This information may be stored in a database and made available to the user in the user interface as shown before. This interface may function like a bidding system, or marketplace, introducing different entities as buyers, sellers or intermediaries, like rating organizations, financial institutions, corporations or governmental agencies—programmatically asking user S to lower $\Phi$ or social costs, $P(B(t))$ by adopting certain v's which meet cost, $P(v)$ or savings, $Sv(t)$ thresholds. Such a user interface may additionally aggregate and visualize the incoming or stored data, set or suggest change targets, and load potential solutions or options the user has available to meet a particular target through any stored or accessed v-level change parameters $\Delta p^J(A)$, $\Delta p^J(B)$, $\Delta p^T(A)$, $\Delta p^T(B)$, $\Delta p(A)$, $\Delta p(B)$, $\Delta\eta$ and $\Delta\mu$, etc.

Details of each solution $v^{(1)}$ stored in the database may be depicted, such as the level of the change parameters ($\Delta p^J(A)$, $\Delta p^J(B)$, $\Delta p^T(A)$, $\Delta p^T(B)$, $\Delta p(A)$, $\Delta p(B)$, $\Delta\eta$ and $\Delta\mu$, etc.), the cost to purchase, $P(v)$, the expected savings over time $\Delta Sv(t)$, the estimated reduction in pollution, $\Delta\Phi$ (or conversely, "progress made" or subsequently, the estimated reduction in economic harm or pollution cost P(t), by the a particular user in a given time period t).

Figure 17:

FIG. 17 depicts a simple interface on how each of the v-solution data parameters may be inputted into the system by a user or set of users.

FIG. 18 depicts an interface on how each of the R-level data in a given region, p can be entered by S entities and encodes attributes such as Q, $X_j$, $G_j$, $Y_k$, t etc. which can be used for filtering geospatially.

Figure 19:

FIG. 19 depicts an interface to input other J sector R level data (such as J=transportation, R=passenger vehicle) for any given t.

FIG. 20 depicts an interface to input data on transformation T of an energy source ($T^A$, $T^B$) as well as the sector and location of the consumption, $J^T$ over time t. Same interface can be used compute emissions, as well as enter v solutions through "Act now" button.

Figure 21:
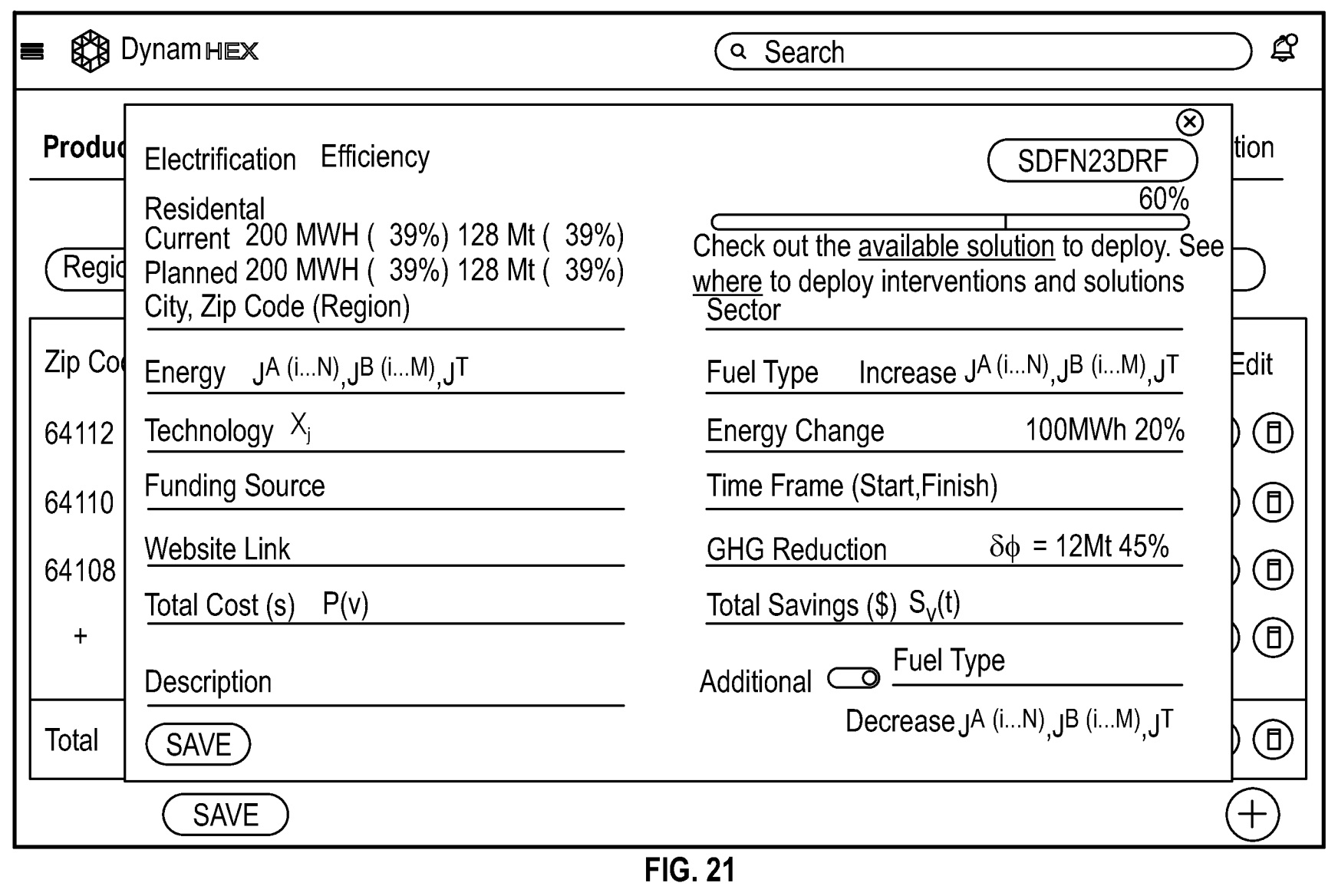

FIG. 21 depicts a further interface on the act now button, which is similar to v-solution entry interface, listing $\Delta p^J(A)$, $\Delta p^J(B)$, $\Delta p^T(A)$, $\Delta p^T(B)$, $\Delta p(A)$, $\Delta p(B)$, $\Delta \eta$ and $\Delta \mu$ as well as P(v), $\Delta \Phi$ and $\Delta Sv(t)$ for the algorithm inputs and storing outputs.

FIG. 22 depicts the input of each region p, denoting which plant or plants, R provide energy source, the cost and price of said energy and the emissions for that energy, for a given time t. Instead of p level regional data, S level entity data entry is also possible.

FIG. 23 depicts the input of plants R, denoting which location p, it provides energy to and the emissions as a result for a given time t.

FIG. 24 depicts the input of each plant R, by energy source, efficiency and emissions for any given region p, and time t.

FIG. 25 depicts v-solution entry interface, listing $\Delta p^J(A)$, $\Delta p^J(B)$, $\Delta p^T(A)$, $\Delta p^T(B)$, $\Delta p(A)$, $\Delta p(B)$, $\Delta \eta$ and $\Delta \mu$ for the algorithm inputs, including solution purchase parameter like P(v), $\Delta \Phi$ and $\Delta Sv(t)$ etc.

Figure 26:
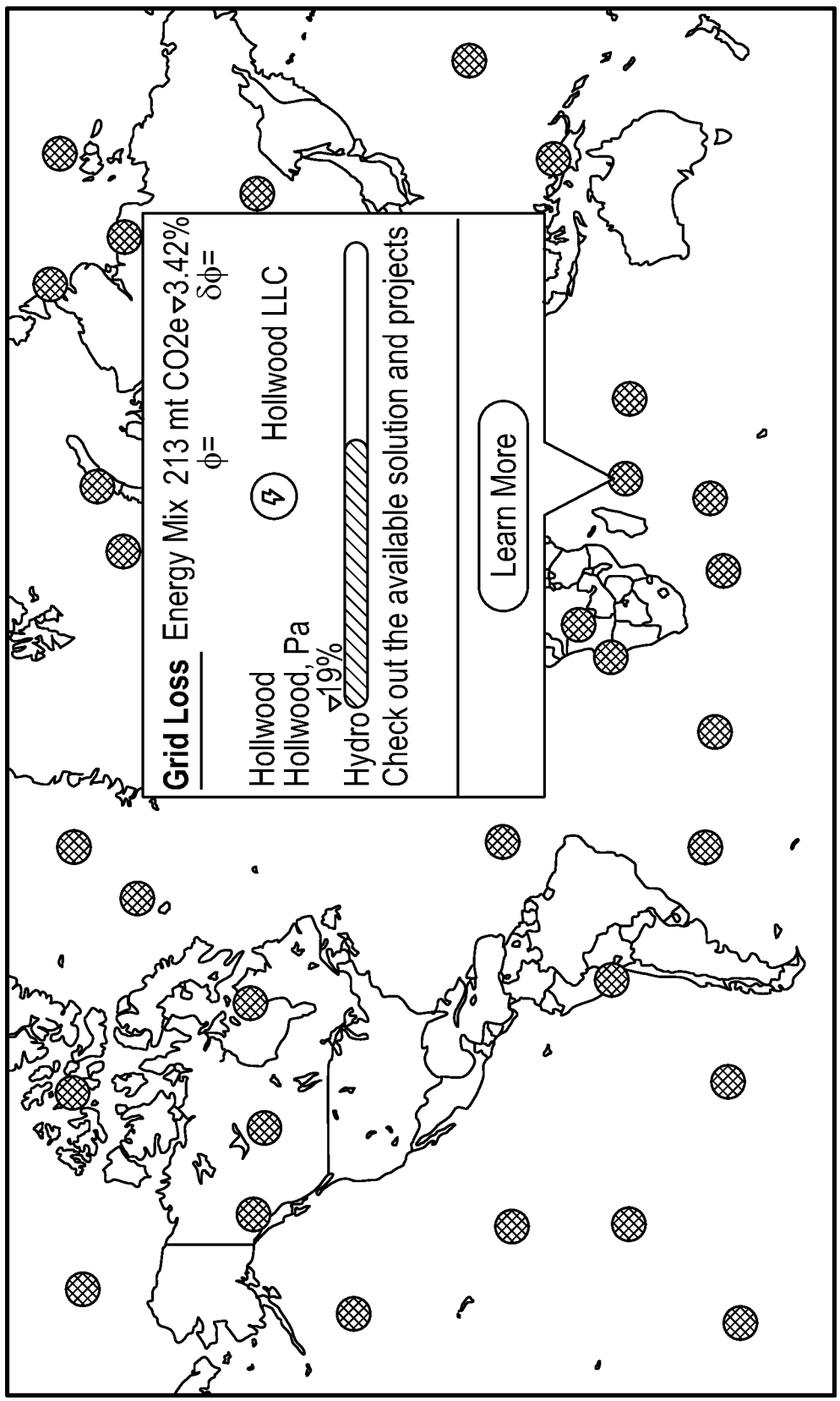
FIG. 26 depicts an exemplary topographical map for presenting data.

FIG. 26 depicts the $R^{th}$ level plant, as well as energy source, efficiency and emissions data on can be shown on any topographical map, given known location in any given region p, and time t. Similar to earlier shown tabular (11) format of storing geospatial information at the $R^{th}$ level, where R is a powerplant, computing emissions from different energy sources and aggregating to the regional $p^{th}$ level in time t.

Figure 27:
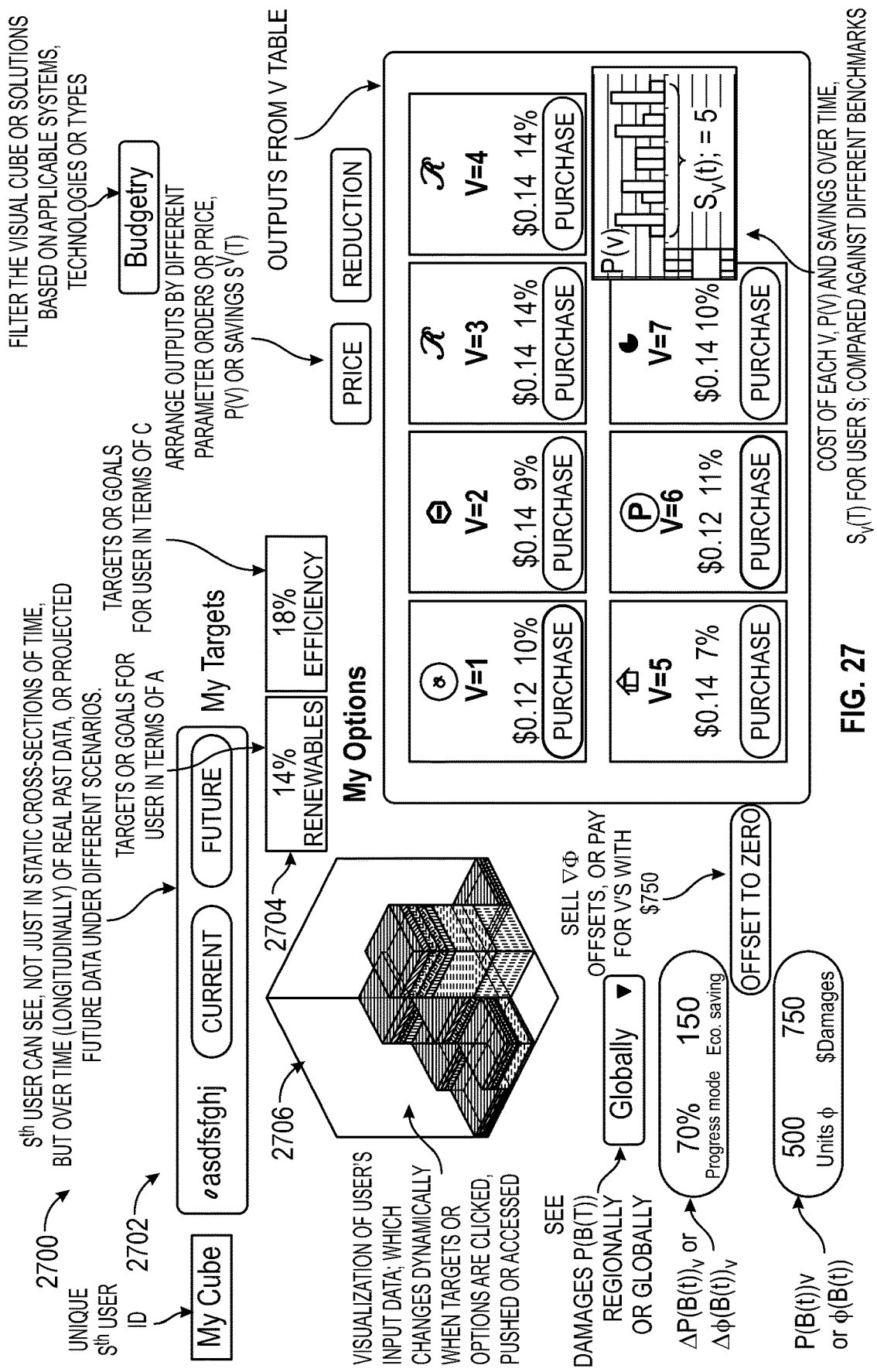
FIG. 27 depicts a hybrid visual/numeric user interface for a user's visualization of the goals and progress of the resource allocation process.

FIG. 27 presents a cost and savings user input 2700 that allows the user to input changes and dynamically visualize the past, present, and future changes to the allocation and costs. Visually, each of the changes to dials are reflected real-time on the interface via at least one of color, texture, and shape changes in the cube, (e.g. becoming more colorful as more progress is made). Additionally, the progress can be tracked numerically at numerical button 2702, and/or absolute $\Phi$ tracked at absolute button 2704. If the user is unable to buy solutions from the indicated $v^{(i)}$, they could also offset the $\Phi$ amount, such as communicating with a higher-order entity with the purchasing power to buy solutions that colors the user's cube, or reduces their $\Phi$. For example, this could be portions of a municipal bond or climate/green bond, that increases $\Delta p^T(A)$ and reduces $\Delta p^T(B)$ that is only possible after pooling offset resources from multiple users, or securitized and transacted as a tradable instrument. Further, all progress may be tracked for all customizable conditions past, present, and future at selection block 2706. An embodiment of such an interface is succinctly shown in FIG. 27.

Figure 28:
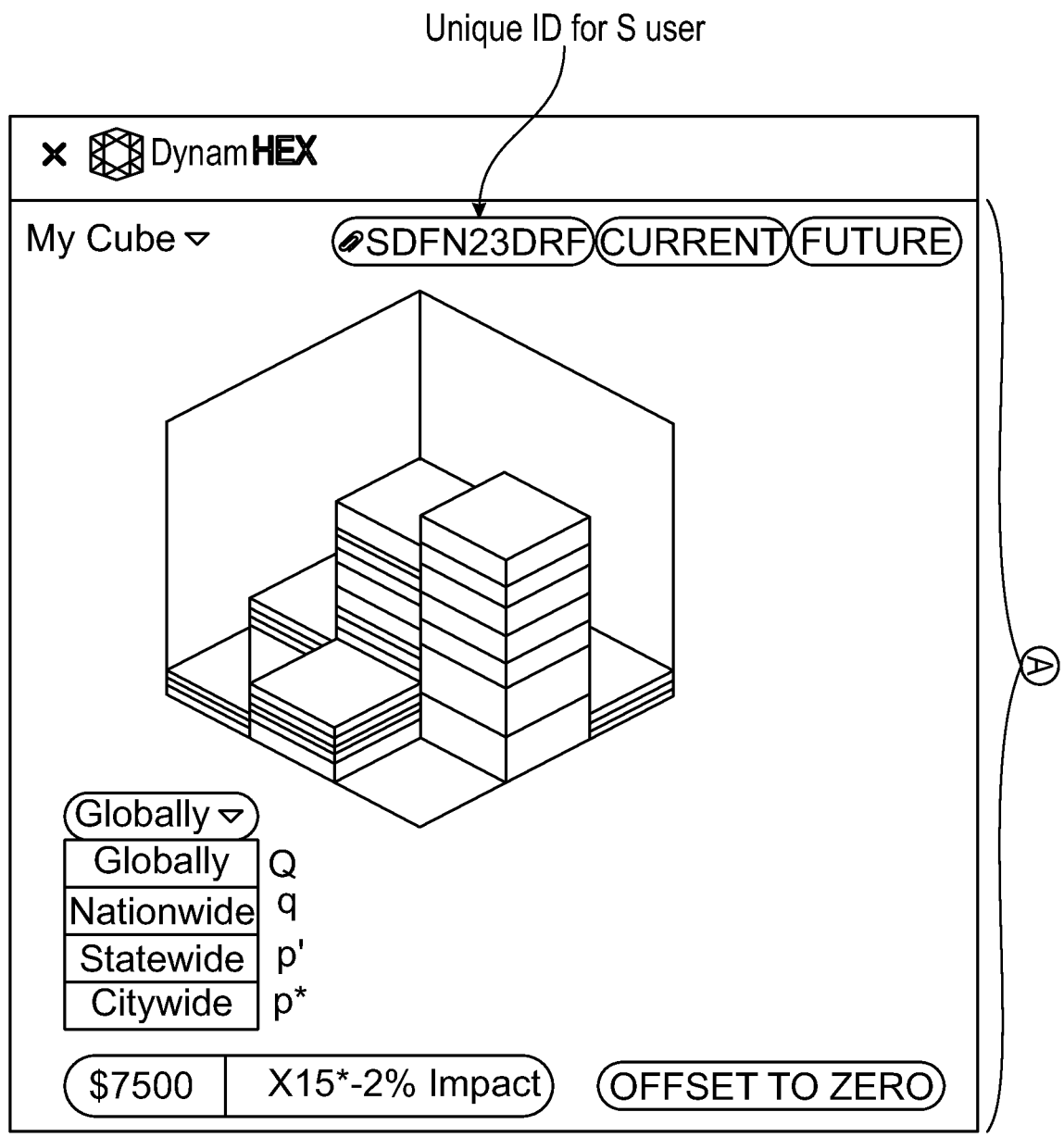
FIG. 28 depicts exemplary cubes and cubelets for visualizing energy source consumption.

FIG. 28 depicts Any given user S can see the transformed visualization (200) of the cube and cubelets showing energy source consumption in each of the artifact, R's owned by the user, S, with S-level unique code identifier, with the ability to aggregate locationally—city P*, state P', national q or global Q, based on relational queries identified earlier.

Figure 29:
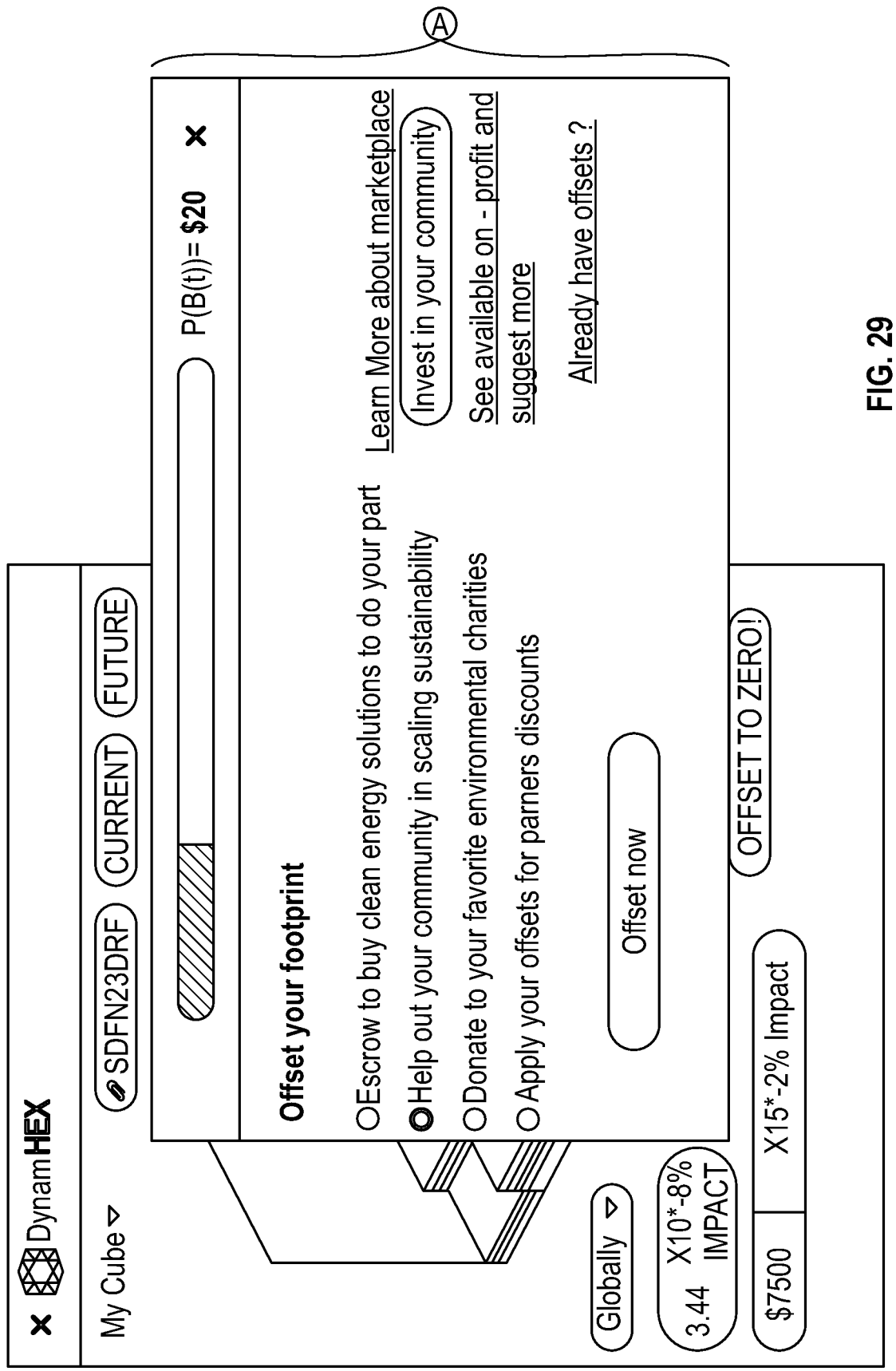
FIG. 29 depicts an exemplary user interface providing selections to the user.

FIG. 29 depicts a user interface presenting data such that each user can understand the emissions $\Phi$ given their energy source visualization, and chose to either escrow the monetary amount, $P(\Phi)$ or P(B) in any given t in any currency to either (i) purchase relevant v solutions knowing the P(v) of each v solution, (ii) invest $P(\Phi)$ amount in community-level projects, either as a trackable donation or purchasing a security in an investment project, such as green bonds, (iii) make charitable donations of $P(\Phi)$ to other S entities, through unique alphanumeric IDs or (iv) buy carbon offsets or renewable energy credits in the amount of $P(\Phi)$ and get a discount code (another unique alphanumeric ID) from participating retailers.

Figure 30:
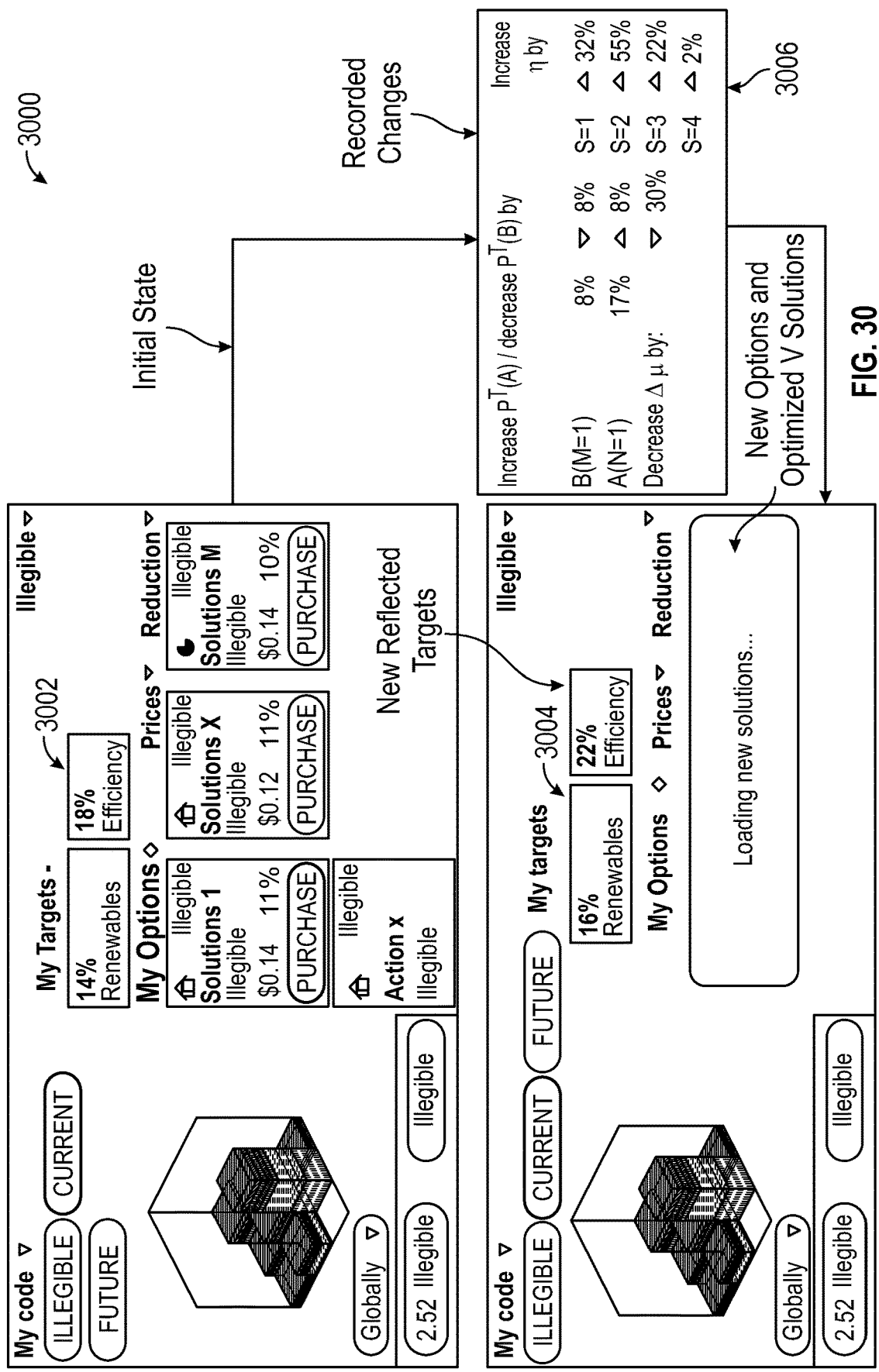
FIG. 30 depicts how an individual user's interface can be automatically updated to reflect new goals set by an authorized user.

FIG. 30 depicts an exemplary user interface generally referenced by the numeral 3000. The targets 3002 for each user could be edited or updated by the user or by other entities with the ability, ownership or legal/regulatory authority to change to new or different targets. For example, FIG. 30 shows what happens when a user or other authorized entity increases $\Delta p(A)$ by 2 percentage points, from 14% to 16%; and decrease $\Delta p(B)$ by 4 percentage points from 18% to 22%; the individual user's interface can be dynamically automatically updated to reflect new goals, and each solution table can be similarly automatically updated to match new goals. The recorded changes are presented in box 3006.

Figure 31:
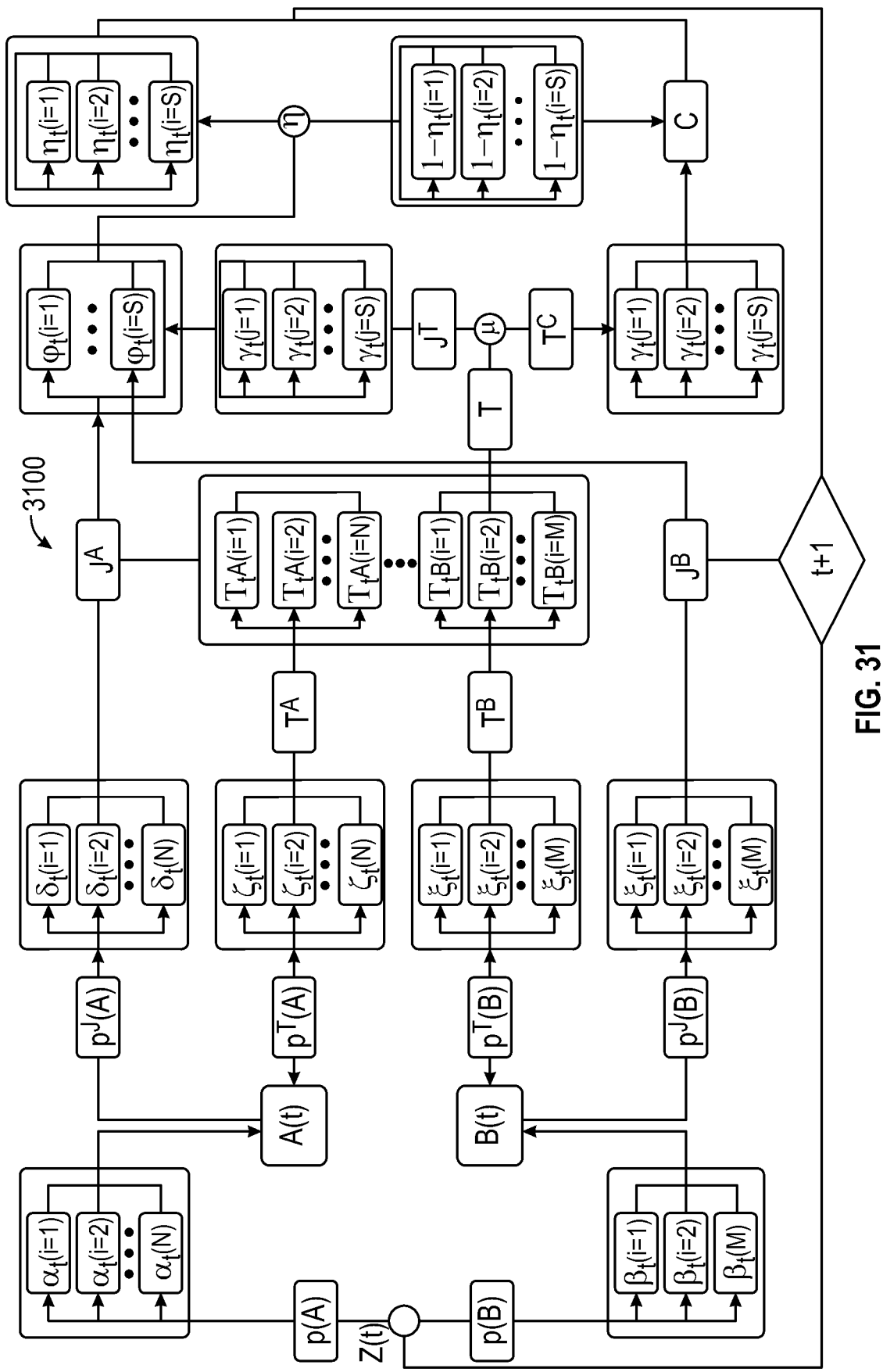
FIG. 31 depicts an exemplary optimization flow.

Turning now to FIG. 31, an alternative optimization algorithm is depicted and generally referenced by the numeral 3100. Starting from the previous optimization algorithm discussed above and ending at the starting point iteration of FIG. 10, then moving to an iterative process shown in FIG. 31 and described below, the system may then be generalized to a system such that A and B split into N and M sub-types $A^{(1)}, \ldots, A^{(N)}$ and $B^{(1)}, \ldots, B^{(M)}$, such that $A=\Sigma_{i=1}^{N} A^{(i)}$ and $B=\Sigma_{i=1}^{M} B^{(i)}$. Further, S consumption stages $J^{(1)}, \ldots, J^{(S)}$, such that $J=\Sigma_{i=1}^{S} J^{(i)}$,
$T^C$ splits into S stages, say $T^{C^{(1)}}, \ldots, T^{C^{(S)}}$ such that $T^C = \Sigma_{i=1}^{S} T^{C^{(i)}}$, S actual-used portion $E^{(1)}, \ldots, E^{(S)}$ such that $E=\Sigma_{i=1}^{S} E^{(i)}$,
S wasted portion $C^{(1)}, \ldots, C^{(S)}$ such that $C=\Sigma_{i=1}^{S} C^{(i)}$.

The optimization problem comprises simultaneously maximizing the inflow from benign sources $A^{(1)}, \ldots, A^{(N)}$ and the outflow of utilized energy $E^{(1)}, \ldots, E^{(N)}$ and simultaneously minimizing the inflow from harmful sources $B^{(1)}, \ldots, B^{(M)}$ and the outflow of wasted energy $C^{(1)}, \ldots, C^{(N)}$ where A, E, B, and C are evaluated at each time (t). After k+1 iterations of the system, the program ends when the optimal solution is achieved. FIG. 31 depicts the flow process for achieving the optimal solution.

The inflow sources A and B depend on portion factors p(A) and p(B) such that p(A)+p(B)=1. Accordingly, p(A) comprises N components $p(A^{(1)}), \ldots, p(A^{(N)})$ and p(B) comprises M components $p(B^{(1)}), \ldots, p(B^{(M)})$ such that $p(A)=\Sigma_{i=1}^{N} p(A^{(i)})$ and $p(B)=\Sigma_{i=1}^{M} p(B^{(i)})$. Therefore, there exists N+M constants $\alpha^{(1)}, \ldots, \alpha^{(N)}, \beta^{(1)}, \ldots, \beta^{(M)}$ such that $A^{(i)}=\Sigma_{i=1}^{N} \alpha^{(i)} p(A^{(i)}) Z$ and $B^{(i)}=\Sigma_{i=1}^{N} \beta^{(i)} p(B^{(i)}) Z$. Therefore, $$p(A)+p(B)=\alpha^{(1)}p(A)+\ldots+\alpha^{(N)}p(A)+\beta^{(1)}p(B)+\ldots+\beta^{(M)}p(B)=1$$

In order to maximize all quantities $A^{(1)}, \ldots, A^{(N)}$ and simultaneously minimize all quantities $B^{(1)}, \ldots, B^{(M)}$ each component $\alpha^{(i)} p(A)$ should be maximized and each component $\beta^{(i)} p(B)$ should be minimized. Because $\Sigma_{i=1}^{N} \alpha^{(i)} = 1$ and $\Sigma_{i=1}^{N}\beta^{(i)}=1$ the total quantity p(A) should be maximized and the total quantity p(B) should be minimized.

As described above, the flows go to the transformation step T, portions of which are represented by $T=\Sigma_{i=1}^{N}T^{A(i)}+\Sigma_{i=1}^{N}T^{B(i)}$. Accordingly, the proportion factors of the flow $p^{T}(A)$ and $p^{T}(B)$ split into $p^{T}(A^{(1)}), \ldots, p^{T}(A^{(N)})$ and $p^{T}(B^{(1)}), \ldots, p^{T}(B^{(M)})$ where $p^{T}(A^{(i)})=\zeta^{(i)}p^{T}(A)$ and $p^{T}(B^{(i)})=\xi^{(i)}p^{T}(B)$ at every time (t) and for N+M proportion factors $\zeta^{(1)}, \ldots, \zeta^{(N)}$ and $\xi^{(1)}, \ldots, \xi^{(N)}$ such that $\Sigma_{i=1}^{N}\zeta^{(i)}=1$ and $\Sigma_{i=1}^{M}\xi^{(i)}=1$. Therefore, $T^{A}=\zeta^{(i)}p^{T}(A)T$ and $T^{B}=\xi^{(i)}p^{T}(B)T$. Therefore, $$p^{T}(A)p^{T}(B)=\zeta^{(1)}p^{T}(A)+\ldots+\zeta^{(N)}p^{T}(A)+\zeta^{(1)}p^{T}(B)+\ldots+\zeta^{(M)}p^{T}(B)=1$$

Therefore, the transformation portions should be maximized and minimized accordingly. Specifically, the transformation portion of the inflow from benign sources $p^{T}(A)$ should be maximized and the transformation portion of the inflow from harmful sources $p^{T}(B)$ should be minimized.

At transformation step T at time (t) the inflow from benign sources and the inflow from harmful sources is mixed, then separated again into S components $T^{(1)}, \ldots, T^{(S)}$, where total transition is $T=\Sigma_{j=1}^{S}T^{(j)}$. Therefore, each $T^{(j)}$ is a portion of T represented by proportion factors $\gamma^{(1)}, \ldots, \gamma^{(S)}$. So, the total ideal transformation step may be represented by:

$$T=\gamma^{(j)}(\Sigma_{i=1}^{N}T^{A(i)}+\Sigma_{i=1}^{N}T^{B(i)})=\Sigma_{i=1}^{N}\gamma(j)\zeta(i)p^{T}(A)T+\Sigma_{i=1}^{M}\gamma(j)\xi(i)p^{T}(B)T$$

Further, the transformation step T has a transformation efficiency factor represented by $\mu(t)$, where it separates a wasted portion $T^{C}(t)=\mu(t)T$, to C. The used portion $J^{T}$ is consumed along with the direct flow A from benign sources and the direct flow B from harmful sources called $J^{A}$ and $J^{B}$ respectively which are dependent on the portion factors $p^{J}(A)$ and $p^{J}(B)$. The total used flow may be represented by $J=J^{A}+J^{B}+J^{T}$.

There exists S efficiency components $\mu^{(1)}, \ldots, \mu^{(S)}$ with corresponding proportion factors $\mu^{(1)}, \Xi^{(S)}$ where $\Sigma_{j=1}^{S}\Xi^{(j)}=1$, such that the total efficiency factor is represented by $\mu(t)=1\Sigma_{j=1}^{S}\Xi^{(j)}\mu(t)$. For all $j=1, \ldots, S$, the transformation loss is:

$$T^{C(j)}=\mu^{(j)}T=\Xi^{(j)}\mu(t)\gamma^{(j)}(\Sigma_{i=1}^{N}p^{T}(A)T)+\Xi^{(j)}\mu(t)\gamma^{(j)}(\Sigma_{i=1}^{M}p^{T}(B)T)$$

and $$J^{T(j)}=(1-\mu^{(j)})T=(1-\Xi^{j}\mu(t))\gamma^{(j)}(\Sigma_{i=1}^{N}p^{T}(A)T)+(1-\Xi^{j}\mu(t))\gamma^{(j)}(\Sigma_{i=1}^{M}p^{T}(B)T)$$

In order to maximize the inflow from benign sources $A^{(1)}, \ldots, A^{(j)}$ and the outflow of utilized energy $E^{(1)}, \ldots, E^{(j)}$ and minimize the inflow from harmful resources $B^{(1)}, \ldots, B^{(j)}$ and the outflow of wasted energy $C^{(1)}, \ldots, C^{(j)}$, each parameters $\mu^{(1)}, \ldots, \mu^{(j)}$ should be minimized.

Further, $J^{T(j)}$ may be written as, $$J^{(k)}=\phi^{(k)}J=\phi^{(k)}\left[\left(\sum_{i=1}^{N}(Z-T)\delta^{(i)}p^{J}(A)\right)+\left(\sum_{i=1}^{M}(Z-T)\epsilon^{(i)}p^{J}(B)\right)+\left(\sum_{i=1}^{S}\gamma^{(i)}(1-\mu^{(i)}(t))T\right)\right]$$

The proportion factors of $J^{A}$ and $J^{B}$, $p^{J}(A)$ and $p^{J}(B)$ may be split into N and M components respectively, so there exists $\delta^{(1)}, \ldots, \delta^{(N)}$ and $\epsilon^{(1)}, \ldots, \epsilon^{(M)}$ such that $\Sigma_{i=1}^{N}\delta^{(i)}=1$ and $\Sigma_{i=1}^{M}\epsilon^{(i)}=1$ and $\delta^{(i)}p^{J}(A)=p^{J}(A^{(i)})$ for every $i=1, \ldots, N$ and $\epsilon^{(i)}p^{J}(B)=p^{J}(B^{(i)})$ for every $i=1, \ldots, M$. Therefore, $$p^{J}(A)+p^{J}(B)=\delta^{(1)}p^{J}(A)+\ldots+\epsilon^{(N)}p^{J}(A)+\epsilon^{(1)}p^{J}(B)+\ldots+\epsilon^{(M)}p^{J}(B)=1$$

Consequently, $$J^{A(i)}=(Z-T)p^{J}(A^{(i)})=(Z-T)\delta^{(i)}p^{J}(A) \text{ for all } i=1, \ldots, N.$$

$$J^{B(i)}=(Z-T)p^{J}(B^{(i)})=(Z-T)\epsilon^{(i)}p^{J}(B) \text{ for all } i=1, \ldots, M.$$

Because the consumption stage is represented by $J=J^{A}+J^{B}+J^{T}$, then $J=(\Sigma_{i=1}^{N}(Z-T)\delta^{(i)}p^{J}(A))+(\Sigma_{i=1}^{M}(Z-T)\epsilon^{(i)}p^{J}(B))+(\Sigma_{i=1}^{S}\gamma^{(i)}(1-\mu^{(i)}(1-\mu^{(i)})T)$. Further, J can be written as the sum of S components $J^{(1)}, \ldots, J^{(S)}$, with proportion factors $\phi^{(1)}, \ldots, \phi(S)$. As such, any k-th component can be written as, $$J^{(k)}=\phi^{(k)}J=\phi^{(k)}\left[\left(\sum_{i=1}^{N}(Z-T)\delta^{(i)}p^{J}(A)\right)+\left(\sum_{i=1}^{M}(Z-T)\epsilon^{(i)}p^{J}(B)\right)+\left(\sum_{i=1}^{S}\gamma^{(i)}(1-\mu^{(i)}(t))T\right)\right]$$

Further still, the consumption stage J comprises a consumption efficiency factor $\eta(t)$, where the actual used portion E is separated from the remaining wasted portion C. There are S portion factors $\theta^{(1)}, \ldots, \theta^{(S)}$, such that $\Sigma_{j=1}^{S}\eta^{(j)}(t)=\Sigma_{j=1}^{S}\theta^{(j)}\eta(t)$. Throughout the example, S is used as an arbitrary index to denote the number of J's. In earlier derivations, the system considered 4 J's, such as (1) residential homes, (2) commercial, (3) industrial businesses, and (4) transportation, as shown in FIGS. 2 and 4, but S could also represent, beyond J's each constituent or disaggregated R's, across $X_j$ and $G_j$, but also aggregated locations p's, to show the energy flow and subsequent optimization in any given time. J variable could thus be replaced by other such variables, do derive energy flow, and related maximization and minimization of artifacts, systems, or regions from microseconds to year-long time intervals.

In conclusion, the following series of equations are provided.

$$Z = E + C$$

$$E = \sum_{k=1}^{S}E^{(k)} = \sum_{k=1}^{S}\eta^{(k)}(t)J = \sum_{k=1}^{S}\theta^{(k)}\eta(t)J$$

$$C = \sum_{k=1}^{S}C^{(k)} = \sum_{k=1}^{N}((1-\eta^{(k)}(t))J + T^{C(k)})$$

Therefore, to maximize the outflow of utilized energy E, consumption efficiency factor $\eta^{(k)}(t)$ should be maximized.

The optimization solution shown above may be visualized in any of the visualization methods provided in regards to the above-described optimization and visualization embodiments. Further, any combination of the visualizations of the optimization problems may be displayed. In some embodiments, the optimization methods may be displayed together.

Figure 32:
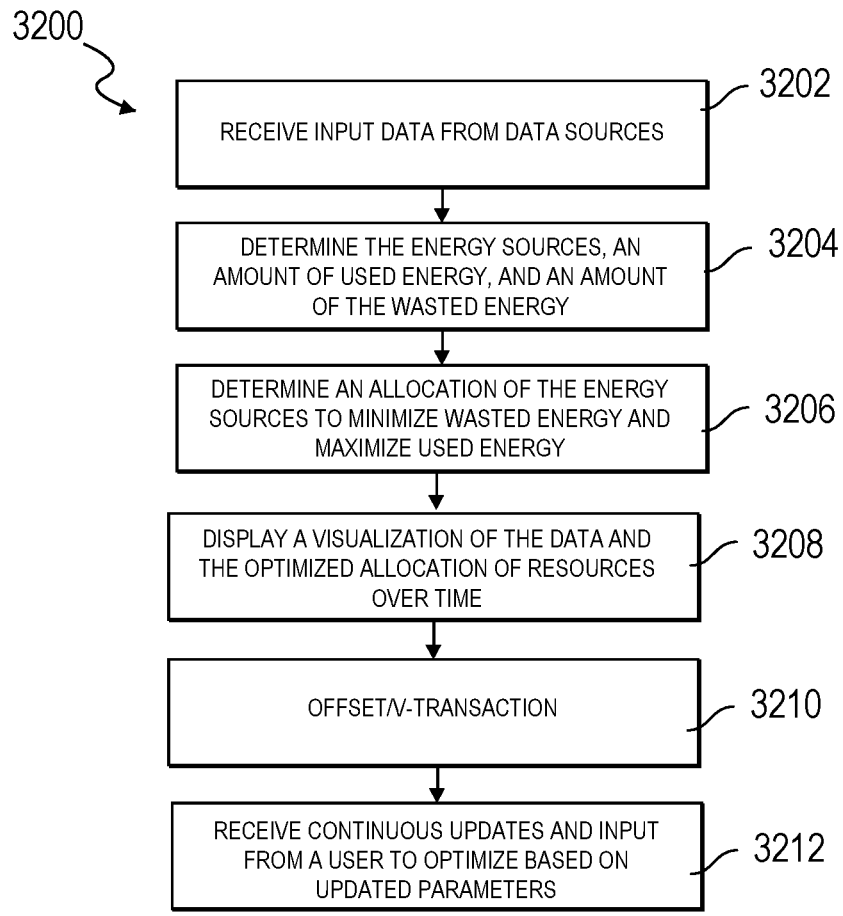
FIG. 32 depicts an exemplary flow diagram for resource allocation optimization and visualization.

FIG. 32 depicts a flow chart 3200 showing an exemplary process for embodiments of the invention. At step 3202, data from the data sources 138 are received. The received data may be indicative of the source of the generated energy and the amount of generated energy. The received data may also be indicative of an amount of energy consumed and wasted by each energy consumption method described above. For example, the energy source may be solar power and the energy consumption may be an office building or a residence. In another example, the energy source may be fossil fuels and the consumption may be transportation. Any energy source and energy consumption methods may be analyzed using the algorithms and displayed using the visualization described herein.

At step 3204, the energy that is used, wasted, and the sources and processes of using and wasting the energy are determined. In some embodiments, the energy used and wasted is determined for each energy consumption process such that the process efficiencies can be determined and compared based on each energy source. Further, process costs for both the economy and the environment may be determined. The environmental and economic cost of benign and harmful resources as well as wasted and used resources may be determined.

At step 3206, allocation of resources may be optimized based on the source of the energy and how the energy is being used and wasted. Determine the most optimal allocation of resources within a defined system to minimize the use of harmful resources and maximize the use of benign resources using the optimization algorithms described above. Further, the processes may be evaluated for find the most effective allocation of resources to limit waste and maximize benign resources. In some embodiments, the cost of the resources is taken into account and a weighted system process economic cost and environmental cost is determine. An allocation of resources maximizing benign resources and minimizing harmful resources may be determined. In some embodiments, wasted resources may be minimized and in some embodiments, monetary costs and savings may be minimized and maximized or otherwise weighted against along with the benign and harmful resources to provide environmental and economical solutions.

At step 3208, the visualization of the source data and optimized allocation of resources is displayed via the visualizations described above. The visualizations provide two- and three-dimensional data visualization via the visual three-dimensional cubes and two-dimensional maps described above. The user may customize any of the above-described visualizations to present customized past, present, and future visualizations based on the data sources, geospatial map information, transition processes, and the user input parameters.

At step 3210, the amount of P can be used to "purchase" items, v (representing reallocations and transformations of energy sources in different ways), thereby changing the system parameters in meeting the desired conditions (i.e., p(A) and $p^T$(A) goes to 1, which implies p(B) and $p^T$(B) goes to 0, and η goes to 1, such that μ goes to 0). The price to purchase may be maximized, the reduction of harmful inputs, may be minimized or any combination in between.

As described in reference to FIG. 29 above, each user can understand the emissions Φ given their energy source visualization, and chose to either escrow the monetary amount, P(Φ) or P(B) in any given t in any currency to either (i) purchase relevant v solutions knowing the P (v) of each v solution, (ii) invest P(Φ) amount in community-level projects, either as a trackable donation or purchasing a security in an investment project, such as green bonds, (iii) make charitable donations of P(Φ) to other S entities, through unique alphanumeric IDs or (iv) buy carbon offsets or renewable energy credits in the amount of P(Φ) and get a discount code (another unique alphanumeric ID) from participating retailers.

As shown in FIG. 29, the first option can be for an S user to offset $20 by using the system to match the $20 to a set of v's to "purchase" at least a portion, or a single v solution that their R, Q, $X_j$ matches that of the v. A v-card may be generated showing the monetary value, as well as savings Sv over time, including any $\delta\phi_v$ reduction; thereby optimizing the $J^A$, $J^B$ and $J^T$ parameters of the user S. The v solutions provider may want to verify and give discount to the S consumers who have completed offsets or gone carbon neutral by checking if their unique alphanumeric code has been already spent from their account or not, to limit double spending. If already spent, a message may reiterate the note: "Thanks for your previous impact, we have already applied your discount for v purchase (<unique code>)" If not spent, says "Thanks for your impact, enjoy <discount (80%) on v purchase>"

The second option allows S user to use the system to match the $20 to a set of v's to "purchase" at least a portion, or a single v "project" that their R, p matches that of the v. A v-card may be generated showing the monetary value of this investment, as well as savings Sv over time or interest rate, such as bond coupons, including with it any 50, reduction; thereby optimizing the $J^A$, $J^B$ and $J^T$ parameters of either the user or the region p. The v solutions provider may want to verify and give return on investments to the S consumers who have completed offsets or gone carbon neutral by checking if their unique alphanumeric code has been already spent from their account or not, to limit double spending. If already spent, a message may reiterate the note: "Thanks for your previous investment, we have already applied your impact funds to v project (<unique code>)" If not spent, says "Thanks for your impact, you now own minibond coupon <uniquecode>"

A third option can allow use of the system to match the $20 to a set of other S donations, to give away, at least a portion of their offset to another entity. A list may be generated showing the monetary value of this donation, as well as savings Sv over time of the receiving entity, including with it any $\delta\phi_v$ reduction; thereby optimizing the $J^A$, $J^B$ and $J^T$ parameters of the receiving user or entity. The donation receiver may want to verify through the system that the S consumers who have completed offsets or gone carbon neutral by checking if their unique alphanumeric code has been already spent from their account or not, to limit double spending in either other donations, v-purchases, bond investments or any other such system processes. If already spent, a message may reiterate the note: "Thanks for your previous donation, we have already applied your impact (<unique code>)" If not spent, says "Thanks for your impact <alphanumericode>"

A fourth option allows the S users to use the system to match the $20 to a combination of above processes, to get a discount code for any other entity who are not any of the above. A new alphanumeric code may be uniquely generated showing the monetary value of this donation, as well as savings S, through a discount percentage applied over time given by the retailer entity, including with it any $\delta\phi_v$ reduction; thereby optimizing the $J^A$, $J^B$ and $J^T$ parameters of the receiving user or entity. The discount provider may want to verify through the system that the S donation receiver/consumers who have completed offsets or gone carbon neutral by checking if their unique alphanumeric code has been already spent from their account or not, to limit double spending in either other donations, v-purchases, bond investments or any other such system processes. If already spent, a message may reiterate the note: "Thanks for your previous impact, we have already applied your discount (<unique code>)" If not spent, says "Thanks for your impact, enjoy <discount (40%)>". Many such transactions between different entities, subsystems, components and variables described above could be facilitated through the step-wise optimization process.

At step 3212, the source data is continuously received, optimized, and visualized in real-time. In some embodiments, the information is processed and updated continuously, or dynamically, or at any desired period. The optimization algorithms and the data visualization processes may continually receive input data from the data sources and provide current data visualizations and optimized resource allocations.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as contemplated.

The following function shows an example by receiving, as input, a generic set of parameters $V_i(t)$ and computes all the other quantities of the system corresponding to such $V_i(t)$. Every $V_i(t)$ comes with a received price, which for this example is generated randomly in the function.

---

Algorithm 1 V-EVALUATION

Inputs

1: $T, Z, p(A_{t-1}^{(1)}), \ldots, p(A_{t-1}^{(N)}), p(B_{t-1}^{(1)}), \ldots, p(B_{t-1}^{(M)})$
2: $p^T(A_{t-1}^{(1)}), \ldots, p^T(A_{t-1}^{(N)}), p^T(B_{t-1}^{(1)}), \ldots, p^T(B_{t-1}^{(M)})$
3: $p^J(A_{t-1}^{(1)}), \ldots, p^J(A_{t-1}^{(N)}), p^J(B_{t-1}^{(1)}), \ldots, p^J(B_{t-1}^{(M)})$
4: $\eta^{(1)}(t-1), \ldots, \eta^{(S)}(t-1), \varphi^{(1)}(t-1), \ldots, \varphi^{(S)}(t-1)$
5: $\gamma^{(1)}(t-1), \ldots, \gamma^{(S)}(t-1), \mu^{(1)}(t-1), \ldots, \mu^{(S)}(t-1)$
6: $\Delta p(A_{t-1}^{(1)}), \ldots, \Delta p(A_{t-1}^{(N)}), \Delta p(B_{t-1}^{(1)}), \ldots, \Delta p(B_{t-1}^{(M)})$
7: $\Delta p^T(A_{t-1}^{(1)}), \ldots, \Delta p^T(A_{t-1}^{(N)}), \Delta p^T(B_{t-1}^{(1)}), \ldots, \Delta p^T(B_{t-1}^{(M)})$
8: $\Delta p^J(A_{t-1}^{(1)}), \ldots, \Delta p^J(A_{t-1}^{(N)}), \Delta p^J(B_{t-1}^{(1)}), \ldots, \Delta p^J(B_{t-1}^{(M)})$
9: $\Delta \eta^{(1)}(t-1), \ldots, \Delta \eta^{(S)}(t-1), \Delta \varphi^{(1)}(t-1), \ldots, \Delta \varphi^{(S)}(t-1)$
10: $\Delta \gamma^{(1)}(t-1), \ldots, \Delta \gamma^{(S)}(t-1), \Delta \mu^{(1)}(t-1), \ldots, \Delta \mu^{(S)}(t-1)$ Steps 1: procedure V-EVALUATION (Inputs)
2: $A_t^{(i)} \leftarrow p(A_t^{(i)}) * Z$ for $i = 1, \ldots, N$
3: $A_t \leftarrow \sum_i^N A_t^{(i)}$
4: $B_t^{(i)} \leftarrow p(B_t^{(i)}) * Z$ for $i = 1, \ldots, M$
5: $B_t \leftarrow \sum_i^M B_t^{(i)}$
6: $p^T(A_t^{(i)}) \leftarrow p^T(A_{t-1}^{(i)}) + \Delta p^T(A_t^{(i)})$ for $i = 1, \ldots, N$
7: $p^T(B_t^{(i)}) \leftarrow p^T(B_{t-1}^{(i)}) + \Delta p^T(B_t^{(i)})$ for $i = 1, \ldots, M-1$

---

Algorithm 1 V-EVALUATION

8: $p^T(B_t^{(M)}) \leftarrow 1 - \left( \sum_i^N p^T(A_t^{(i)}) + \sum_i^{M-1} p^T(B_t^{(i)}) \right)$ 9: $T_t^{A^{(i)}} \leftarrow T * p^T(A_t^{(i)})$ for $i = 1, \ldots, N$
10: $T_t^{B^{(i)}} \leftarrow T * p^T(B_t^{(i)})$ for $i = 1, \ldots, M-1$
11: $T_t^{B^{(M)}} \leftarrow T * p^T(B_t^{(M)})$
12: $p^J(A_t^{(i)}) \leftarrow p^J(A_{t-1}^{(i)}) + \Delta p^J(A_t^{(i)})$ for $i = 1, \ldots, N$
13: $p^J(B_t^{(i)}) \leftarrow p^J(B_{t-1}^{(i)}) + \Delta p^J(B_t^{(i)})$ for $i = 1, \ldots, M-1$ 14: $p^J(B_t^{(M)}) \leftarrow 1 - \left( \sum_i^N p^J(A_t^{(i)}) + \sum_i^{M-1} p^J(B_t^{(i)}) \right)$ 15: $J_t^{A_i} \leftarrow (Z - T) * p^J(A_t^{(i)})$ for $i = 1, \ldots, N$ 16: $J_t^{B^{(i)}} \leftarrow (Z - T) * p^J(B_t^{(i)})$ for $i = 1, \ldots, M$ 17: $J^{A_t} \leftarrow \sum_i^N J^{A_t^{(i)}}$ 18: $J^{B_t} \leftarrow \sum_i^M J^{B_t^{(i)}}$ 19: $\gamma^{(i)}(t) \leftarrow \gamma^{(i)}(t-1) + \Delta \gamma^{(i)}(t-1)$ for $i = 1, \ldots, S$
20: $T_t^{(i)} \leftarrow T * \gamma^{(i)}(t)$ for $i = 1, \ldots, S$
21: $\mu^{(i)}(t) \leftarrow \mu^{(i)}(t-1) - \Delta \mu^{(i)}(t-1)$ for $i = 1, \ldots, S$
22: $T_t^{C^{(i)}} \leftarrow T_t^{(i)} * \mu^{(i)}(t)$ for $i = 1, \ldots, S$ 23: $T_t^C \leftarrow \sum_i T_t^{C^{(i)}}$ 24: $J_t^{T^{(i)}} \leftarrow T_t^{(i)} * (1 - \mu^{(i)}(t))$ for $i = 1, \ldots, S$
25: $J_t \leftarrow J^{A_t} + J^{B_t} + J_t^T$
26: $\eta^{(i)}(t) \leftarrow \eta^{(i)}(t-1) + \Delta \eta^{(i)}(t-1)$ 27: $\eta(t) \leftarrow \sum_i \eta^{(i)}(t)$ 28: $E_t^{(i)} \leftarrow \eta^{(i)}(t) * J_t$
29: $C_t^{(i)} \leftarrow (1 - \eta^{(i)}(t)) * J_t^{(i)} + T^{C^{(i)}}$
30: $T_t^{BC} \leftarrow T_t^C * p^T(B_t)$
31: $J^{BCN}(t) \leftarrow (1 - \eta(t)) * J_t^{B_t}$
32: $J^{BN}(t) \leftarrow \eta(t) * J_t^B$
33: $\Phi(B_t) \leftarrow m * (T^{BC}(t) + T^{BCN}(t) + T^{BN}(t) + J^{BCN}(t) + J^{BN}(t))$ where m = 2
34: $\Phi(B_t) \leftarrow \Sigma \Phi(B_t)$
35: $P(v_t) \leftarrow$ Input pricing (cost, and savings)
36: $P(B_t) \leftarrow n * \Phi(B_t)$ where n = 1.5
37: $P(v_t^B(t)) \leftarrow P(B_t) - P(v_t(t))$
38: $T^{BC}(t), J^{BCN}(t), J^{BN}(t), \Phi(B_t), P(v_t(t)), P(B_t), P(v_t^B(t))]$
39: $v_t \leftarrow$ List $(p(A_t^{(1)}), \ldots, p(A_t^{(N)}), p(B_t^{(1)}), \ldots, p(B_t^{(M)})$
40: $p^T(A_t^{(1)}), \ldots, p^T(A_t^{(N)}), p^T(B_t^{(1)}), \ldots, p^T(B_t^{(M)}), p^J(A_t^{(1)}), \ldots,$
$p^J(A_t^{(N)}), p^J(B_t^{(1)}), \ldots, p^J(B_t^{(M)}), \eta^{(1)}(t), \ldots, \eta^{(S)}(t), \varphi^{(1)}(t), \ldots,$
$\varphi^{(S)}(t), \gamma^{(1)}(t), \ldots, \gamma^{(S)}(t), \mu^{(1)}(t), \ldots, \mu^{(S)}(t))$
41: return $v_t$
42: end procedure

---

At t=0 we have the above set $v_0$ of parameters and we aim to produce the set of "all" possible candidates $v_t(1), \ldots, v_t(k)$ for t=1. We do so by trying "all" possible values for $\Delta p(A), \Delta p^T(A), \Delta p^J(A), \Delta \mu, \Delta \eta$ which we are going to add to the initial parameters obtaining the k new sets of parameters $v_t(1), \ldots, v_t(k)$. All the combinations of the 3(N+M-1)+4S parameters can be obtained with a 3(N+M-1)+4S-dimensional grid, that is computed with 3(N+M-1)+4S nested for-loops. The smaller each for-loop step is, the longer it will take to process the algorithm. The following function takes as input the set of parameters chosen for step t=n and returns a table with "all" the possible candidates for the following iteration t=n+1:

---
Algorithm 2 TABLE OF CANDIDATES v's
---
Inputs
1: Parameters of the system at time t − 1, changes of parameters at time t, steps for the for-loops
Steps
1: procedure candidates (Inputs)
2: block of N + M − 1 nested for-loops for parameters $p_i(A_t^{(1)}), \ldots, p_i(A_t^{(N)}), p_i(B_t^{(1)}), \ldots, p_i(B_t^{(M-1)})$ do:
3: block of N + M − 1 nested for-loops for parameters $p_i^J(A_t^{(1)}), \ldots, p_i^J(A_t^{(N)}), p_i^J(B_t^{(1)}), \ldots, p_i^J(B_t^{(M-1)})$ do:
4: block of N + M − 1 nested for-loops for parameters $p_i^T(A_t^{(1)}), \ldots, p_i^T(A_t^{(N)}), p_i^T(B_t^{(1)}), \ldots, p_i^T(B_t^{(M-1)})$ do:
5: block of S nested for-loops for parameters $\eta_i^{(1)}(t), \ldots, \eta_i^{(S)}(t)$ do:
6: block of S nested for-loops for parameters $\varphi_i^{(1)}(t), \ldots, \varphi_i^{(S)}(t)$ do:
7: block of S nested for-loops for parameters $\gamma_i^{(1)}(t), \ldots, \gamma_i^{(S)}(t)$ do:
8: block of S nested for-loops for parameters $\mu_i^{(1)}(t), \ldots, \mu_i^{(S)}(t)$ do:
9: New Candidate ← v-evaluation (T, Z, $p(At_{-1}^{(1)}), p^T(At-1^{(1)}), p^J(At-1^{(1)}), \eta_i^{(1)}(t-1), \mu^{(1)}(t-1), \Delta p(A_t^{(1)}), \Delta p^T(At^{(1)}), \Delta p^J(At^{(1)}), \Delta\eta^{(1)}(t), \Delta\mu^{(1)}(t)$)
10: end block
11: end block
12: end block
13: end block
14: end block
15: end block
16: end block
17: end procedure At every iteration t, the choice of a candidate from the table can be made by placing some conditions on the values of the table in such a way that the system reaches the optimal condition as quickly as possible. For example, if for every iteration t we have the constrains:

$$-P(B(t)) \geq P(v(t))$$

$$-|\Phi(B(t)) - \Phi(B(t-1))(B(t-1))| \text{ is maximized}$$

We can also input a given $\Delta\Phi(t)$, implying $\Phi$ to be reduced between two time periods, be it, the current time period and next, or two discrete time periods. Here we may generate the v's, and we want to be able to return a subset of them representing the lowest number of v's that can achieve the $\Delta\Phi(t)$ reduction specified. Similarly, for the similar given $\Delta\Phi$ reduction input, the system can also return the smallest summation of P(v) of those v's. The user could specify the lowest sum of P(v) in currency, OR the lowest number (i.e. count) of v's; and they may or may not be unique. Like $\Delta\Phi$, the input could be of any parameter, such as $\Delta p(A), \Delta p^T(A), \Delta p^J(A), \ldots \Delta\mu, \Delta\eta$, etc.

Given the initial set of parameters above, we can produce several possible sets of parameters. For example, for each v in the table, we can derive its time-based savings in currency, say $\Delta S_v(t)$, or the payback period in time units, the return on investment (ROI) based on $\Delta S_v(t)$ and P(v), the Internal rate of return (IRR) or calculate net-present value (NPV) etc. of each individual or collective sets of v's.

The next function deletes the candidates that do not satisfy the first condition, then sort the table by $\Phi$, obtaining several good choices for v. Among the good candidates we choose the one with greatest E, and smallest B.

---
Algorithm 3 PICK CANDIDATE
---
Inputs
1: Parameters of the system at time t − 1, changes of parameters at time t, steps for the for-loops ---
Algorithm 3 PICK CANDIDATE
---
Outputs
1: $v_i(t)$ from the table of possible $v_i(t)$'s at time t that satisfies some conditions.
Steps
1: procedure Pick candidate (Inputs)
2: Keep only candidates $v_i(t)$ of table such that $P(v_i^B(t)) \geq 0$
3: Order the table by increasing $\Phi(v_i(t))$, then by decreasing $E_t$, then by increasing $B_t$
4: chosen ← first row of the table
5: return chosen
6: end procedure The next function puts together the collection of $v_i$'s chosen from the first to the last iteration.

---
Algorithm 4 OPTIMIZATION
---
Inputs
1: Parameters of the system at time t − 1, changes of parameters at time t, initial parameters $p(A_0), p^J(A_0), p^T(A_0), \eta(0), \mu(0)$.
Outputs
1: Solution to the Optimization Problem
Steps
1: procedure Solution (Inputs)
2: Final solution ← v evaluation (T, Z, $p(A_0), p^T(A_0), p^J(A_0), \eta(0), \mu(0), \Delta p(At) = 0, \Delta p^T(At) = 0, \Delta p^J(At) = 0, \Delta\eta(t) = 0, \Delta\mu(t) = 0$)
3: sol ← table of candidate v's (T, Z, $p(A_0), p^T(A0), p^J(A0), \eta(0), \mu(0), \Delta p(At) = 0, \Delta p^T(At) = 0, \Delta p^J(At) = 0, \Delta\eta(t) = 0, \Delta\mu(t) = 0$, steps for the for-loops)
4: while condition do
5: Decrease steps for the for-loops
6: sol ← Pick candidate (T, Z, $p(At-1^{(i)}), p^T(At-1^{(i)}), , p^J(At-1^{(i)}), \eta^{(i)}(t-1), \mu^{(i)}(t-1), \Delta p(At^{(i)}), \Delta p^T(At^{(i)}), \Delta p^J(At^{(i)}), \Delta\eta^{(i)}(t), \Delta\mu^{(i)}(t)$)
7: if Number of rows of sol = 0 then
8: condition = FALSE
9: else
10: Update parameters $p(At-1^{(i)}), p^T(At-1^{(i)}), p^J(At-1^{(i)}), \eta^{(i)}(t-1), \mu^{(1)}(t-1)$
11: Final solution ← List (Final solution, sol)
12: end if
13: end while
14: return Final solution
15: end procedure

Having thus described various embodiments of the invention, what is claimed as new and desired to be protected by Letters Patent includes the following:

The invention claimed is:
1. One or more non-transitory computer-readable storage media storing computer-executable instructions that perform a method of resource allocation of resources to achieve a goal and dynamic monitoring of progress, wherein the computer-executable instructions are executed by at least one processing element to perform:
receiving source data indicative of an amount of the resources from at least one resource source;
receiving an indication of an amount of the resources used by at least one resource consumption process;
determining an amount of the resources wasted by the at least one resource consumption process;
determining an allocation of the at least one resource source based at least in part on a maximization of used resources and a minimization of wasted resources;
generating a visualization representing an amount of the at least one resource source used, the amount of the resources used in the at least one resource consumption process, and the amount of the resources wasted in the at least one resource consumption process, wherein the visualization is three dimensional and displays drilled down regions indicative of relationships between subcategories of the at least one resource source and subcategories of the at least one resource consumption process;
continuously monitoring the at least one resource source and the at least one resource consumption process;
adjusting the allocation to maintain optimal allocation of the resources; and
updating the visualization to represent the at least one resource consumption process and the adjusting of the allocation.

2. The method of claim 1, further comprising:
determining if the at least one resource source is a benign source of the resources or a harmful source of the resources; and
further determining the resource allocation based at least in part on a maximization of the benign source and a minimization of the harmful source.

3. The method of claim 1 further comprising generating an allocation visualization displaying the allocation of the resources, wherein the allocation of the at least one resource source is further based on a monetary cost of the at least one resource source.

4. The method of claim 3, wherein the allocation visualization further depicts an amount of the resources received from the at least one resource source, an amount of the resources used in the at least one resource consumption process, and the amount of the resources wasted in the at least one resource energy consumption process.

5. The method of claim 1, wherein the at least one resource consumption process is at least one of public and private social infrastructure and transportation.

6. The method of claim 1, wherein the at least one resource source is at least one of nuclear, coal, wind, water, and solar.

7. The method of claim 1,
wherein the visualization is two dimensional and provides at least one color-coded region, and
wherein the at least one color-coded region is indicative of the amount of resource energy consumption.

8. The method of claim 1, wherein the visualization is a three-dimensional cube and displays a relationship between at least one resource source on a first axis and at least one consumption process on a second axis with a quantity of resource consumption displayed on a third axis.

9. The method of claim 8, wherein the at least one resource source and the at least one resource consumption process is further broken down into subcategories layered on top of each subsequent layer to display a relative quantity of the subcategories.

10. The method of claim 1, further comprising
wherein the optimal allocation of the at least one resource source further includes a first monetary cost of the at least one resource source and a second monetary cost of the at least one resource consumption process.

11. A method of resource allocation and dynamic monitoring of progress, wherein the method comprises:
receiving resource source data indicative of an amount of resources from at least one resource source;
receiving resource consumption data indicative of an amount of resources consumed from at least one resource consumption process;
determine if the at least one resource source is a benign source or a harmful source;
determine an amount of wasted resources in the at least one resource consumption process;
determine an allocation of the resources based at least in part on a maximization of inflow from the benign source and a minimization of inflow from the harmful source;
generate a first visualization representing the amount of the resources received from the at least one resource source, the amount of the resources used in the at least one resource consumption process, and the amount of the wasted resources energy in the at least one resource energy consumption process,
wherein the first visualization is three dimensional and displays drilled down regions indicative of a relationship between subcategories of the at least one resource source and subcategories of the at least one resource consumption process;
generate a second visualization presenting the allocation of the resources,
continuously monitor the at least one resource consumption process;
adjusting the allocation to maintain optimal allocation of resources;
update the first visualization to represent the at least one resource consumption process; and
update the second visualization to represent the adjusting of the allocation.

12. The method of claim 11, wherein the allocation of the resources is further based at least in part on the amount of the resources consumed in the at least one resource consumption process and the amount of wasted resources in the at least one resource consumption process.

13. The method of claim 11, wherein a plurality of relative quantities are layered on top of each subsequent layer to display a relative quantity between the at least one resource source on a first axis and the at least one resource consumption process on a second axis.

14. One or more non-transitory computer-readable storage media storing computer-executable instructions that perform a method of resource allocation and dynamic monitoring of progress, wherein the computer-executable instructions are executed by at least one processing element to perform:
receiving resource source data indicative of an amount of resources from at least one resource energy source of;
receiving resource consumption data indicative of an amount of the resources consumed from at least one resource consumption process;
determining if the at least one resource source is a benign source or a harmful source;
determining an amount of wasted the resources in the at least one resource consumption process;
determine an allocation of the resources based at least in part on a maximization of inflow from the benign source, a maximization of used resources, a minimization of inflow from the harmful source, and minimization of wasted energy;
generate a first visualization representing the amount of the resources received from the at least one resource source, the amount of the resources used in the at least one resource consumption process, and the amount of the resources wasted in the at least one resource consumption process,.
wherein the first visualization is three dimensional and displays drilled down regions indicative of a relationship between subcategories of the at least one resource source and subcategories of the at least one resource consumption process;

continuously monitoring the at least one resource source and the at least one resource consumption process;

adjusting the allocation to maintain an optimal allocation of the resources; and generate a second visualization presenting the allocation of the at least one resource source, wherein the first visualization and the second visualization are updated continuously, displaying an amount of the at least one resource source and the optimal allocation.

15. The media of claim 14, wherein the optimal is further based on a monetary cost of at least one of the at least one resource energy source and the at least one resource consumption process, and wherein the computer-executable instructions are further configured to present the second visualization indicative of the monetary cost.

16. The media of claim 15, wherein the first visualization comprises three-dimensional layers representing a relative quantity of the resources relative to a use type.

17. The media of claim 16, wherein a third visualization is updated continuously, displaying an amount of and the monetary cost.

\* \* \* \* \*